US007506987B2

(12) United States Patent
Nilsen

(10) Patent No.: US 7,506,987 B2
(45) Date of Patent: Mar. 24, 2009

(54) TWO-SIDED CORNER-CUBE RETROREFLECTORS AND METHODS OF MANUFACTURING THE SAME

(75) Inventor: Robert B. Nilsen, Mystic, CT (US)

(73) Assignee: Technology Solutions & Invention LLC, Mystic, CT (US)

( * ) Notice: Subject to any disclaimer, the term of this patent is extended or adjusted under 35 U.S.C. 154(b) by 0 days.

(21) Appl. No.: 12/040,243

(22) Filed: Feb. 29, 2008

(65) Prior Publication Data

US 2008/0212182 A1    Sep. 4, 2008

Related U.S. Application Data

(60) Provisional application No. 60/904,668, filed on Mar. 2, 2007, provisional application No. 60/906,725, filed on Mar. 13, 2007, provisional application No. 60/955,234, filed on Aug. 10, 2007, provisional application No. 60/979,119, filed on Oct. 11, 2007, provisional application No. 60/981,651, filed on Oct. 22, 2007.

(51) Int. Cl.
    *G02B 5/124*   (2006.01)
(52) U.S. Cl. ........................ 359/530; 359/529
(58) Field of Classification Search .......... 359/529–530
    See application file for complete search history.

(56) References Cited

U.S. PATENT DOCUMENTS 1,591,572 A    7/1926   Stimson (Continued)

FOREIGN PATENT DOCUMENTS

EP    0525708 A1    2/1993

(Continued)

OTHER PUBLICATIONS

PLX,Inc., "Hard-Mounted Hollow Retroreflector," accessed Dec. 16, 1999 (Available from www.plxinc.com/hmhrfrnt.html).

(Continued)

*Primary Examiner*—James Phan
(74) *Attorney, Agent, or Firm*—Mills & Onello LLP

(57) ABSTRACT

In a retroreflective sheeting, and methods of formation thereof, the sheeting comprises a body of material, the body having a first surface and a second surface. A plurality of first full-square-sided corner-cube structures are on the first surface of the body, the first full-square-sided corner-cube structures each having three facets that lie along planes that are orthogonal to each other. A plurality of second full-square-sided corner-cube structures are on the second surface of the body, the second full-square-sided corner-cube structures each having three facets that lie along planes that are orthogonal to each other. The body is constructed and arranged to be transparent to incident electromagnetic energy at a range of wavelengths and to have a thickness so that an incident electromagnetic energy ray that is incident at one of the first and second surfaces enters the body, and is redirected by both the first surface and the second surface so that both the first surface and the second surface contribute to retroreflection of the incident electromagnetic energy ray, and exits from the one of the first and second surfaces at which the incident electromagnetic energy ray was incident to emit a retroreflected electromagnetic energy ray of the incident electromagnetic energy ray.

44 Claims, 28 Drawing Sheets

U.S. PATENT DOCUMENTS

| | | | |
|---|---|---|---|
| 1,807,350 A | 5/1931 | Stimson |
| 1,848,675 A | 3/1932 | Stimson |
| 2,055,298 A | 9/1936 | Leray |
| 2,205,638 A | 6/1940 | Stimson |
| 2,310,790 A | 2/1943 | Jungersen |
| 2,380,447 A | 7/1945 | Jungersen |
| 3,069,721 A | 12/1962 | Arni et al. |
| 3,140,340 A | 7/1964 | Weber |
| 3,332,327 A | 7/1967 | Heenan |
| 3,450,459 A | 6/1969 | Haggerty |
| 3,541,606 A | 11/1970 | Heenan et al. |
| 3,689,346 A | 9/1972 | Rowland |
| 3,712,706 A | 1/1973 | Stamm |
| 3,762,825 A | 10/1973 | Reusser |
| 3,782,805 A | 1/1974 | Brown |
| 3,799,646 A | 3/1974 | Footchkar |
| 3,810,804 A | 5/1974 | Rowland |
| 3,833,285 A | 9/1974 | Heenan |
| 3,846,012 A | 11/1974 | Brown |
| 3,883,224 A | 5/1975 | Tanaka |
| 3,887,268 A | 6/1975 | Golden et al. |
| 3,893,747 A | 7/1975 | Nagel |
| 3,894,786 A | 7/1975 | Nagel |
| 3,894,790 A | 7/1975 | Golden et al. |
| 3,905,681 A | 9/1975 | Nagel |
| 3,923,378 A | 12/1975 | Heenan |
| 3,926,402 A | 12/1975 | Heenan |
| 3,938,876 A | 2/1976 | Brown |
| 3,954,324 A | 5/1976 | Arnott et al. |
| 3,966,301 A | 6/1976 | Brown |
| 4,004,930 A | 1/1977 | Tung |
| 4,012,115 A | 3/1977 | Brown |
| 4,025,159 A | 5/1977 | McGrath |
| RE29,396 E | 9/1977 | Heenan |
| 4,066,236 A | 1/1978 | Lindner |
| 4,066,331 A | 1/1978 | Lindner |
| 4,076,383 A | 2/1978 | Heasley |
| 4,095,773 A | 6/1978 | Lindner |
| 4,100,625 A | 7/1978 | Tung |
| 4,127,693 A | 11/1978 | Lemelson |
| 4,208,090 A | 6/1980 | Heenan |
| 4,260,220 A | 4/1981 | Whitehead |
| 4,555,161 A | 11/1985 | Rowland |
| 4,618,518 A | 10/1986 | Pricone et al. |
| 4,712,867 A | 12/1987 | Malek |
| 4,981,904 A | 1/1991 | Fischer |
| 5,182,663 A | 1/1993 | Jones |
| 5,272,562 A | 12/1993 | Coderre |
| 5,335,111 A | 8/1994 | Bleier |
| 5,361,171 A | 11/1994 | Bleier |
| 5,376,431 A | 12/1994 | Rowland |
| 5,589,991 A | 12/1996 | Bleier |
| 5,642,222 A | 6/1997 | Phillips |
| 5,657,162 A | 8/1997 | Nilsen et al. |
| 5,780,140 A | 7/1998 | Nilsen |
| 5,786,066 A | 7/1998 | Martin et al. |
| 5,805,339 A | 9/1998 | Martin et al. |
| 5,835,271 A | 11/1998 | Stump et al. |
| 5,976,446 A | 11/1999 | Lin et al. |
| 6,015,214 A | 1/2000 | Heenan et al. |
| 6,050,691 A | 4/2000 | Fellows et al. |
| 6,142,643 A | 11/2000 | Araki et al. |
| 6,206,525 B1 | 3/2001 | Rowland et al. |
| 6,257,860 B1 | 7/2001 | Luttrell et al. |
| 6,258,443 B1 | 7/2001 | Nilsen et al. |
| 6,280,822 B1 | 8/2001 | Smith et al. |
| 6,287,670 B1 | 9/2001 | Benson et al. |
| 6,318,987 B1 | 11/2001 | Luttrell et al. |
| 6,386,855 B1 | 5/2002 | Luttrell et al. |
| 6,447,878 B1 | 9/2002 | Smith et al. |
| 6,533,887 B1 | 3/2003 | Smith et al. |
| 6,656,571 B2 | 12/2003 | Benson et al. |
| 6,819,507 B2 | 11/2004 | Minoura et al. |
| 6,967,053 B1 | 11/2005 | Mullen et al. |
| 7,045,278 B2 | 5/2006 | Ihara et al. |
| 7,098,137 B2 | 8/2006 | Ihara et al. |
| 7,098,976 B2 | 8/2006 | Minoura et al. |
| 7,101,053 B2 | 9/2006 | Parker |
| 7,182,829 B2 | 2/2007 | Smith et al. |
| 2001/0026860 A1 | 10/2001 | Benson et al. |
| 2001/0033906 A1 | 10/2001 | Smith et al. |
| 2001/0033907 A1 | 10/2001 | Smith et al. |
| 2004/0169928 A1* | 9/2004 | Nilsen et al. ................ 359/529 |
| 2006/0087735 A1 | 4/2006 | Nilsen et al. |

FOREIGN PATENT DOCUMENTS

| | | |
|---|---|---|
| JP | 7198913 A | 8/1995 |
| WO | 9820375 A1 | 5/1998 |
| WO | 9853645 A1 | 11/1998 |
| WO | 9859266 A1 | 12/1998 |
| WO | 9931534 A1 | 6/1999 |
| WO | 0042453 A1 | 7/2000 |
| WO | 0042454 A1 | 7/2000 |
| WO | 2005114268 A2 | 12/2005 |

OTHER PUBLICATIONS

PLX,Inc., "Hollow Retroreflector Arrays for Modern FTIR Long-Path Spectroscopy," accessed Dec. 16, 1999 )Available from www.plxinc.com/hrafmt.html).

Nilsen, Robert B., et al., " Reflection Technology", SPIE proceedings, vol. 5616, pp. 47-60, Oct. 27, 2004, ISBN 0-8194-5569-5.

Cowan, et al; Aztec Surface-Relief Volume Diffractive Structure; Journal of the Optical Society of America A. 1990, vol. 7, No. 8, pp. 1529-1544.

International Search Report issued in corresponding PCT application, Serial No. PCT/US2008/055469.

* cited by examiner

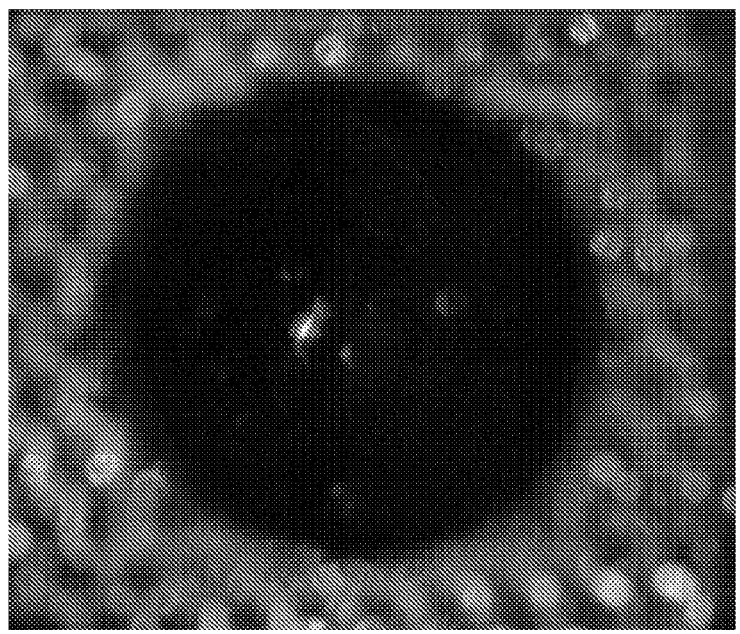
FIG. 23
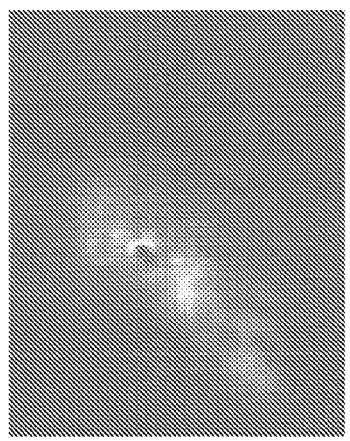 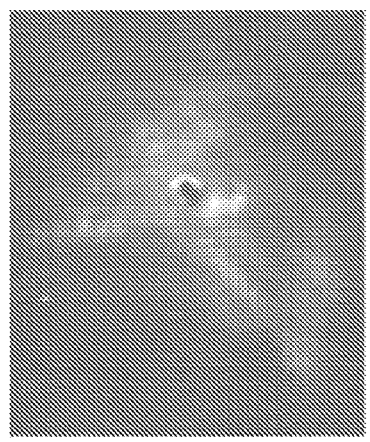 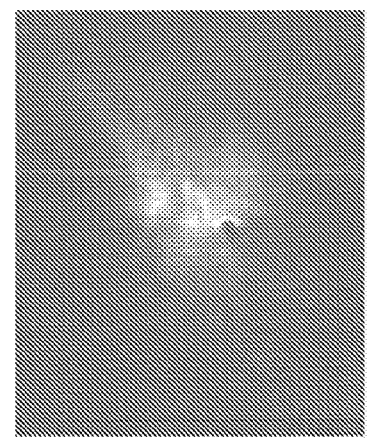
FIG. 24A    FIG. 24B    FIG. 24C

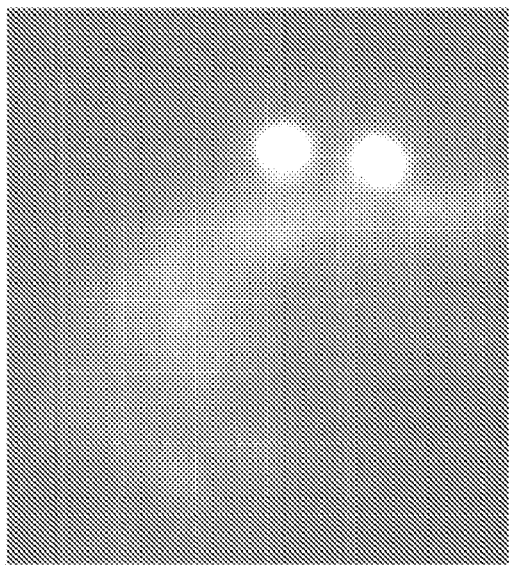 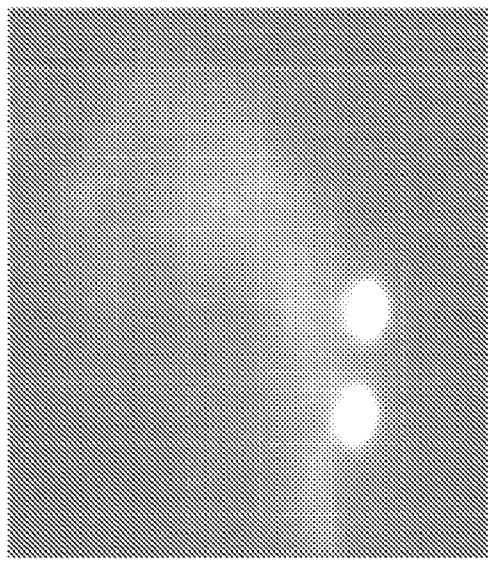
FIG. 31A  FIG. 31B
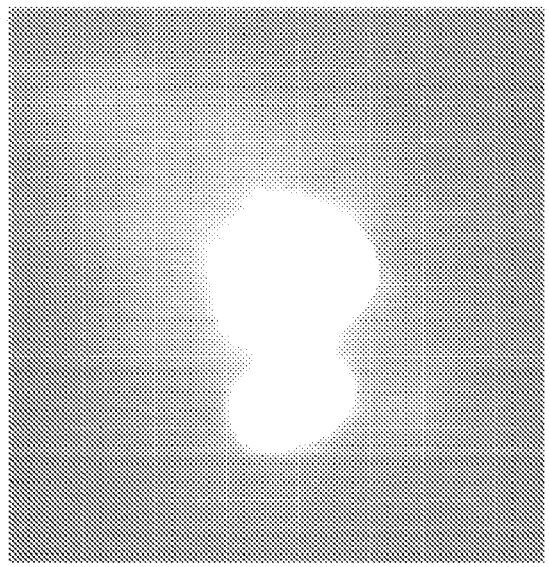
FIG. 32

TWO-SIDED CORNER-CUBE RETROREFLECTORS AND METHODS OF MANUFACTURING THE SAME

RELATED APPLICATIONS

This application claims the benefit of U.S. Provisional Patent Application No. 60/981,651, filed Oct. 22, 2007, U.S. Provisional Patent Application No. 60/979,119, filed Oct. 11, 2007, U.S. Provisional Patent Application No. 60/955,234 filed Aug. 10, 2007, U.S. Provisional Patent Application No. 60/906,725 filed Mar. 13, 2007, and U.S. Provisional Patent Application No. 60/904,668 filed Mar. 2, 2007, the content of each being incorporated herein by reference in its entirety.

BACKGROUND OF THE INVENTION

Traditional retroreflective sheeting materials, such as those disclosed in U.S. Pat. Nos. 3,689,346, 3,712,706, and 3,810,804, the contents of which are incorporated herein by reference, are described as truncated solid corner-cube structures that are molded from tooling that comprises a plurality of element-forming cavities which produce corner-cube segments having substantially planar front major surfaces or truncated solid corner-cubes.

Traditional truncated corner-cube prisms have a base with three surfaces intercepting at an apex. As shown in FIG. 1, the prism is oriented such that an incident light ray 144 enters through the base 110, is reflected by the three corner-cube surfaces 112, and exits through the base 110, where it is emitted as retroreflected light ray 145.

Traditional full-square sided corner-cube retroreflective sheeting material, such as those of the types disclosed in U.S. Pat. Nos. 1,591,572, 1,807,350, 1,848,675, 2,055,298, 2,205,638, 3,069,721, 3,541,606, 3,833,285, 3,887,268, 3,894,790, 3,893,747, 3,894,786, 3,905,681, 3,923,378, 3,926,402, Re. 29396, U.S. Pat. Nos. 4,066,236, 4,066,331, 4,095,773, 6,015,214, 6,257,860, 6,318,978, 6,386,855, 6,447,878 and 6,533,887, the contents of which are incorporated herein by reference, are described as corner-cube structures that are molded from tooling that comprises a plurality of element-forming cavities which produce full-square-sided corner-cube segments. Traditional full square corner-cube prisms have a base with three surfaces intercepting at an apex. As shown in FIG. 2, the prisms are oriented such that the light ray 144 enters through the base 110 and is reflected by the three corner-cube surfaces 112. The base 110 may, for each individual full-square-sided corner cube, extend over a larger area than shown in FIG. 2. The retroreflected light ray is emitted as light ray 145 from the prism.

Assuming that the master tooling is diamond fly cut or machined and polished, solid truncated corner-cubes are produced from odd generation tooling, open-faced truncated corner-cubes are produced from even generation tooling and full-square-solid or open-faced corner-cubes are produced from either odd or even generation tooling. Sometimes "windage", or compensation, is put into the dihedral angles of the tooling master because the polymer used to form the corner-cubes will shrink slightly during cooling or curing. In this case, with traditional solid or open-faced full-square-sided corner-cubes, proper selection of the correct generation tooling to form the corner-cubes is important.

FIGS. 3A and 3B are a sectional side view and top view respectively of a section of a conventional two-sided open-faced retroreflective sheeting including metallized, corner-cube surfaces 112A, 112B. In this example, the sheeting substrate 116 is relatively thin. A specular, optical, or reflective coating 120, such as aluminum, silver or gold, is formed on the corner-cube surfaces 112A, 112B of the substrate 116. Preferably, optical coating 120A, 120B is permanently attached to the corner-cube surfaces 112A, 112B, and is not easily removed or worn therefrom. If aluminum is used as the reflective coating, a vacuum-deposited protective over coat of SiO (Silicon Monoxide) or $MgF_2$ (Magnesium Fluoride) is usually used to prevent the aluminum from oxidizing when exposed to air. In this manner, a first incident light ray R1, incident at a first surface 115A of the sheeting is retroreflected by the corner-cube surfaces 112A formed by the optical coating 120A on the first surface 115A of the sheeting, and a second incident light ray R2, incident at a second surface 115B of the sheeting is retroreflected by the corner-cube surfaces 112B formed by the optical coating 120B on the second surface 115B of the sheeting.

Conventional retroreflective sheeting of this type is made using a thin substrate material and has the disadvantage of requiring a relatively expensive specular reflective coating(s) on one or both sides of the part; otherwise the part will exhibit very little, for example, less than 0.1%, to no, retroreflection. Other types of two-sided retroreflectors are made with molded, transparent, either solid truncated or full-square-sided, corner-cube sheeting components that are assembled back-to-back, with the corner-cube apexes of one sheet facing the corner-cube apexes of the other sheet or back-to-back with an intermediate substrate layer between the corner-cube sheeting components. Such embodiments require complicated manufacturing techniques that add to product cost.

SUMMARY OF THE INVENTION

Embodiments of the present invention provide two-sided retroreflective sheeting, and related structures, which, in some embodiments, are unitarily fabricated from a common material, and which have full-square-sided corner-cubes or truncated corner-cubes or substantially parallel-walled corner-cubes, or an arrangement of some or all of these types of corner-cubes, which retroreflect in opposing directions. Embodiments are also directed to methods of formation of such sheeting and related structures. The embodiments find application in many different industries, and, in certain embodiments, can be molded in a single step using just one material. Variations of truncated corner-cubes, full-square-sided corner-cubes and parallel walled corner-cubes can all be provided within the resulting, retroreflective sheeting.

In one aspect, a retroreflector that retroreflects electromagnetic energy, comprises: a body of material, the body having a first surface and a second surface; a plurality of first full-square-sided corner-cube structures on the first surface of the body, the first full-square-sided corner-cube structures each having three facets that lie along planes that are orthogonal to each other; and a plurality of second full-square-sided corner-cube structures on the second surface of the body, the second full-square-sided corner-cube structures each having three facets that lie along planes that are orthogonal to each other; the body being constructed and arranged to be transparent to incident electromagnetic energy at a range of wavelengths and to have a thickness so that an incident electromagnetic energy ray that is incident at one of the first and second surfaces enters the body, and is redirected by both the first surface and the second surface so that both the first surface and the second surface contribute to retroreflection of the incident electromagnetic energy ray, and exits from the one of the first and second surfaces at which the incident electromagnetic energy ray was incident to emit a retroreflected electromagnetic energy ray of the incident electromagnetic energy ray.

In one embodiment, the body is further constructed and arranged so that an incident electromagnetic energy ray that is incident at one of the first and second surfaces enters the body by refraction, exits the other of the first and second surfaces by refraction, reenters the other of the first and second surfaces by refraction, and exits from the one of the first and second surfaces at which the incident electromagnetic energy ray was incident to emit a retroreflected electromagnetic energy ray of the incident electromagnetic energy ray.

In another embodiment, the incident electromagnetic energy ray that is incident at one of the first and second surfaces enters the body by refraction, is internally reflected by the other of the first and second surfaces, and exits from the one of the first and second surfaces at which the incident electromagnetic energy ray was incident to emit a retroreflected electromagnetic energy ray of the incident electromagnetic energy ray.

In another embodiment, at least a portion of the facets of the corner-cube structures of the first surface and the facets of the corner-cube structures of the second surface are substantially parallel, wherein proud apexes of the first corner-cube structures substantially align with recessed apexes of the second corner-cube structures and wherein proud apexes of the second corner-cube structures substantially align with recessed apexes of the first corner-cube structures in a vertical direction of the body.

In another embodiment, at least a portion of the facets of the corner-cube structures of the first surface and the facets of the corner-cube structures of the second surface are substantially parallel and wherein proud apexes of the first corner-cube structures and recessed apexes of the second corner-cube structures and proud apexes of the second corner-cube structures and recessed apexes of the first corner-cube structures are offset relative to each other in a horizontal direction of extension of the body.

In another embodiment, the corner-cube structures comprise at least one of open-faced corner-cube structures and solid corner-cube structures.

In another embodiment, the plurality of first corner-cube structures and the plurality of second corner-cube structures are each arranged in an array having a pitch that relates to a distance between neighboring corner-cube structures and wherein exit locations of at least some of the retroreflected electromagnetic energy ray are spaced apart from an entry location of the incident electromagnetic energy ray by a distance greater than the pitch of the array.

In another embodiment, the body thickness is selected so that the exit location of the retroreflected electromagnetic energy ray is located at a corner-cube structure that is different and spaced apart from a corner-cube structure at which an entrance location of the incident electromagnetic energy ray is positioned.

In another embodiment, the body thickness is selected so that the entry location of the incident electromagnetic energy ray and the exit location of the retroreflected electromagnetic energy ray are positioned in a same corner-cube structure.

In another embodiment, the body thickness is selected so that at certain entry locations, the incident electromagnetic energy ray enters the body by refraction at the one of the first and second surfaces, and exits from the other of the first and second surfaces by refraction so that the incident electromagnetic energy ray is transmitted through the body and not retroreflected.

In another embodiment, the retroreflector further comprises a wavelength-selective optical coating or a wavelength-selective color coating on a subset of at least one of the first and second corner-cube structures.

In another embodiment, the optical coating includes a specular coating.

In another embodiment, the specular coating comprises a material comprising at least one of a metal layer and one or more dielectric layers.

In another embodiment, the material of the body is selected from the group consisting of thermoplastic and thermoset polymers, glass and ceramic, that are at least one of: transparent to incident electromagnetic energy, wavelength-selective transparent to incident electromagnetic energy, or opaque to incident electromagnetic energy.

In another embodiment, the polymers further include a filler that is selected from the group consisting of: glass, carbon, ceramic, graphite, polymers, and metals.

In another embodiment, the body comprises an intermediate substrate and first and second top layers on opposed sides of the substrate, wherein the substrate comprises a material that is wavelength-selective transparent to the incident electromagnetic energy.

In another embodiment, the intermediate substrate has a wavelength-selective transparent coating applied to at least one surface thereof.

In another embodiment, the intermediate substrate, the first and second top layers, and boundaries therebetween are configured to be wavelength-selective transparent to incident electromagnetic energy at the range of wavelengths.

In another embodiment, the retroreflector further comprises an encapsulating material that surrounds the body of material of the retroreflector.

In another embodiment, a subset of at least one of the plurality of first corner-cube structures and plurality of second corner-cube structures includes flats in the regions of recessed apexes of the subset of corner-cube structures, the flats comprising a material that at least partially fills the subset of corner-cube structures.

In another embodiment, the material of the flats comprises one of: a material that is integral with the material of the body and a material that is applied to the material of the body.

In another embodiment, the flats are at an acute angle relative to a horizontal plane of the sheeting.

In another embodiment, the subset of the plurality of first corner-cube structures and plurality of second corner-cube structures are configured so that the body of the material in the region of the subset forms a retroreflective structure that operates as a truncated corner-cube structure to incident electromagnetic energy.

In another embodiment, the retroreflective structure that operates as a truncated corner-cube structure is configured to include: a flat on the first surface; a proud apex on the second surface comprising neighboring facets of adjacent open-faced second corner-cube structures; and a portion of the body of material between the flat on the first surface and the proud apex on the second surface.

In another embodiment, the truncated corner-cube structure operates as a full-square-sided truncated corner-cube structure to incident electromagnetic energy.

In another embodiment, a subset of the first or second corner-cube structures have recessed apexes that include modified surfaces, including at least one of flattened recessed apexes, flattened recessed apexes having marking features, recessed apexes having curved surfaces, recessed apexes having segmented surfaces, and recessed apexes having microstructured surfaces.

In another embodiment, a subset of the first or second corner-cube structures have proud apexes that include modified surfaces, including at least one of flattened proud apexes, flattened proud apexes having marking features, proud apexes having curved surfaces, proud apexes having segmented surfaces, and proud apexes having microstructured surfaces.

In another embodiment, a subset of the first or second corner-cube structures have facets that include modified surfaces, including marking features, curved surfaces, segmented surfaces, and microstructured surfaces.

In another embodiment, the first corner-cube structures are arranged along a first axis and wherein the second corner-cube structures are arranged along a second axis, and wherein the first and second axes are parallel to each other.

In another embodiment, the first corner-cube structures are arranged along a first axis and wherein the second corner-cube structures are arranged along a second axis, and wherein the first and second axes lie at an acute angle relative to each other.

In another embodiment, a first region of at least one of the plurality of first corner-cube structures and the plurality of second corner-cube structures is arranged along a first axis and wherein a second region of the at least one of the plurality of first corner-cube structures and the plurality of second corner-cube structures is arranged along a second axis and wherein the first and second axes of the first and second regions lie at an acute angle with respect to each other.

In another embodiment, the plurality of first corner-cube structures and the plurality of second corner-cube structures are each arranged in an array having a pitch that relates to a distance between neighboring corner-cube structures, and wherein a first pitch of the first corner-cube structures is different than a second pitch of the second corner-cube structures.

In another embodiment, the plurality of first corner-cube structures and the plurality of second corner-cube structures are each arranged in an array having a pitch that relates to a distance between neighboring corner-cube structures, and wherein a first pitch of a first region of the first corner-cube structures is different than a second pitch of the second region of the first corner-cube structures or wherein a first pitch of a first region of the second corner-cube structures is different than a second pitch of a second region of the second corner-cube structures.

In another embodiment, the body of material in a first region of the retroreflector has a first thickness that is different than a second thickness in the second region of the body of material.

In another aspect, a retroreflector that retroreflects electromagnetic energy comprises: a body of material, the body having a first surface and a second surface; a plurality of first full-square-sided corner-cube structures on the first surface of the body, the first full-square-sided corner-cube structures each having three facets that lie along planes that are substantially orthogonal to each other; and a plurality of second full-square-sided corner-cube structures on the second surface of the body, the second full-square-sided corner-cube structures each having three facets that lie along planes that are substantially orthogonal to each other; wherein at least a portion of the facets of the corner-cube structures of the first surface and the facets of the corner-cube structures of the second surface are substantially parallel and wherein the body is constructed and arranged to be transparent to incident electromagnetic energy at a range of wavelengths and to have a thickness so that an incident electromagnetic energy ray that is incident at a facet of a first corner-cube structure of one of the first and second surfaces enters the body by refraction at the facet of the first corner-cube structure of the one of the first and second surfaces, is internally reflected at least once at a facet of a first corner-cube structure of the other of the first and second surfaces, exits the other of the first and second surfaces by refraction, reenters the other of the first and second surfaces by refraction, is internally reflected at least once at a facet of a second corner-cube structure of the other of the first and second surfaces that is different than the first corner-cube structure of the other of the first and second surfaces, and exits the body by refraction at a facet of a second corner-cube structure of the one of the first and second surfaces that is different than the first corner-cube structure of the one of the first and second surfaces to emit a retroreflected electromagnetic energy ray of the incident electromagnetic energy ray.

In one embodiment, proud apexes of the first corner-cube structures substantially align with recessed apexes of the second corner-cube structures and wherein proud apexes of the second corner-cube structures substantially align with recessed apexes of the first corner-cube structures in a vertical direction of the body.

In another embodiment, proud apexes of the first corner-cube structures and recessed apexes of the second corner-cube structures and proud apexes of the second corner-cube structures and recessed apexes of the first corner-cube structures are offset relative to each other in a horizontal direction of extension of the body.

In another embodiment, parallel-walled retroreflection occurs when the incident electromagnetic energy ray enters the body by refraction at the facet of the first corner-cube structure of the one of the first and second surfaces and exits the body by refraction at the facet of the second corner-cube structure of the one of the first and second surfaces that is different than the first corner-cube structure of the one of the first and second surfaces, and truncated corner-cube retroreflection occurs when the incident electromagnetic energy ray enters the body by refraction at the first corner-cube structure of the one of the first and second surfaces, is internally reflected by facets of corner-cube structures of the other of the first and second surfaces and exits the body by refraction at the first corner-cube structure of the one of the first and second surface, and wherein parallel-walled retroreflection and truncated corner-cube retroreflection can occur for incident electromagnetic energy rays that are incident at a same first corner-cube structure.

In another embodiment, a subset of at least one of the plurality of first corner-cube structures and plurality of second corner-cube structures includes flats in the regions of recessed apexes of the subset of corner-cube structures, the flats comprising a material that at least partially fills the subset of corner-cube structures.

In another embodiment, the material of the flats is one of: a material that is integral with the material of the body and a material that is applied to the material of the body.

In another embodiment, the flats are at an acute angle relative to a horizontal plane of the sheeting.

In another embodiment, the subset of the plurality of first corner-cube structures and plurality of second corner-cube structures are configured so that the body of the material in the region of the subset forms a retroreflective structure that operates as a truncated corner-cube structure to incident electromagnetic energy.

In another embodiment, the retroreflective structure that operates as a truncated corner-cube structure is configured to include: a flat on the first surface; a proud apex on the second surface comprising neighboring facets of adjacent open-faced second corner-cube structures; and a portion of the body of material between the flat on the first surface and the proud apex on the second surface.

In another embodiment, the truncated corner-cube structure operates as a full-square-sided corner-cube structure to incident electromagnetic energy.

In another aspect, a linear retroreflector that retroreflects electromagnetic energy, comprises: a body of material, the body having a first surface and a second surface; a plurality of first linear prism structures on the first surface of the body, the first linear prism structures each having two facets that extend along planes that are substantially orthogonal to each other; and a plurality of second linear prism structures on the second surface of the body, the second linear prism structures each having two facets that lie along planes that are substantially orthogonal to each other; the body being constructed and arranged to be transparent to incident electromagnetic energy at a range of wavelengths and to have a thickness so that an incident electromagnetic energy ray that is incident at one of the first and second surfaces enters the body, and is redirected by both the first surface and the second surface so that both the first surface and the second surface contribute to retroreflection of the incident electromagnetic energy ray, and exits from the one of the first and second surfaces at which the incident electromagnetic energy ray was incident to emit a retroreflected electromagnetic energy ray of the incident electromagnetic energy ray.

In one embodiment, the body is further constructed and arranged so that an incident electromagnetic energy ray that is incident at one of the first and second surfaces enters the body by refraction, exits the other of the first and second surfaces by refraction, reenters the other of the first and second surfaces by refraction, and exits from the one of the first and second surfaces at which the incident electromagnetic energy ray was incident to emit a retroreflected electromagnetic energy ray of the incident electromagnetic energy ray.

In another embodiment, the incident electromagnetic energy ray that is incident at one of the first and second surfaces enters the body by refraction, is internally reflected by the other of the first and second surfaces, and exits from the one of the first and second surfaces at which the incident electromagnetic energy ray was incident to emit a retroreflected electromagnetic energy ray of the incident electromagnetic energy ray.

In another embodiment, at least a portion of the facets of the linear prism structures of the first surface and the facets of the linear prism structures of the second surface are substantially parallel, wherein proud apexes of the first linear prism structures substantially align with recessed apexes of the second corner-cube structures and wherein proud apexes of the second corner-cube structures substantially align with recessed apexes of the first linear prism structures in a vertical direction of the body.

In another embodiment, at least a portion of the facets of the linear prism structures of the first surface and the facets of the linear prism structures of the second surface are parallel and wherein proud apexes of the first linear prism structures and recessed apexes of the second linear prism structures and proud apexes of the second linear prism structures and recessed apexes of the first linear prism structures are offset relative to each other in a horizontal direction of extension of the body.

In another embodiment, the linear prism structures comprise at least one of open-faced linear prism structures and solid linear prism structures.

In another embodiment, the plurality of first linear prism structures and the plurality of second linear prism structures are each arranged in an array having a pitch that relates to a distance between neighboring linear prism structures and wherein exit locations of the retroreflected electromagnetic energy ray are spaced apart from an entry location of the incident electromagnetic energy ray by a distance greater than the pitch of the array.

In another embodiment, the body thickness is selected so that the exit location of the retroreflected electromagnetic energy ray is located at a linear prism structure that is different and spaced apart from a linear prism structure at which an entrance location of the incident electromagnetic energy ray is positioned.

In another embodiment, the body thickness is selected so that the entry location of the incident electromagnetic energy ray and the exit location of the retroreflected electromagnetic energy ray are positioned in a same linear prism structure.

In another embodiment, the body thickness is selected so that at certain entry locations, the incident electromagnetic energy ray enters the body by refraction at the one of the first and second surfaces, and exits from the other of the first and second surfaces by refraction so that the incident electromagnetic energy ray is transmitted through the body and not retroreflected.

In another aspect, a method of forming a retroreflector that retroreflects electromagnetic energy, comprises: providing a body of material, the body having a first surface and a second surface; providing a plurality of first full-square-sided corner-cube structures on the first surface of the body, the first full-square-sided corner-cube structures each having three facets that lie along planes that are orthogonal to each other; and providing a plurality of second full-square-sided corner-cube structures on the second surface of the body, the second full-square-sided corner-cube structures each having three facets that lie along planes that are orthogonal to each other; the body being constructed and arranged to be transparent to incident electromagnetic energy at a range of wavelengths and to have a thickness so that an incident electromagnetic energy ray that is incident at one of the first and second surfaces enters the body, and is redirected by both the first surface and the second surface so that both the first surface and the second surface contribute to retroreflection of the incident electromagnetic energy ray, and exits from the one of the first and second surfaces at which the incident electromagnetic energy ray was incident to emit a retroreflected electromagnetic energy ray of the incident electromagnetic energy ray.

In one embodiment, the body is further constructed and arranged so that an incident electromagnetic energy ray that is incident at one of the first and second surfaces enters the body by refraction, exits the other of the first and second surfaces by refraction, reenters the other of the first and second surfaces by refraction, and exits from the one of the first and second surfaces at which the incident electromagnetic energy ray was incident to emit a retroreflected electromagnetic energy ray of the incident electromagnetic energy ray.

In another embodiment, the incident electromagnetic energy ray that is incident at one of the first and second surfaces enters the body by refraction, is internally reflected by the other of the first and second surfaces, and exits from the one of the first and second surfaces at which the incident electromagnetic energy ray was incident to emit a retroreflected electromagnetic energy ray of the incident electromagnetic energy ray.

In another embodiment, at least a portion of the facets of the corner-cube structures of the first surface and the facets of the corner-cube structures of the second surface are substantially parallel, wherein proud apexes of the first corner-cube structures substantially align with recessed apexes of the second corner-cube structures and wherein proud apexes of the second corner-cube structures substantially align with recessed apexes of the first corner-cube structures in a vertical direction of the body.

In another embodiment, at least a portion of the facets of the corner-cube structures of the first surface and the facets of the corner-cube structures of the second surface are substantially parallel and wherein proud apexes of the first corner-cube structures and recessed apexes of the second corner-cube structures and proud apexes of the second corner-cube structures and recessed apexes of the first corner-cube structures are offset relative to each other in a horizontal direction of extension of the body.

In another embodiment, the corner-cube structures comprise at least one of open-faced corner-cube structures and solid corner-cube structures.

In another embodiment, the plurality of first corner-cube structures and the plurality of second corner-cube structures are each arranged in an array having a pitch that relates to a distance between neighboring corner-cube structures and wherein exit locations of at least some of the retroreflected electromagnetic energy ray are spaced apart from an entry location of the incident electromagnetic energy ray by a distance greater than the pitch of the array.

In another embodiment, the body thickness is selected so that the exit location of the retroreflected electromagnetic energy ray is located at a corner-cube structure that is different and spaced apart from a corner-cube structure at which an entrance location of the incident electromagnetic energy ray is positioned.

In another embodiment, the body thickness is selected so that the entry location of the incident electromagnetic energy ray and the exit location of the retroreflected electromagnetic energy ray are positioned in a same corner-cube structure.

In another embodiment, the body thickness is selected so that at certain entry locations, the incident electromagnetic energy ray enters the body by refraction at the one of the first and second surfaces, and exits from the other of the first and second surfaces by refraction so that the incident electromagnetic energy ray is transmitted through the body and not retroreflected.

In another embodiment, the method further comprises providing a wavelength-selective optical coating or a wavelength-selective color coating on a subset of at least one of the first and second corner-cube structures.

In another embodiment, the optical coating includes a specular coating.

In another embodiment, the specular coating comprises a material comprising at least one of a metal layer and one or more dielectric layers.

In another embodiment, the material of the body is selected from the group consisting of thermoplastic and thermoset polymers, glass and ceramic, that are at least one of: transparent to incident electromagnetic energy, wavelength-selective transparent to incident electromagnetic energy, or opaque to incident electromagnetic energy.

In another embodiment, the polymers further include a filler that is selected from the group consisting of: glass, carbon, ceramic, graphite, polymers, and metals.

In another embodiment, providing the body comprises providing an intermediate substrate and first and second top layers on opposed sides of the substrate, wherein the substrate comprises a material that is wavelength-selective transparent to the incident electromagnetic energy.

In another embodiment, the method further comprises providing a wavelength-selective transparent coating on at least one surface of the intermediate substrate.

In another embodiment, the intermediate substrate, the first and second top layers, and boundaries therebetween are configured to be wavelength-selective transparent to incident electromagnetic energy at the range of wavelengths.

In another embodiment, the method further comprises providing an encapsulating material that surrounds the body of material of the retroreflector.

In another embodiment, the body is formed by at least one of casting, embossing, injection molding, compression molding and thermoforming.

In another embodiment, a subset of at least one of the plurality of first corner-cube structures and plurality of second corner-cube structures includes flats in the regions of recessed apexes of the subset of corner-cube structures, the flats comprising a material that at least partially fills the subset of corner-cube structures.

In another embodiment, the material of the flats comprises a material that is integral with the material of the body and wherein the body including the flats is formed by at least one of casting, embossing, injection molding, compression molding and thermoforming.

In another embodiment, the material of the flats comprises a material that is applied to the material of the body.

In another embodiment, the flats are at an acute angle relative to a horizontal plane of the sheeting.

In another embodiment, the method further comprises providing the subset of the plurality of first corner-cube structures and plurality of second corner-cube structures so that the body of the material in the region of the subset forms a retroreflective structure that operates as a truncated corner-cube structure to incident electromagnetic energy.

In another embodiment, the retroreflective structure that operates as a truncated corner-cube structure is configured to include: a flat on the first surface; a proud apex on the second surface comprising neighboring facets of adjacent open-faced second corner-cube structures; and a portion of the body of material between the flat on the first surface and the proud apex on the second surface.

In another embodiment, the truncated corner-cube structure operates as a full-square-sided corner-cube structure to incident electromagnetic energy.

In another embodiment, a subset of the first or second corner-cube structures have recessed apexes that include modified surfaces, including at least one of flattened recessed apexes, flattened recessed apexes having marking features, recessed apexes having curved surfaces, recessed apexes having segmented surfaces, and recessed apexes having microstructured surfaces.

In another embodiment, a subset of the first or second corner-cube structures have proud apexes that include modified surfaces, including at least one of flattened proud apexes, flattened proud apexes having marking features, proud apexes having curved surfaces, proud apexes having segmented surfaces, and proud apexes having microstructured surfaces.

In another embodiment, a subset of the first or second corner-cube structures have facets that include modified surfaces, including marking features, curved surfaces, segmented surfaces, and microstructured surfaces.

In another embodiment, the first corner-cube structures are arranged along a first axis and wherein the second corner-cube structures are arranged along a second axis, and wherein the first and second axes are parallel to each other.

In another embodiment, the first corner-cube structures are arranged along a first axis and wherein the second corner-cube structures are arranged along a second axis, and wherein the first and second axes lie at an acute angle relative to each other.

In another embodiment, a first region of at least one of the plurality of first corner-cube structures and the plurality of second corner-cube structures is arranged along a first axis and wherein a second region of the at least one of the plurality of first corner-cube structures and the plurality of second corner-cube structures is arranged along a second axis and wherein the first and second axes of the first and second regions lie at an acute angle with respect to each other.

In another embodiment, the plurality of first corner-cube structures and the plurality of second corner-cube structures are each arranged in an array having a pitch that relates to a distance between neighboring corner-cube structures, and wherein a first pitch of the first corner-cube structures is different than a second pitch of the second corner-cube structures.

In another embodiment, the method further comprises arranging each of the plurality of first corner-cube structures and the plurality of second corner-cube structures in an array having a pitch that relates to a distance between neighboring corner-cube structures, and wherein a first pitch of a first region of the first corner-cube structures is different than a second pitch of the second region of the first corner-cube structures or wherein a first pitch of a first region of the second corner-cube structures is different than a second pitch of a second region of the second corner-cube structures.

In another embodiment, the body of material in a first region of the retroreflector has a first thickness that is different than a second thickness in the second region of the body of material.

In another aspect, a method of forming a linear retroreflector that retroreflects electromagnetic energy, comprises: providing a body of material, the body having a first surface and a second surface; providing a plurality of first linear prism structures on the first surface of the body, the first linear prism structures each having two facets that extend along planes that are substantially orthogonal to each other; and providing a plurality of second linear prism structures on the second surface of the body, the second linear prism structures each having two facets that lie along planes that are substantially orthogonal to each other; the body being constructed and arranged to be transparent to incident electromagnetic energy at a range of wavelengths and to have a thickness so that an incident electromagnetic energy ray that is incident at one of the first and second surfaces enters the body, and is redirected by both the first surface and the second surface so that both the first surface and the second surface contribute to retroreflection of the incident electromagnetic energy ray, and exits from the one of the first and second surfaces at which the incident electromagnetic energy ray was incident to emit a retroreflected electromagnetic energy ray of the incident electromagnetic energy ray.

In one embodiment, the body is further constructed and arranged so that an incident electromagnetic energy ray that is incident at one of the first and second surfaces enters the body by refraction, exits the other of the first and second surfaces by refraction, reenters the other of the first and second surfaces by refraction, and exits from the one of the first and second surfaces at which the incident electromagnetic energy ray was incident to emit a retroreflected electromagnetic energy ray of the incident electromagnetic energy ray.

In another embodiment, the incident electromagnetic energy ray that is incident at one of the first and second surfaces enters the body by refraction, is internally reflected by the other of the first and second surfaces, and exits from the one of the first and second surfaces at which the incident electromagnetic energy ray was incident to emit a retroreflected electromagnetic energy ray of the incident electromagnetic energy ray.

In another embodiment, at least a portion of the facets of the linear prism structures of the first surface and the facets of the linear prism structures of the second surface are substantially parallel, wherein proud apexes of the first linear prism structures substantially align with recessed apexes of the second corner-cube structures and wherein proud apexes of the second corner-cube structures substantially align with recessed apexes of the first linear prism structures in a vertical direction of the body.

In another embodiment, at least a portion of the facets of the linear prism structures of the first surface and the facets of the linear prism structures of the second surface are parallel and wherein proud apexes of the first linear prism structures and recessed apexes of the second linear prism structures and proud apexes of the second linear prism structures and recessed apexes of the first linear prism structures are offset relative to each other in a horizontal direction of extension of the body.

In another embodiment, the linear prism structures comprise at least one of open-faced linear prism structures and solid linear prism structures.

In another embodiment, the plurality of first linear prism structures and the plurality of second linear prism structures are each arranged in an array having a pitch that relates to a distance between neighboring linear prism structures and wherein exit locations of the retroreflected electromagnetic energy ray are spaced apart from an entry location of the incident electromagnetic energy ray by a distance greater than the pitch of the array.

In another embodiment, the body thickness is selected so that the exit location of the retroreflected electromagnetic energy ray is located at a linear prism structure that is different and spaced apart from a linear prism structure at which an entrance location of the incident electromagnetic energy ray is positioned.

In another embodiment, the body thickness is selected so that the entry location of the incident electromagnetic energy ray and the exit location of the retroreflected electromagnetic energy ray are positioned in a same linear prism structure.

In another embodiment, the body thickness is selected so that at certain entry locations, the incident electromagnetic energy ray enters the body by refraction at the one of the first and second surfaces, and exits from the other of the first and second surfaces by refraction so that the incident electromagnetic energy ray is transmitted through the body and not retroreflected.

In another embodiment, the body is formed by at least one of casting, embossing, injection molding, compression molding and thermoforming.

BRIEF DESCRIPTION OF THE DRAWINGS

The foregoing and other objects, features and advantages of the embodiments of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the disclosure. In the drawings:

FIG. 23 is another experimental image of an open-faced retroreflective sheeting embodiment as illuminated by a 632.8 nm light source.

FIG. 24 includes experimental images of the retroreflected light from the same array as in FIG. 23 as projected on an imaging screen which is located 4 meters from the retroreflective sheeting.

FIG. 31 includes images of the light distribution created by two substantially parallel-walled embodiments, each including two equal-sized, solid, truncated corner-cube structures, wherein the embodiment producing the second image is rotated ninety degrees with respect to the embodiment producing the first image.

FIG. 32 is an image of the light distribution created by the substantially parallel-walled embodiment including two solid truncated corner-cube structures of different sizes, in accordance with an embodiment of the present invention.

DETAILED DESCRIPTION OF EMBODIMENTS

Figure 1:
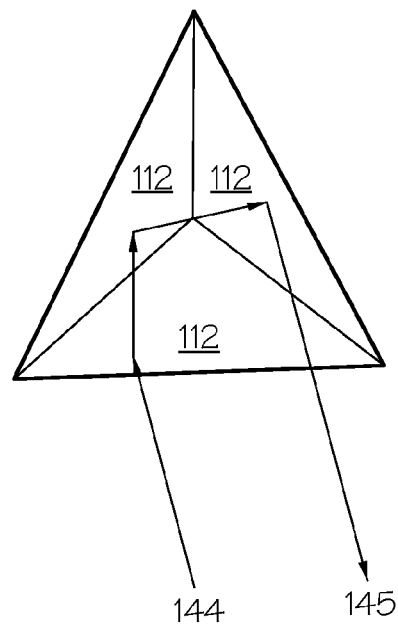
FIG. 1 is a front view of a conventional truncated corner-cube prism.
Figure 2:
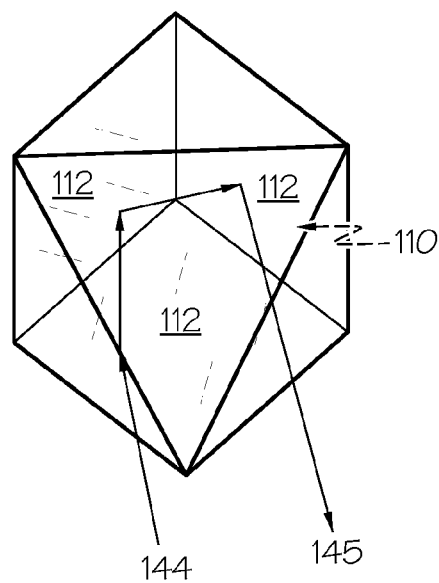
FIG. 2 is a front view of a conventional solid full-square-sided corner-cube prism.
Figure 3A:
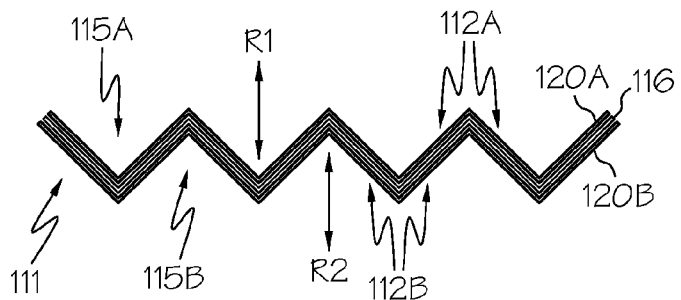
FIGS. 3A and 3B are a sectional side view and top view respectively of a section of a conventional open-faced retroreflective sheeting including metallized corner-cube surfaces.
Figure 3B:
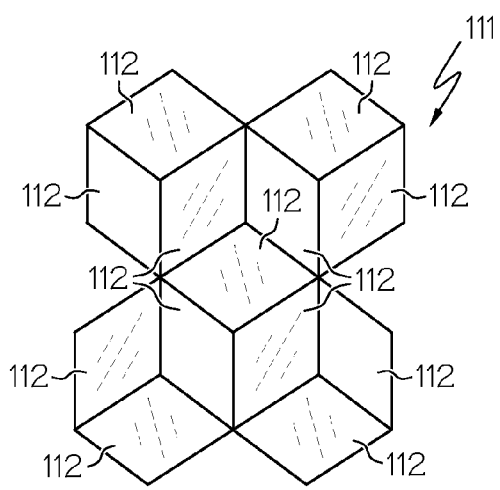

Embodiments of the present invention will now be described more fully hereinafter with reference to the accompanying drawings, in which preferred embodiments of the invention are shown. This invention may, however, be embodied in different forms and should not be construed as limited to the embodiments set forth herein. Like numbers refer to like elements throughout the specification.

It will be understood that, although the terms first, second, etc. are used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Parallel walled retroreflection as described in embodiments of the present specification is not typical of conventional retroreflectors. Conventional corner-cube retroreflectors rely on reflection from the three reflecting facets of each corner-cube to return the light on a path in a direction parallel to the direction that the light came from. In addition, conventional corner-cube retroreflectors return light beams that are divergent based upon the error introduced into the three dihedral angles, the reflecting facets and diffraction caused by the size of the effective aperture of the individual corner-cubes. In contrast, in certain embodiments of the present specification, the parallel walled retroreflector uses the corner-cube facets of more than one corner-cube structure to retroreflect the light from either side of the part. In some cases, many of the corner-cubes within the array of corner-cubes participate in the retroreflection of the incident light beam and the retroreflected beam may emerge from more than one point within the array. In addition the parallel walled retroreflector embodiments of the present invention can include solid or open faced truncated corner-cubes and solid or open faced full-square-sided corner-cubes.

The term "parallel walled", as used herein for purposes of the present description, includes embodiments of retroreflective sheeting wherein first and second walls or surfaces run generally parallel to each other, but are not necessarily perfectly, or completely, parallel, but rather are substantially, or primarily parallel. For example, in some embodiments, the corner-cubes of the upper and lower surfaces of the sheeting can have pitches that are different, and therefore, in this instance, the walls are not perfectly parallel in those regions of differing pitch. Also, in some instances, the first and second walls can include flattened proud apexes or flats in the corners, in which case, the walls are considered to be primarily or substantially parallel, but not entirely parallel. For purposes of the present disclosure, the term "parallel walled" is meant to include these, and other examples of retroreflective sheeting configurations.

At first consideration, the parallel walled retroreflector embodiments of the present invention appear to be relatively difficult to manufacture because of the need to use odd and even generation tooling in a single process and also the need to register to the tooling. The latter problem of registering the tooling proves out to be only a minor consideration, as the tooling only requires rough registration. The self-centering of the odd and even generation tooling that occurs as the tools are pressed through a thermo plastic (which when molten has non-Newtonian flow) allows near perfect parts to be formed during each molding cycle. The forming of the two-sided parallel walled sheeting is easily performed with compression molding, injection molding, thermoforming and radiant and thermal curing processes. Combinations of thermoforming and compression molding and radiation or thermal cure processes in continuous or batch processes and with many types of common materials may be used. Modern web and roll registration capabilities on continuous-process roll-to-roll manufacturing machines also make registration much easier to control than in the past. The use of odd and even generation tooling is also not a disadvantage. Typically the even generation or odd generation tooling that is not used to make conventional corner-cube sheeting sits in storage and is not used. Both the odd and even generation tooling can be used to make the parallel walled retroreflector embodiments disclosed herein. The dihedral angle error introduced into the tooling to optimize the final part optical performance for each side of the retroreflector will determine which odd and even generation tooling is used in the manufacturing process.

Figure 4:
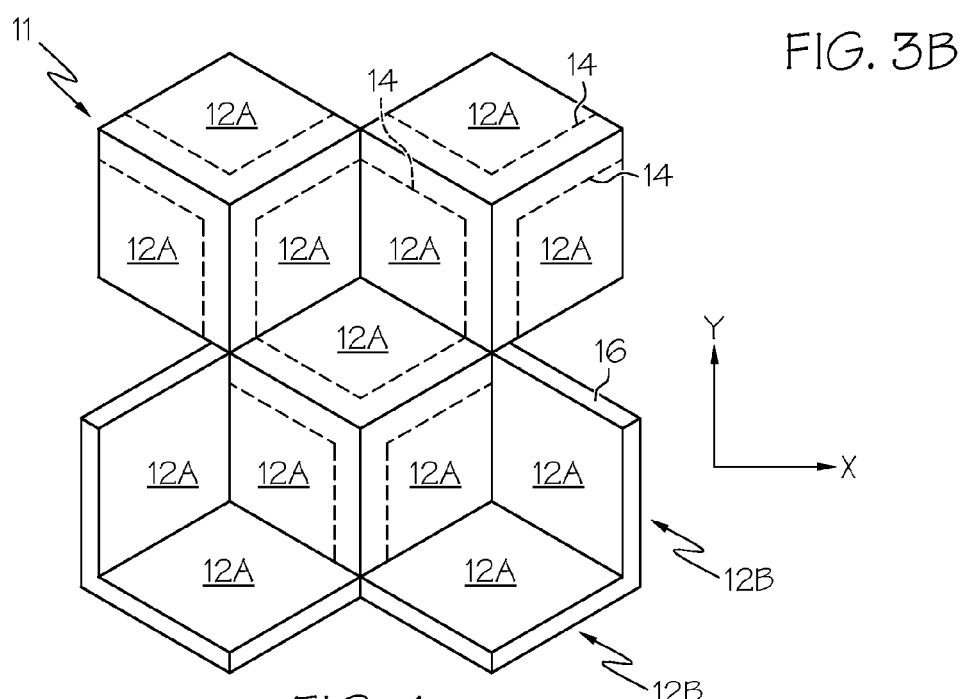
FIG. 4 is a top view of an open-faced retroreflective sheeting in accordance with an embodiment of the present invention.
Figure 5:
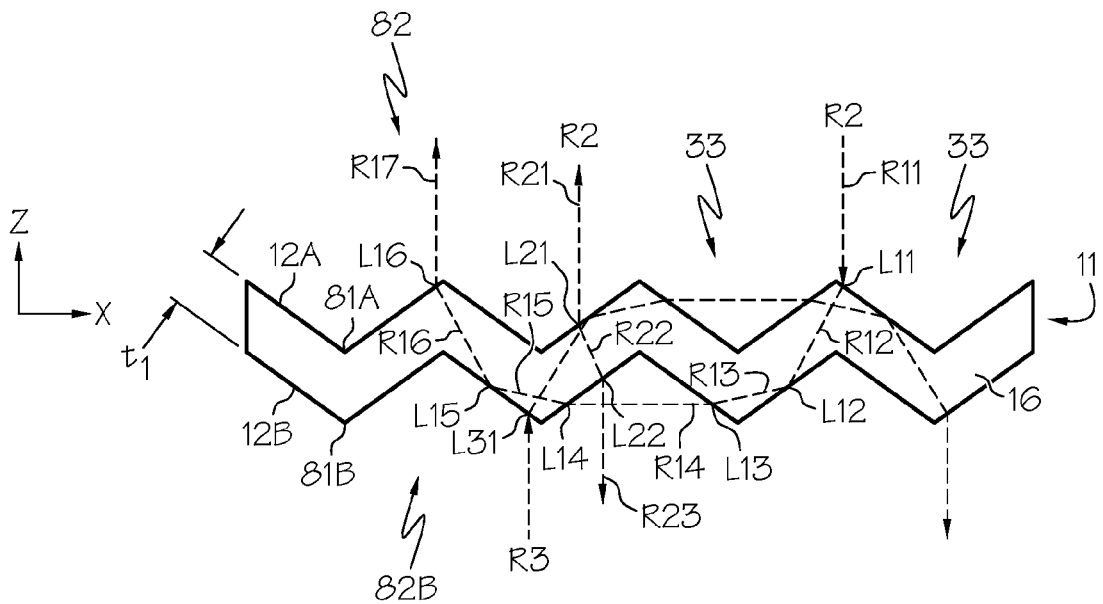
FIG. 5 is a cross-sectional side view of an open-faced retroreflective sheeting in accordance with another embodiment of the present invention.

FIGS. 4 and 5 are perspective-top and side views, respectively, of an open-faced retroreflective sheeting in accordance with an embodiment of the present invention. A body of material 16 is shaped to include opposing first and second full-square-sided open-faced corner-cube surfaces 12A, 12B. The body 16 has a thickness $t_1$ that is generally uniform throughout the body 16 such that the first and second corner-cube surfaces 12A, 12B are parallel to each other. In this manner, convex, or proud, apexes of corner-cubes of the upper surface 12A are aligned, in a horizontal direction, with concave, or recessed, apexes of the corner-cubes of the lower surface 12B, and vice versa. Together, the body 16, and the first and second corner-cube surfaces 12A, 12B provided thereon, combine to provide a retroreflective sheeting 11.

The term "apex" refers to an intersection point of three adjacent corner-cube surfaces; the "proud" apex being an apex that intersects surfaces of adjacent corner-cubes, and the "recessed" apex being an apex that intersects three surfaces of a same corner-cube. A "proud" apex is a convex apex in that it juts out, or extends, from the body of the sheeting, while a "recessed" apex is a concave apex that lies in a recess of the body of the sheeting. The term "aligned", when referring to the proud and recessed apexes of corner-cube features of the first and second corner-cube surfaces 12A, 12B means that the proud apex of a corner-cube feature on a first surface 12A and a recessed apex of a corner-cube feature on a second surface 12B, have substantially the same spatial position in first and second horizontal directions of the retroreflective sheeting, with one apex lying substantially directly above the other in a vertical direction, for example along the Y axis, of the retroreflective sheeting, relative to the horizontal direction, for example, along the X axis. For example, with reference to FIG. 5, the recessed apex 81A of corner-cube feature 82A on the first corner-cube surface 12A of the sheeting is depicted as being "aligned" with the proud apex 81B on the second corner-cube feature 82B on the second corner-cube surface 12B of the sheeting. When referring to the proud and recessed apexes of corner-cubes of opposite surfaces as being "aligned", this meaning is meant to include configurations where the apexes are not perfectly aligned in a horizontal direction, but rather are substantially aligned, or primarily aligned, for example, to accommodate imperfections in the tooling or fabrication process. In addition, the apexes of the corner-cubes of opposite surfaces can be considered to be aligned in cases where the pitches of the first and second corner cube structures of the first and second surfaces are the same, or different.

The transparent material of the body 16 can comprise, for example, a formed molten thermoplastic polymer, thermoset liquid, biodegradable polymer, glass or ceramic material that is cooled or cured. The material can be comprised of a variety of materials that are transparent or preferentially transparent to incident light including ultraviolet, visible or infrared and in general electromagnetic radiation of all types. In various embodiments, the material of the body 16 can contain wavelength—selective transmission dyes or pigments that provide a visualization of color or that provide a selective wavelength transmission of light. The material body 16 can also contain fluorescing dyes or pigments plus light stabilizers such as hindered amine light stabilizers to lengthen the fluorescing life of the material.

In one embodiment, the substantially transparent material of the body 16 is selected from a group of materials consisting of thermoplastic and thermoset polymers. In another embodiment the structure may be made of glass or ceramic materials. The material can further include fillers, such as glass, carbon, graphite, fibers, and glass-filled composites. The material can further be composed of a single or multilayer polymer sheet which is formed into the shape of two-sided open faced corner-cube sheeting. The multilayer sheet may provide color or selective wavelength reflection or transmission properties.

The material may be transparent, semitransparent or opaque to specific wavelengths of electromagnetic radiation. The materials used may include high and low modulus of elasticity materials. In applications where a fill or encasing material are used in combination with the body, or base, materials, for example in accordance with the embodiments described herein, the fill or encasing materials can also comprise either a high or low modulus material depending on the application. The corner-cube structure material and the fill or inclosing material respectively may have modulus of elasticity combinations that are high/high, low/low, high/low or low/high, with any combination of elastic modulus. The final product may include any combination of structure and fill or encasing materials in adjacent positions or stacked or layered positions within the product. The sheeting body can consist of multiple layers of retroreflective sheeting of the embodiment or include layers of other designs of retroreflective sheeting. The layers may be stacked or bonded together with transparent or opaque adhesives. The sheeting may alternatively be formed of multiple layers of materials including polymers, glass and ceramic and biodegradable materials having different indexes of refraction or of multiple layers of material which also include metal and oxide layers. Light tunneling, reflection and retroreflection are present in some or all layers depending on the difference in the reflective properties at the boundaries between the materials. The sheeting body may also optionally contain micro holes or micro apertures to allow light, gas or moisture to pass through. Flat or curved surfaces may be included for directing light from photoluminescent and/or electronically powered light sources such as LEDs. Light sources such as LEDs may also be positioned within the micro holes or within the sheeting body. The micro holes may also serve to scatter or reflect light in a controlled way. In some cases it is beneficial to form the sheeting body absent of air or gas bubbles to reduce the glow effect and to narrow the retroreflected light distribution.

Figure 6:
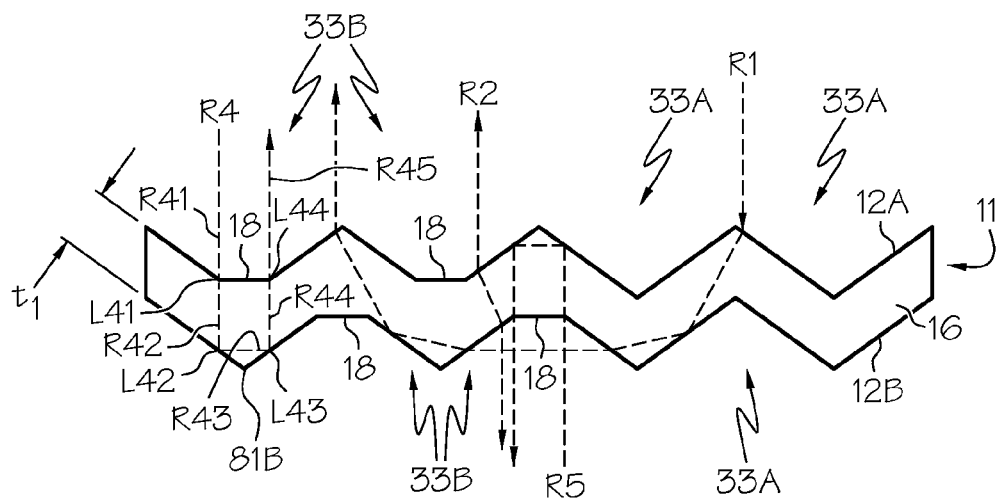
FIG. 6 is a cross-sectional side view of an open-faced retroreflective sheeting in accordance with another embodiment of the present invention.

In the embodiment of FIGS. 4 and 5, the first and second corner-cube surfaces 12A, 12B are aligned with respect to one another so as to retroreflect a first incoming light ray R1 in a direction that is substantially parallel to an incoming entrance angle of the incoming light ray. In one embodiment, the surfaces are linear, and the three surfaces of each corner-cube are disposed at substantially 90 degree orientations with respect to each other. Although only a few corner-cube units are shown in the illustrations of FIGS. 5 and 6, the body 16 can extend in first and second directions of extension x, y (see FIG. 4) to include an array of hundreds, or thousands, of back-to-back corner-cube surfaces 12A, 12B that are aligned in the first and second directions.

In one embodiment, the first and second surfaces 12A, 12B each comprise full-square-sided open-faced corner-cube surfaces 33, which are three facets disposed at substantially 90 degrees to one another, in a manner similar to traditional corner-cube prisms. In one embodiment, the apexes, whether proud or recessed, of the surfaces 12 are spaced preferably with a pitch in the range of between about 25.4 and 1016 um (0.001 and 0.040 inches). In this example, the first incoming light ray, such as input light segment R11 of incident light ray R1, reflects, refracts, and/or internally reflects, depending on a position of the section of the surface at which the ray is incident, off of the surfaces and through the body 16 of the sheeting 11, such that the outgoing light segment R17 is substantially parallel to the input light segment R11, regardless of the entrance angle.

Figure 18:
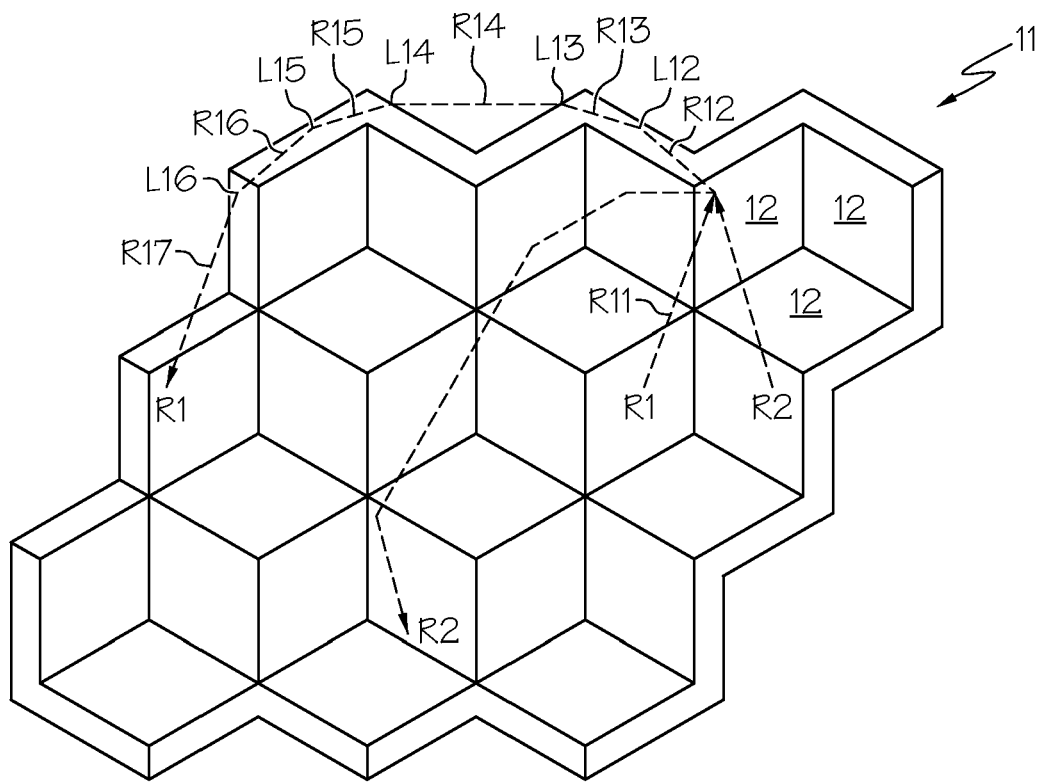
FIG. 18 is a top view of an open-faced retroreflective sheeting illustrating that some incident light, incident at a first location, is retroreflected and emerges from one area of the retroreflector and some light is incident at the same first location, is redirected, and retroreflects, emerging from another area of the retroreflector in accordance with embodiments of the present invention.

For example, in the illustration of FIG. 5, the incident light ray segment R11 of light ray R1 is incident on the retroreflective sheeting 11 at location L1 of the first surface 12A, and refracts at the first surface 12, becoming light ray segment R12. Light ray segment R12 is totally internally reflected at location L12 of the second surface 12B to become light ray segment R13 which is then refracted at location L13 of the second surface 12B becoming light ray segment R14. Light ray segment R14 exits the body 16 at the second surface 12B, and again refracts at location L14 of the second surface 12B to become light ray segment R15, which re-enters the body 16 at location L14. The light ray segment R15 totally internally reflects at location L15 of the second surface 12B to become light ray segment R16 which refracts at the location L16 to become light ray segment R17. Light ray segment R17 exits the body 16 in a direction substantially parallel to the incident light ray segment R11. A three-dimensional view of the propagation of the light ray R1 is provided in FIG. 18 as light ray R1. The path of propagation of a light ray through the sheeting 11 can depend on many factors, including the position of incidence of the light ray, the angle of incidence, and the part thickness. For example, with reference to FIG. 18, which is a perspective view of the retroreflective sheeting 11 of FIG. 5, light ray R1 of FIG. 18 follows the same light path as described above for R1 in FIG. 5. However, light ray R2 of FIG. 18 shows a different light path of propagation for light incident at the same point as light ray R1 but at a different entrance angle. Light ray R2 emerges also as a retroreflected light ray, but follows a different path through the sheeting 11 and exits the sheeting at a different location. The thickness of the part will determine how many internal reflections, such as at L12 and L15, take place off of surfaces 12A and 12B as the light propagates through the retroreflective structure.

Returning to FIG. 5, in a similar manner, the front-to-back symmetry of first and second surfaces 12A, 12B will cause incident light ray R3, which is incident at the second surface 12B of the retroreflective sheeting 11 at location L31, to follow a similar path through the retroreflective sheeting 11. However, incident light ray R3 enters and exits the sheeting 11 from the opposite, second surface 12B of the body 16.

As mentioned above, the location at which a light ray is incident, as well as the angle of incidence of the light ray will determine its behavior as it propagates through the body. Other factors can have an equal optical effect, for example, incident light ray segment R21 of light ray R2 is incident at location L21 of the first surface 12A at an angle of incidence such that it is refracted into the body to become light ray segment R22. Light ray segment R22 is in turn incident at location L22 of the second surface 12B at an angle of incidence such that it exits the body 16 at location L22 to become light ray segment R23. In this manner, light ray R2 travels directly through the body 16 of the sheeting 11 when incident from either side as shown by the propagation of light rays R21, R22 and R23. Under these conditions, the parallel-walled retroreflector operates like a simple window allowing light to pass directly through the part. This characteristic is beneficial for constructing products that are designed to be "see through", as well as retroreflective products. That is, the color and/or shape of an object that is behind the retroreflective part can be readily distinguished. This property is particularly useful for security applications where an underlying image may be made to be visible at certain wavelengths of light but not at other wavelengths, by constructing the part out of selective wavelength materials or by using selective wavelength coatings on the surfaces of the part. Another application is for use as a privacy screen or paparazzi screen. A person in an automobile for example can see through the part to see images on the other side of the part, but a flash photograph could not be taken through the part because the part will retroreflect enough light to overexpose the image.

Figure 21:
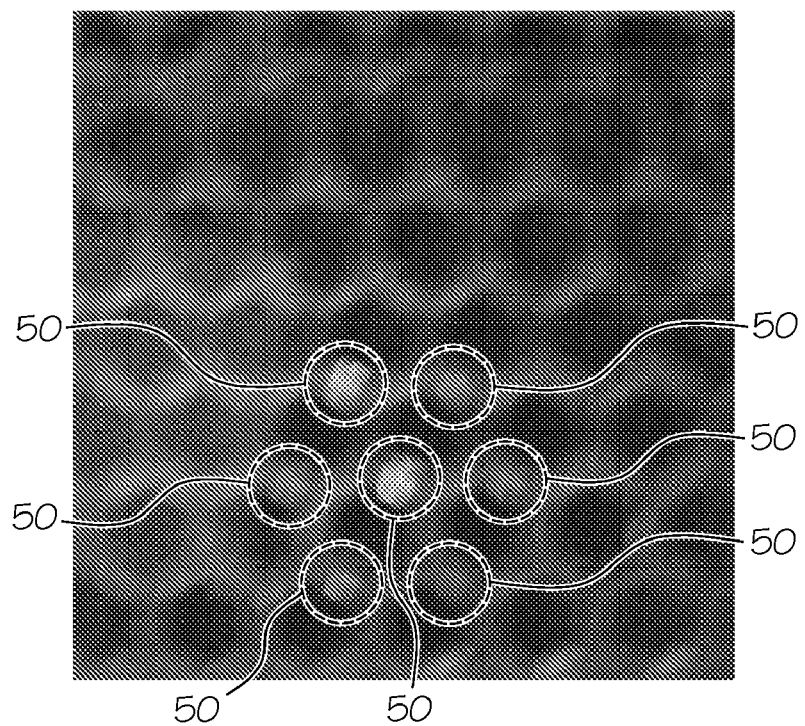
FIG. 21 is an experimental image of an open-faced retroreflective sheeting embodiment as illuminated by a 632.8 nm light source.
Figure 22:
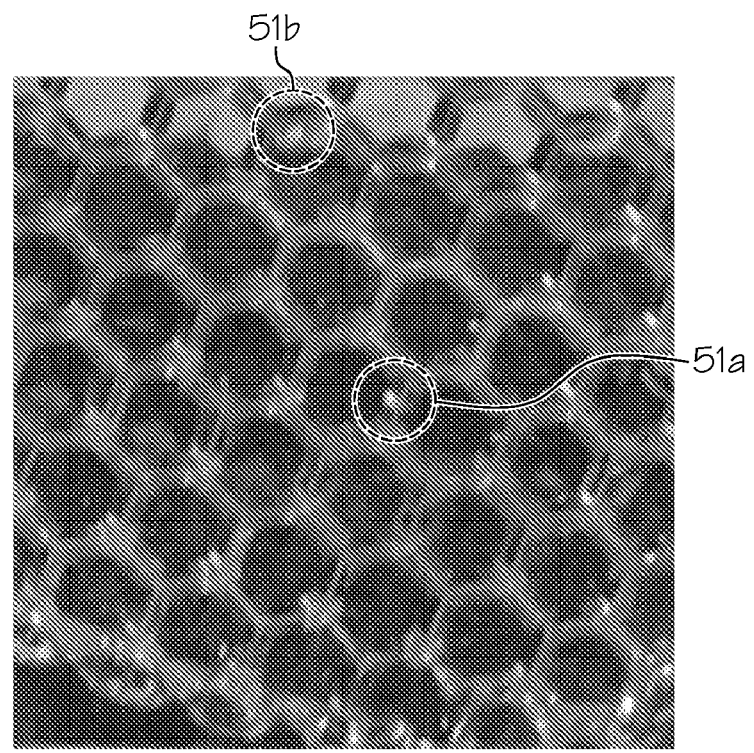
FIG. 22 is another experimental image of an open-faced retroreflective sheeting embodiment as illuminated by a 632.8 nm light source.

Many of the light ray paths through the substantially parallel walled full square corner-cube retroreflector array are much more complex than that shown in FIG. 5 or FIG. 6 as is indicated by light ray R2 in FIG. 18 and as demonstrated in the images of FIGS. 21, 22 and 23. Such paths can include: 1) light paths that refract into the body, and then back out of the body at the surface of entry (for example, rays R1 and R3 of FIG. 5 enter and exit the body at different spatial positions, and at different corner-cube positions, while rays R4 and R5 of FIG. 6 enter and exit the body at different spatial positions, but at the same corner-cube position); and 2) light paths that refract straight through the body, for example, ray R2 of FIG. 5.

In general there are numerous possible light paths that result from light entering the part at different locations and different angles of incidence at each location. Light paths which result in retroreflection are the following:

Parallel walled retroreflection relying solely on total internal reflection and refraction, where no reflective coatings are used (as in rays R1 and R3 in FIG. 5)

Parallel walled retroreflection relying partially on total internal reflection and refraction, where reflective coatings are used in select regions of the sheeting (as in ray R1', equivalent to ray R1 of FIG. 5, shown in FIG. 9 below)

Figure 34:
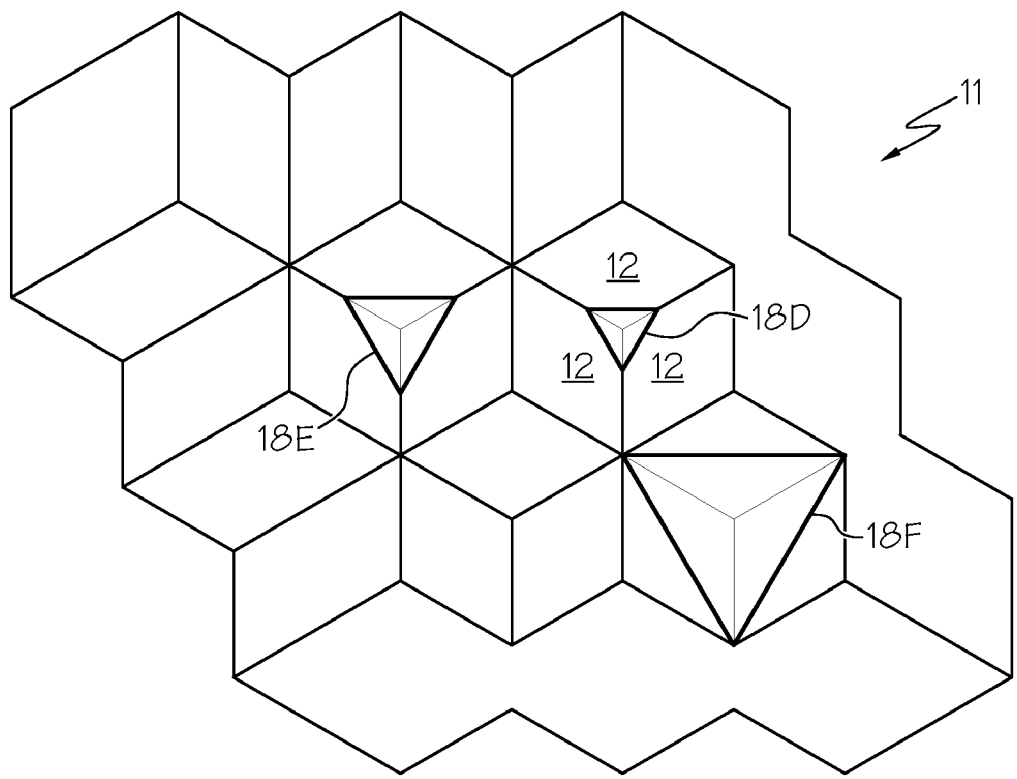
FIG. 34 is a back side top view of the open-faced retroreflective sheeting of FIG. 33 flipped right to left, wherein a second surface thereof also includes three solid truncated corner-cube structures of different sizes, in accordance with an embodiment of the present invention.
Figure 35:
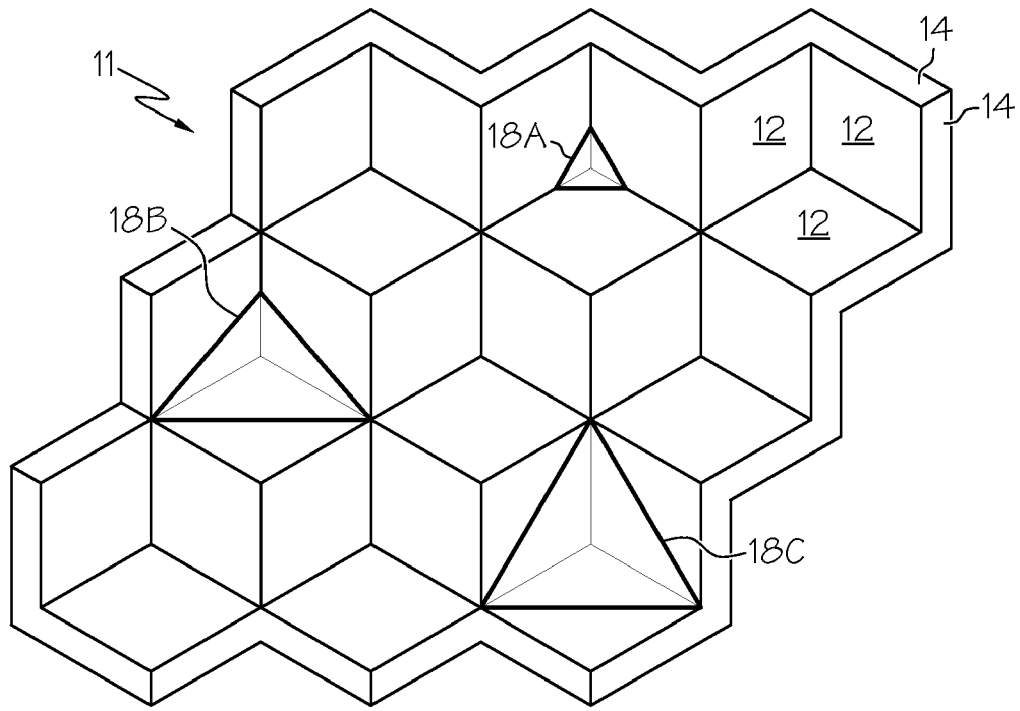
FIG. 35 is a top view of an open-faced retroreflective sheeting embodiment including three solid truncated corner-cube structures of different sizes on a first surface thereof in which one of the three solid truncated corner-cube structures has reflecting facets of different sizes, in accordance with an embodiment of the present invention.
Figure 36:
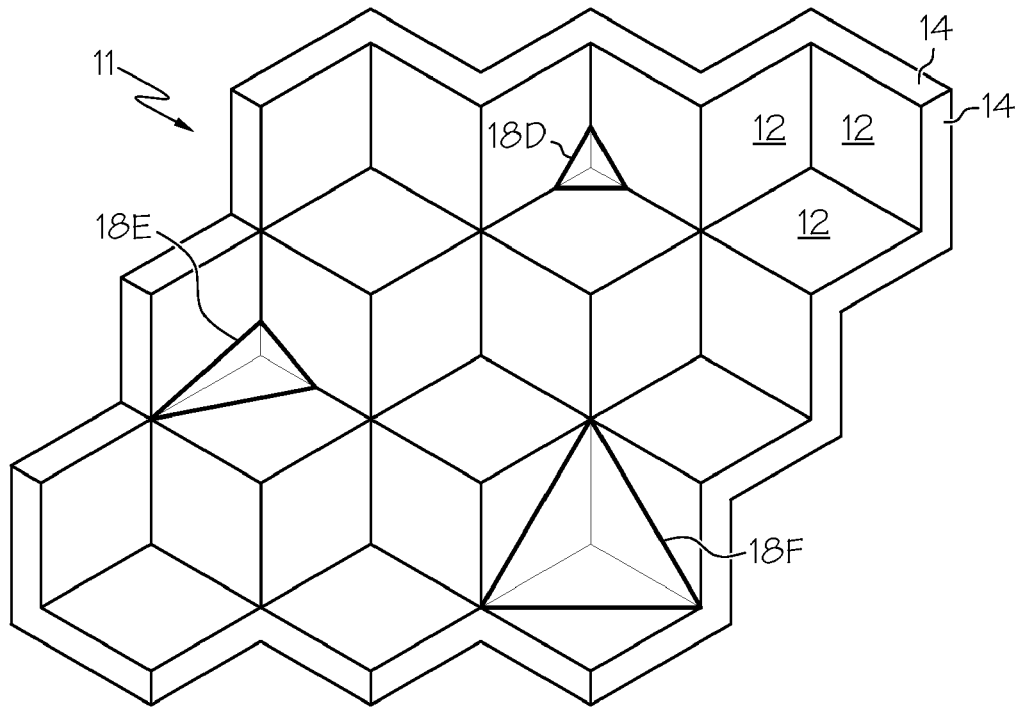
FIG. 36 is a top view of an open-faced retroreflective sheeting embodiment including three solid truncated corner-cube structures of different sizes on a first surface thereof in which one of the three solid truncated corner-cubes has reflecting facets of different sizes, in accordance with another embodiment of the present invention.

Solid truncated corner-cube(s) retroreflection with corner cubes which may be canted or tilted relying on total internal reflection, where no reflective coatings are used (as in rays R4 and R5 in FIG. 6 and the solid truncated corner-cubes shown in FIG. 34 and FIG. 35)

Figure 9:
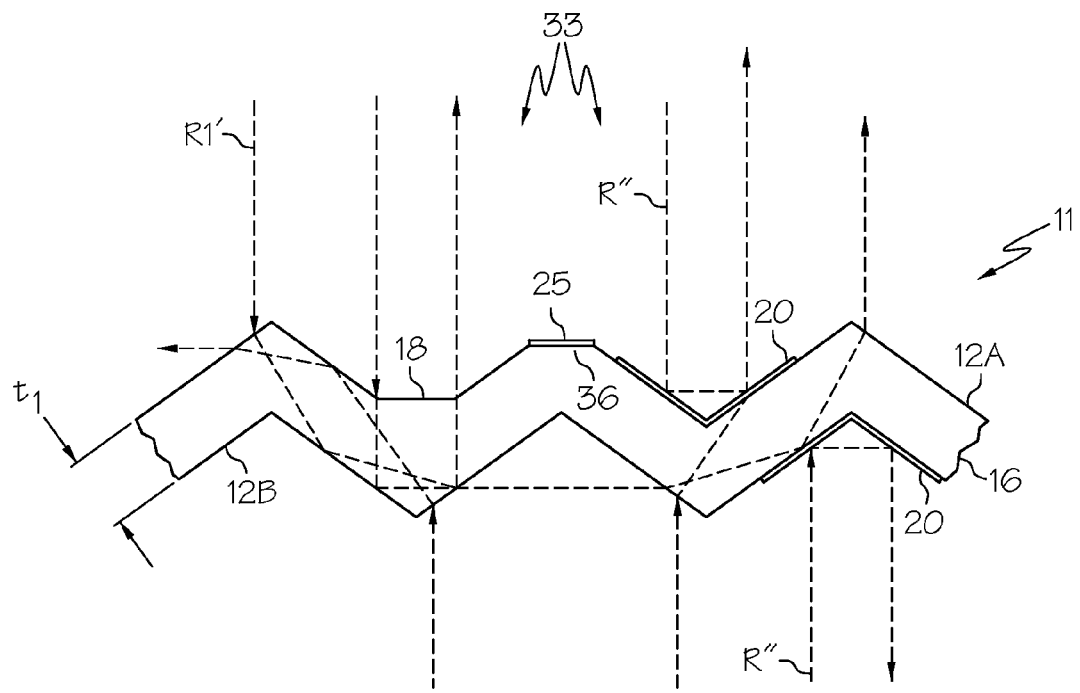
FIG. 9 is a side view of an open-faced retroreflective sheeting illustrating colored flattened proud apexes between individual open-faced prisms, in accordance with embodiments of the present invention.

Truncated corner-cube retroreflection with corner cubes which may be canted or tilted and relying partially or completely on reflective coatings (as in ray R" to the right of surface 25 in FIG. 9)

Figure 37:
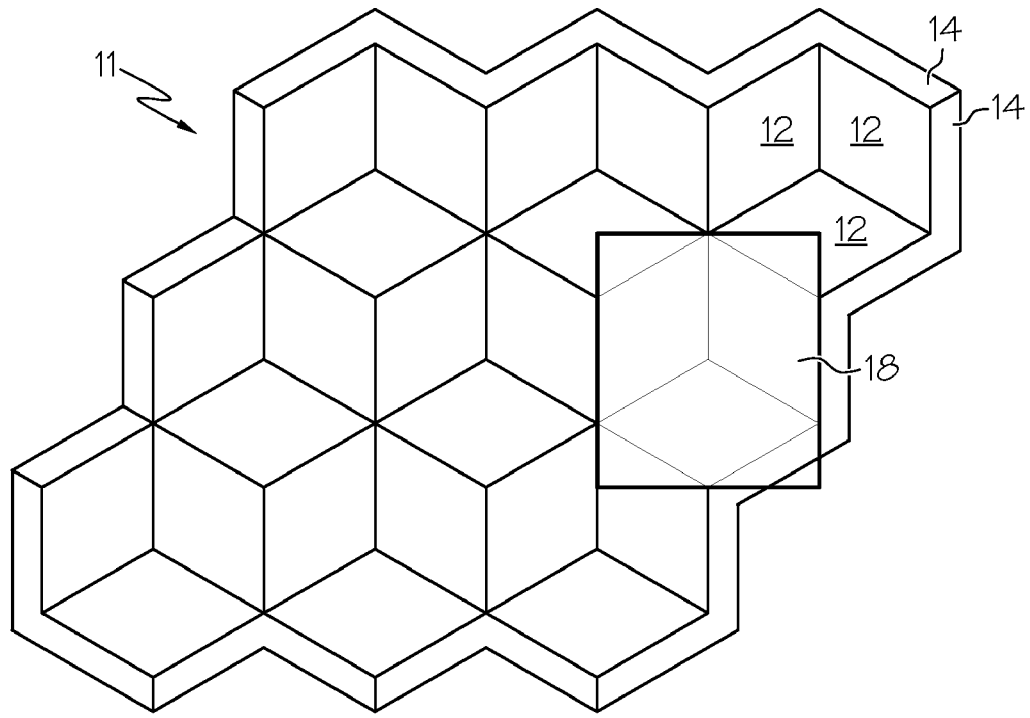
FIG. 37 is a top view of an open-faced retroreflective sheeting embodiment including one solid full-square-sided corner-cube structure on a first surface thereof, in accordance with an embodiment of the present invention.
Figure 38:
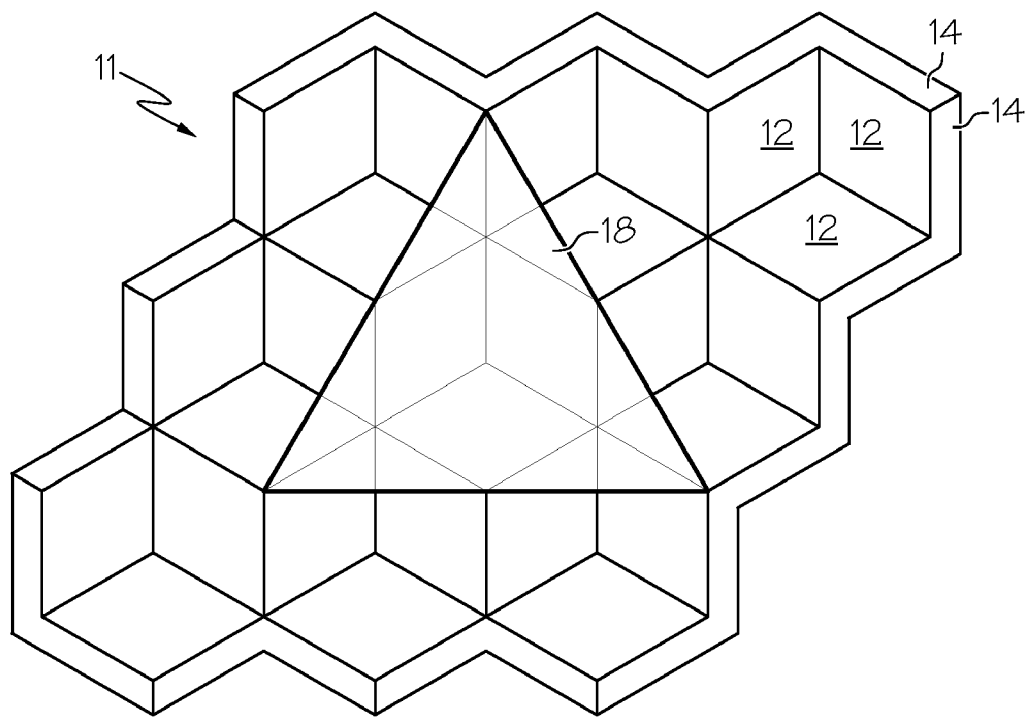
FIG. 38 is a top view of an open-faced retroreflective sheeting embodiment including one solid full-square-sided corner-cube structure on a first surface thereof, in accordance with an embodiment of the present invention.
Figure 39:
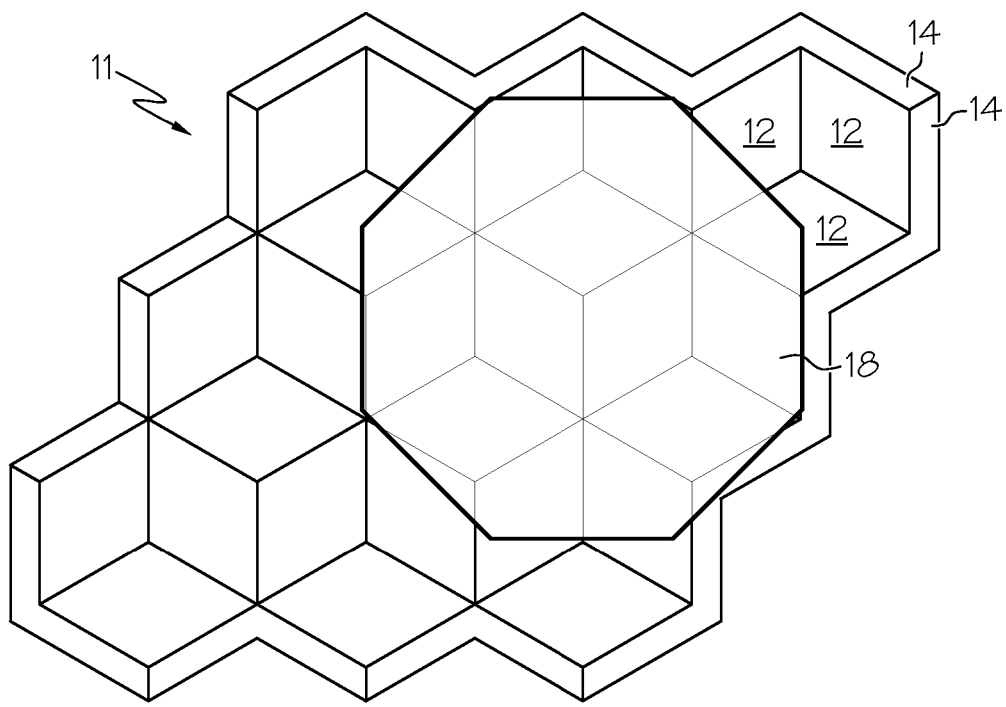
FIG. 39 is a top view of an open-faced retroreflective sheeting embodiment including filled and partially filled solid full-square-sided corner-cube structures on a first surface thereof, in accordance with an embodiment of the present invention.

Solid full-square-sided corner-cube retroreflection with corner cubes which may be canted or tilted and relying on total internal reflection (as in the full-square-sided corner-cubes shown in FIGS. 37, 38 and 39.)

Solid full square sided corner-cube(s) retroreflection with corner cubes which may be canted or tilted relying partially or entirely on a reflective coating for retroreflective properties.

In addition, light that is not retroreflected shows up as light transmitted directly through the part and as light transmitted, reflected and scattered within the part, giving the part a glowing appearance which is visible from most directions of observation.

The propagation of light ray R1 of FIG. 5 along its path provides some distinct benefits. This ray R1 exits the back side, or second surface 12B of the sheeting 11 as light ray segment R14. The presence of this light path has been confirmed experimentally by placing an opaque stop at a known position to obstruct light ray segment R14, resulting in no light exiting at R17.

In one example embodiment, this feature allows the substantially parallel walled full square corner-cube structure and variations of the structure described herein to be used as a window in a sensor. For example, a gas or fluid or biological sample can be positioned at the second surface 12B, namely, the R14-light-segment side, of the window and evaluated or manipulated directly or remotely with light or electromagnetic radiation entering from the first surface 12A, namely, the R11-light-segment side of the window. The change in light ray R14 may be measured directly or remotely as a modified light ray R17 exits the array, for example, by taking a chemical analysis or signature to determine which wavelengths have been absorbed by a material present in the region of the light segment R14 that leaves the back surface 12B of the body 16. In another example application, the sheeting 11 can be employed to measure finger print patterns of a finger position at the second surface 12B, or the R14-light-segment side, of the array. In another example application, the array can be employed to detect when rain is falling onto a wind shield of a vehicle, with the rain being incident on the second surface 12B of the array. In another example application, the array can be employed as an optical switch or divider. In each of these examples, the light ray exits the part at various points which are different from the location of the entrance light beam. Some of the several exiting retroreflected light rays or beams described in FIGS. 18, 22 and 23 may be collected by fiber optic waveguides for example and sent along a new path with a like signal to the entrance beam or a modified signal. The signal(s) can be modified by modulation or other means.

Figure 40:
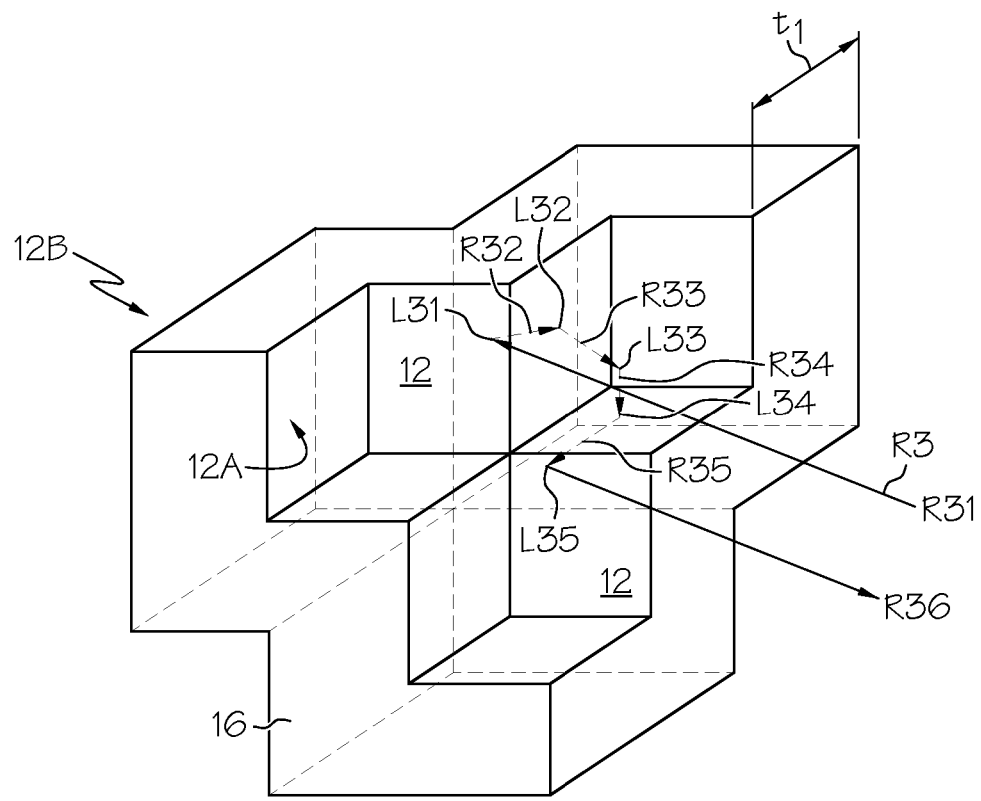
FIG. 40 is a top view of an open-faced retroreflective sheeting having a relatively thick body illustrating the retroreflection behavior of an incident light ray, in accordance with embodiments of the present invention.

FIG. 40 is a top view of a section of open-faced retroreflective sheeting having a relatively thick body illustrating the retroreflection behavior of incident light ray, in accordance with embodiments of the present invention. In this example, the wall thickness $t_1$ of the substantially parallel walled retroreflecting structure is increased. The illustration of FIG. 40, as many of the examples herein, is of just a small section of what may be a much larger array of corner-cubes; however the small portion of the array shown will retroreflect light as shown. In this example, light ray segment R31 of incident light ray R3 enters the substantially parallel walled retroreflecting structure at location L31 of a first surface 12A and is refracted into the body 16 to become light ray segment R32. Light ray segment R32 is then totally internally reflected by the second, back wall, surface 12B of the structure at location L32 to become light ray segment R33. Light ray segment R33 is, in turn, totally internally reflected by the second, back wall, surface 12B at location L33 to become light ray segment R34 which again is totally internally reflected by the second surface 12B at location L34 to become light ray segment R35. Light ray segment R35 is then refracted at a location L35 of the first surface 12A where it exits the structure in a direction substantially parallel to the entering light ray segment R31.

In the embodiment illustrated in FIGS. 4 and 5, opposing full-square corner-cube sheeting is made up of the array of corner-cube surfaces 12A and 12B, and the array extends in the first and second directions of extension x, y. In the illustration of FIG. 4, the section lines 14 of the transparent sheeting depict where the opposing surfaces 12 that create the wall thickness are visible through the substantially transparent sheeting or structure. In one embodiment, the retroreflective material 16 has a wall thickness $t_1$ of less than 0.1016 millimeters (0.004 inches). In another embodiment, the retroreflective material 16 has a wall thickness $t_1$ of 1.016 millimeters (0.040 inches) or greater. For various applications, the wall thickness can be in the range from 0.0127 millimeters (0.0005 inches) to approximately 8.0 millimeters (0.160 inches), or thicker. Embodiments of the present invention can have thicknesses that are in the sub-millimeter range, or greater than a millimeter, depending on the application. Various amounts of the different types of retroreflection will take place as the thickness changes, and as the thickness becomes greater, the types of retroreflection will change. For example, the amount of retroreflection involving light refraction through the body will increase in certain conditions, with increased body thickness. Greater parallel walled retroreflection will occur as the substantially parallel walled retroreflector wall thickness approaches two to three times the pitch of the substantially parallel-walled array of corner-cubes, where the pitch is defined herein as the distance between either the recessed or proud apexes of adjacent neighboring corner-cubes of the same surface 12A, 12B of the array of retroreflective sheeting. The thickness of the sheeting or sheeting fragment, is defined herein, for purposes of the present specification, as the distance between the proud apexes of corresponding first and second corner-cubes of the first and second sides of the sheeting. The wall thickness of the sheeting is defined as the perpendicular distance between the facet wall 12A of the first surface and the facet wall 12B of the second surface.

Figure 41:
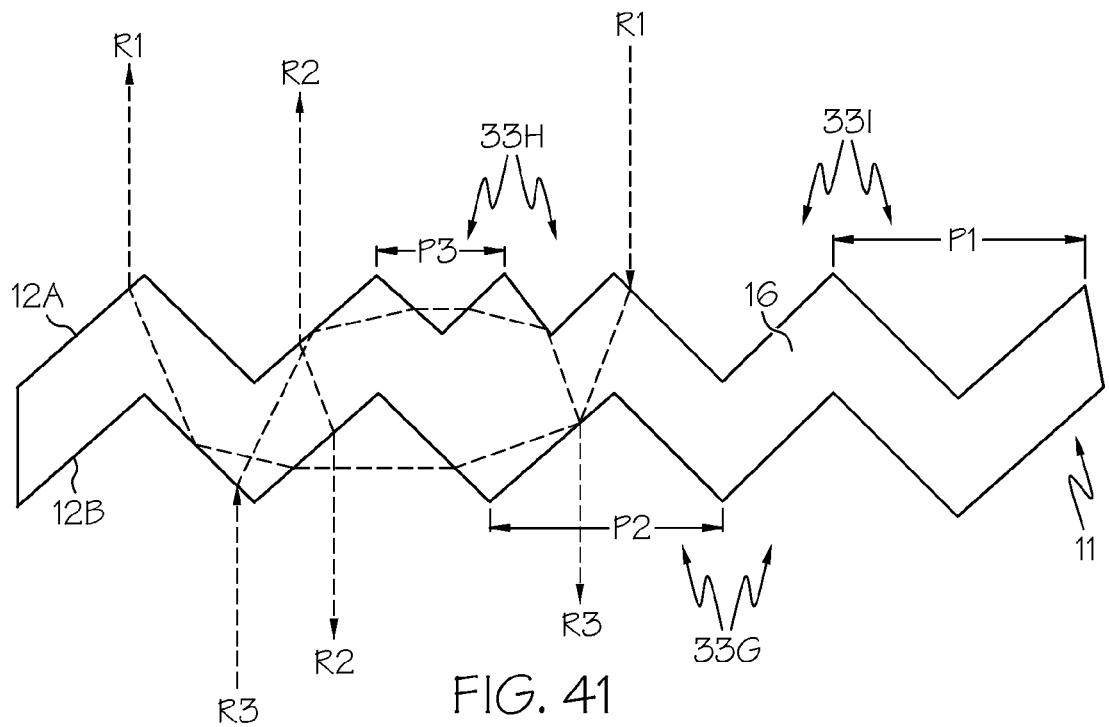
FIG. 41 is a cross-sectional side view of an open-faced retroreflective sheeting in accordance with another embodiment of the present invention wherein a subset of the corner-cubes has a pitch that is different than the pitch of the other corner-cubes.

In one embodiment, the pitch on a first surface 12A of the retroreflective sheeting is the same as the pitch on the second surface 12B of the retroreflective sheeting. As shown in the example of FIG. 41, the pitch P1 of corner-cubes 33I of the first surface 12A is equal to the pitch P2 of corner-cubes 33G of the second surface 12B. In another embodiment, the pitch of the corner-cubes on the first surface 12A is different than the pitch of the corner cubes of the second surface 12B. For example, the pitch of the corner cubes of the first surface 12A can be an integer multiple of the pitch of the corner-cubes of the second surface 12B, or vice-versa. As shown in the example of FIG. 41, the pitch P2 of corner-cubes 33G of the second surface 12B is two-times the pitch P3 of corner-cubes 33H of the second surface 12B.

The surfaces 12A, 12B of the corner-cubes 33 can optionally include windows or steps which are included in the reflecting facets of the corner-cubes to increase the "see through" performance of the resulting device, daytime Cap Y, and color as taught in International Publication No. WO 98/59266, published Dec. 30, 1998, and which corresponds with U.S. Pat. No. 6,258,443, the contents of which are incorporated herein by reference. The surfaces can also optionally include powered light sources such as LEDs, as will be described below.

FIG. 6 is a side view of an open-faced retroreflective sheeting in accordance with another embodiment of the present invention. In this embodiment, a subset of the full-square-sided corner-cubes are provided with flats 18 in regions of their recessed apexes. As a result, some of the corner-cubes 33A, 33B of the first and second surfaces 12A, 12B take the form of open-faced full-square-sided parallel walled corner-cubes 33A, and some of the corner-cubes take the form of solid, truncated, corner-cubes 33B, within the same sheeting 11. Incident light rays R4 and R5 retroreflect from the truncated corner-cubes 33B that are formed. For example, light ray segment R41 of light ray R4 is incident at location L41, where the ray reflects into the body 16 to become ray segment R42. At location L42, ray segment R42 undergoes total internal reflection to become ray segment R43. At location L43, ray segment R43 undergoes total internal reflection to become ray segment R44. At location L44, ray segment R44 emerges as ray segment R45, at an orientation that is substantially parallel with, but opposite in direction to, incident light ray segment R41. In this manner, a solid, truncated corner cube structure is formed by the flat 18 on the first surface 12A, the proud apex 81B and neighboring facets of adjacent corner-cube structures 33B on the second surface, and portion of the body of material 16 therebetween. The flats 18 may be inclined at different angles to achieve various retroreflected light distributions. The flats 18 may have a surface structure which serves to direct the light by scattering certain wavelengths of light or acting as an anti reflection structure which reduces the Fresnel reflection at the surface of the flat. The flats 18 may also include marking features, segments, microstructures, facets or curvature which is used to control the path of the light. The presence of flats 18 generally results in an increase in the retroreflected light from each opposing side of the sheeting 11; however the "see through" features of the sheeting will be reduced, since the length of the parallel walls that light can pass directly through the part as shown by R2 in FIG. 6. is reduced.

The retroreflective sheeting embodiments depicted in FIGS. 5 and 6 also find application as retroreflective safety dangle tags, tags that hang from a cord on clothing or backpacks or as retroreflector that may be used on the spokes of a bicycle wheel, since incident light is retroreflected from both sides of the sheeting 11 and since the sheeting 11 has a pleasing, "see through", appearance. An interesting effect occurs when water collects on one side of the array; this causes the retroreflectivity of the sheeting to increase substantially. The closer the index of refraction of the sheeting material is to the index of refraction of water the more noticeable the retroreflective light is. In this manner, the sheeting is operable, for example, in the remote detection of moisture, for example on a rooftop from for example a satellite. If it is preferred to prevent moisture from collecting on the sheeting, a transparent top film, for example formed of urethane, acrylic, or other polymer, can be applied to the top surfaces of the convex apexes on either or both surfaces of the retroreflective sheeting 11, for example to provide a durable face film that is used to sandwich the retroreflector structure. The transparent top film can also contain fluorescing dyes or pigments plus light stabilizers such as hindered amine light stabilizers to lengthen the fluorescing life of the material. Another approach would be to insert the parallel walled corner-cube into a transparent box or envelope made to tightly enclose the retroreflector. Rigid or flexible retroreflective sheeting can be made by encapsulating or enveloping the retroreflective structures in the manner described in U.S. Pat. No. 4,555,161, incorporated herein by reference. In addition channels may be added to the tooling that cause walls to be formed during the part molding process. A cover sheeting may be attached to the top surface of the walls to prevent moisture from collecting on the sheeting. These configurations are particularly useful for sign sheeting that is retroreflective from two sides and has a pleasing appearance.

FIG. 9 is a side view of an open-faced retroreflective sheeting 11 illustrating colored flattened proud apexes at the junction between individual open-faced corner-cubes 33, in accordance with embodiments of the present invention. In the embodiment of FIG. 9, an outer, corner portion 36 of the corner-cube surfaces can be shaped as a non-corner-cube surface, or, flattened proud apex to provide an optical effect such as refraction, reflection, or light scattering, for aesthetic appearance or other reason. The flattened proud apexes 36 can be extended or enlarged to create a plurality of larger gaps between neighboring corner-cubes 33. The flattened proud apexes 36 may further be provided for other purposes such as providing flexibility to the material of the body 16 of the sheeting, modifying the behavior of, or to improve the aesthetics, of the material 16, or to provide markings therein, such as a company logo. The markings can be selectively applied to the flattened proud apexes 36 as marking layer 25. In one embodiment, the width of the flattened proud apexes 36 is in the range of about 0.1016 millimeters (0.004 inches). In another embodiment the width is in the range of 1.0 millimeters (0.040 inches). The proud apex regions 36 may also be formed with curved surfaces, segmented surfaces, or microstructured surfaces to control the path of the light in various desired ways.

In the example embodiment of FIG. 9, a highly reflective coating 20 such as vacuum-deposited gold can be selectively applied to certain, selected, corner-cube structures 33 of the first and second surfaces 12A, 12B to create a first-surface retroreflective open-faced truncated or full-square-sided corner-cube geometry. Such a reflective metallic material has optical constants that result in high reflectivity in the visible, infrared and longer-wavelength regions of the electromagnetic spectrum. Examples of materials having a suitable optical constant are aluminum, chromium, copper, zinc, gold, silver, platinum, nickel, and the like. Coatings such as vacuum-deposited aluminum, which will oxidize when exposed to ambient air, require a protective overcoat such as SiO or other suitable overcoat that can be applied under vacuum in the deposition chamber immediately after the aluminum is applied and before the vacuum is broken. In addition, dielectric coatings similar to those used to create interference coatings may be applied to surfaces 12A, 12B to allow some wavelengths of light to pass through the sheeting 11, while other wavelengths are retroreflected. In addition, combinations of layers of metals and dielectrics can be used to create transparent metal coatings which will allow some wavelengths of light to pass through the body of the sheeting 11 in a manner similar to incident ray R2 of FIG. 5, while other wavelengths are retroreflected. Coatings 20 may be selectively applied to selected surfaces using one of several methods. A mask with apertures which expose only the selected areas to the coating may be used. A viscous inert fluid such as oil may be printed onto the selected areas of the surfaces, the entire surface is then coated and the areas with the oil are rinsed completely removing the coating and oil from the selected areas leaving the coating deposited on the areas of the part where oil was not present. The entire resulting sheeting can be coated with the specular reflective coating and then printed with a protective pattern layer. This is followed by chemically etching off the specular coating in the unprotected areas and then chemically dissolving the pattern layer without removing the specular coating that is underneath the pattern layer.

Figure 7:
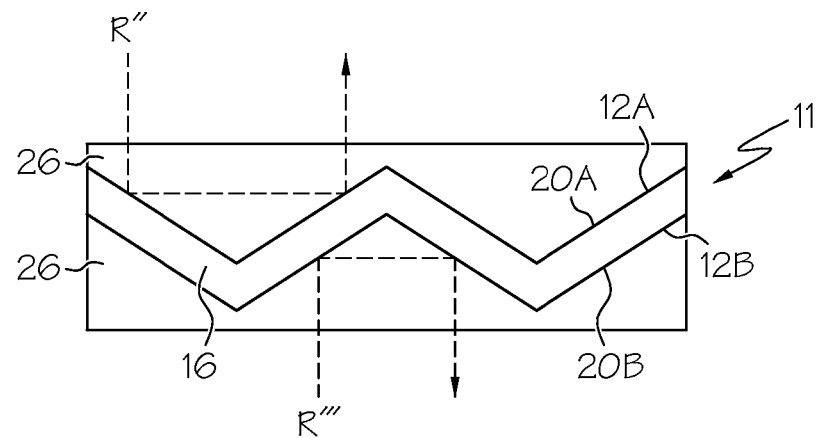
FIG. 7 is a cross-sectional side view illustrating a retroreflective sheeting structure having wavelength-selective coatings applied to first and second surfaces, and encased in a fill coat, in accordance with embodiments of the present invention.

In one example, as shown in FIG. 7 above, a first surface 12A of the retroreflective structure 11 is provided with a first wavelength-selective optical coating 20A and a second surface 12B of the retroreflective structure 11 is provided with a second wavelength-selective optical coating 20B. The structure 11 is encased in a protective fill coat 26, as described below. In this example, some of the energy of light ray R″ will retroreflect directly from the first surface 12A, as shown. A remainder of the energy will pass through the wavelength-selective coating 20A and enter the body of the retroreflective structure 11, and may undergo parallel-walled retroreflection, as described herein. The same holds true for light ray R‴, incident at the second surface of the retroreflector structure 11. By selecting appropriate properties in the first and second coatings 12A, 12B, including selecting the properties to be different by using different coatings, various desired optical effects can be achieved.

Examples of interference coatings 20 that operate well to retroreflect short-wavelength light from open-faced corner-cubes are alternating layers of Hafnium and $SiO_2$ or alternating layers of Niobium pentoxide and $SiO_2$. A typical coating is constructed of approximately 13 to 21 alternating layers of the appropriate thickness of each material for each layer. Examples of transparent metal coatings 20 that operate well at long wavelengths are alternating layers of $TiO_2$ and Ag or ZnO and Ag or ZnS and Ag. A typical coating is constructed of approximately 7 to 15 alternating layers of the appropriate thickness of each material for each layer. The major work in transparent metal coating has been done by; M. S. Sarto, A. Tramburrano, M. C. Larciprete at University of Rome, Italy and F. Sarto, C. Sibilia at ENEA in Italy, 2004 and Michael Scalora, Mark J. Bloemer, and Charles M. Bowden, "Metals under a new light", Optics & Photonics News, pp. 23-27 (September 1999), the contents of these articles being incorporated herein by reference.

In addition, ITO (Indium Tin Oxide) can be used as a thin-film coating on some or all of the corner-cube facets or windows of the sheeting 11 to provide suitable retroreflection at wavelengths greater than 1.9 um to 2.0 um (MWIR and LWIR). At wavelengths shorter that 1.8 to 1.9 um, ITO is transparent. Visible, NIR and SWIR wavelengths out to 1.8 um will pass through the structure wall window section (R21 in FIG. 5) or sheeting depending on the transmission and absorption properties of the polymer used to make the sheeting. A low level of visible light will retroreflect as a result of parallel-walled retroreflection and a high level of IR light will retroreflect as a result of first surface retroreflection. The selective wavelength reflective transmissive specular coatings discussed above can be selectively applied to any of the embodiments described herein to produce desired optical effects.

In addition, in various embodiments, the optical coating can include metals, dielectric materials or layers of metal and dielectric material or layers of metal materials or layers of dielectric materials. The retroreflective structure and coating materials may have an index of refraction ranging from very low to very high depending on the application. Any appropriate optical material may be used to manufacture the retroreflective structure and any suitable optical coating material may be applied to the surfaces of the structure.

In the embodiment of FIG. 9, the flattened proud apexes 36 of certain open-faced prisms can have a color coating 25 thereon, and can be used to create different size prisms, to improve retroreflective performance, and for aesthetic purposes. The color coating 25 may be a transparent or wavelength-selective-transparent coating. Example embodiments that utilize the flattened proud apexes 36 are illustrated and described below in connection with the embodiments of FIGS. 10, 11, 12, 14, 15, 16, and 17. Colored coated flattened proud apexes 36 can be formed by printing colors on their surfaces, or by applying colored adhesives. The coatings of the flattened proud apexes 36 can also take the form of patterns. The flattened proud apexes 36 are formed in the master tooling or in odd or even generation replicas of the master tooling. In alternative embodiments, instead of flats 36, other structures can be formed to provide a similar effect, such as low areas, including indentations or recesses, and high areas, including protrusions.

Figure 50A:
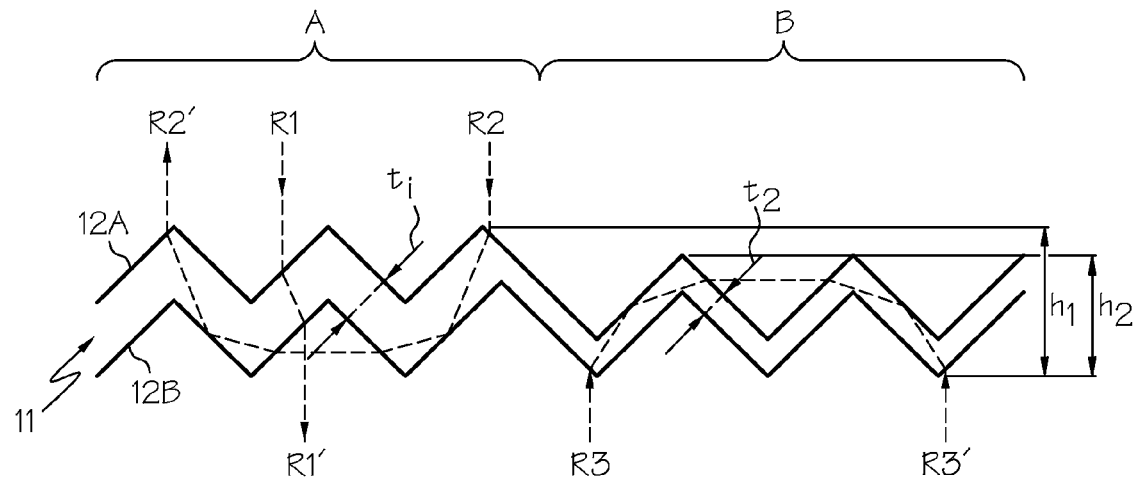
FIGS. 50A and 50B are cross-sectional side views of an open-faced retroreflective sheeting structure illustrating that different sections of the structure can have different sheet thicknesses and different wall thicknesses, in accordance with embodiments of the present invention.
Figure 50B:
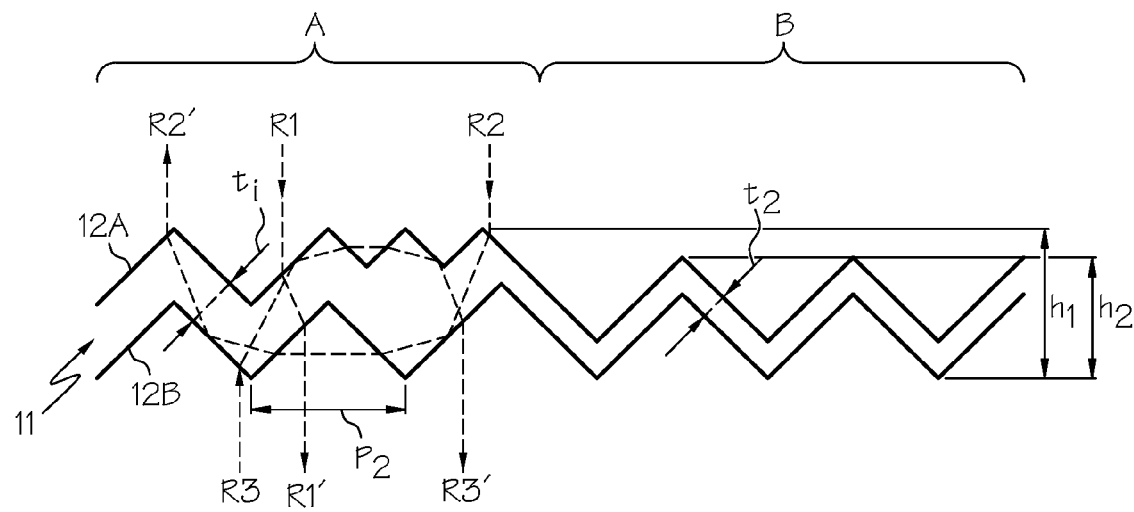

For example, FIGS. 50A and 50B are cross-sectional side views of an open-faced retroreflective sheeting structure illustrating that different sections of the structure can have different sheet thicknesses and different wall thicknesses, in accordance with embodiments of the present invention. In FIG. 50A, section A of the retroreflective structure has a sheeting thickness of $h_1$ and a wall thickness of $t_1$, while section B of the retroreflective structure has a sheeting thickness of $h_2$ and a wall thickness of $t_2$, where $t_1 > t_2$ and $h_1 > h_2$. In can be seen in the illustration of this embodiment that retroreflection in accordance with embodiments of the present invention occurs for light ray R2, incident at the first surface 12A of the structure in section A, and retroreflection occurs for light ray R1, incident at the second surface 12B of the structure in section B. Similar characteristics are illustrated in FIG. 50B; however, in FIG. 50B, it is demonstrated that one or both surfaces 12A, 12B can have sections where the pitch of the corner-cube structures $P_3$ can be different in some sections or surfaces of the retroreflective structure than in other sections or surfaces $P_2$.

In another embodiment, the resulting sheeting can be encapsulated or encased in a material that fills the corner-cube facets. For example, all, or a portion of, the open-faced corner-cubes 33 can be vacuum-coated with a low-refractive-index material and then at least a selected portion of the open-faced corner-cubes filled with a high refractive index material to create a high-whiteness retroreflective product. Alternatively, the open-faced corner-cubes can be formed with a low index of refraction resin and then have at least some open faced corner-cubes filled, without metallizing, with a high index resin to also create a high-whiteness retroreflective product.

In one embodiment, a low-index transparent perfluorinated polymer, which has an index of refraction of about 1.1, can be used as an optical coating to coat the first and second surfaces 12A, 12B of the resulting retroreflecting sheeting 11. The retroreflective sheeting may have an index of refraction from as low as 1.1 up to as high as 3.0 or higher depending on the material used to form the retroreflective sheeting. The open-faced corner-cubes 33 can be filled with, or encased within, a fill coat 26, such as a colored or substantially clear/transparent long-weathering polymer, as shown in example embodiment of FIG. 10. The fill coat 26 can be permanently attached to the low-index polymer. The fill coat 26 may have an index of refraction on the order of from about 1.1 to greater than about 1.5, depending on the amount of retroreflection desired. The polymer can be flexible and/or elastomeric. In some embodiments, it is not required that the fill coat 26 provide any additional strength to the body 16 or sheeting 11, as such strength can be sufficiently provided by the material of the body 16 forming the full-square-sided corner-cube sheeting. In some examples, sufficient material strength is required to maintain dihedral angles of approximately ninety degrees on the open-faced structure. In some examples, added material strength allows for embodiments where the corner-cube faces 12 are coated with a reflective coating 20 and the use of fill materials that are not structurally strong enough for conventional corner-cube prisms, but have other physical properties that are advantageous for retroreflective sheeting, such as increased ultraviolet light stability. Examples of fill materials include simple acrylic or acrylic-fluorocarbon polymers. For many applications, especially outdoor applications, it is preferable that fill coat 26 be substantially resistant to UV degradation. In one embodiment, the fill coat 26 comprises a material having an application viscosity of less than or equal to about 1,000 centipoises. Such materials can also offer a low glass transition temperature, such as fluorocarbon, fluorinated acrylic, or fluorinated urethane. An example of a suitable low glass transition temperature range is between about −20 and 80 degrees Celsius (−4 and 176 degrees Fahrenheit). In certain embodiments, it is preferable that the glass transition temperature is less than about 15 degrees Celsius (59 degrees Fahrenheit). It is noted that a high refractive index fill coat 26 increases the entrance angle at which light rays R enter and therefore can be retroreflected by corner-cube surfaces 12. The fill coat 26 can further optionally be designed to be wavy (non-planar) to vary the angular retroreflective performance. The fill coat 26 may have a constant or variable index of refraction or include fillers with constant or variable index of refraction, or include glass bead retroreflectors or standard one and two sided retroreflecting flakes.

Figure 10:
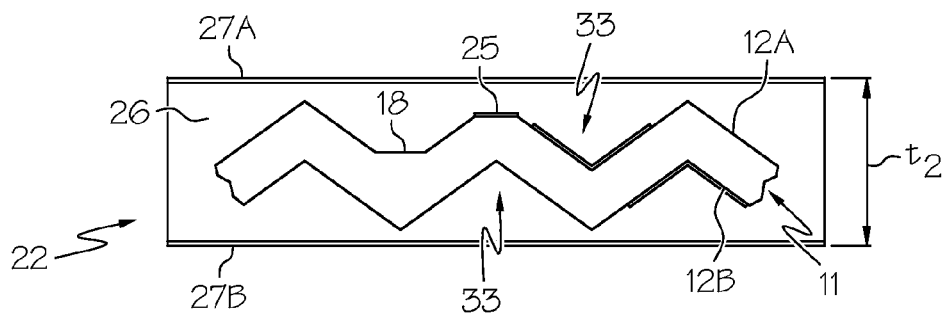
FIG. 10 is a cross-sectional side view of an open-faced retroreflective sheeting illustrating a fill coat applied to the corner-cube surfaces and a top coat formed on the fill coat of the embodiment of FIG. 9, in accordance with embodiments of the present invention.

As shown in the example embodiment of FIG. 10, additional transparent or partially transparent coatings 27A, 27B can be applied to the front and/or rear side of the filled, coated, retroreflective sheeting in order to change the product color, selectively transmit certain wavelengths of light, improve the smoothness, abrasion resistance, product color light stability, or for other reasons that those in the industry commonly coat their products. These coatings may also serve to control the entrance/observation angle responses of the material because their refractive indices are normally higher than air. The resulting thickness $t_2$ of the coated sheeting 22 as it is being formed in production can be controlled by providing walls that prevent lower viscosity prepolymers from flowing off the retroreflective sheeting 11 during the production process. In embodiments where the bottom coating 27B has a matte or irregular surface, the surfaces serve to increase the visual whiteness (cap Y) of the structure. It is often desirable to increase the whiteness of a metallized section of retroreflective sheeting 11 for daytime visibility or for aesthetic reasons. As described above, the flat areas 25 at the intersections, or proud apexes, of the corner-cube structures 33 may be coated matte, white, or matte white, or another color, to improve the overall whiteness or color of the resulting unit. Also, the metallizing conditions can be controlled to leave unmetallized areas to allow parallel-walled retroreflection and, which tend to increase the cap Y or provide for a unique color appearance of the resulting sheeting. The incident light reflects off of the coated areas 25, or off of the back surface coating 27B to create color.

The surfaces 12 of the corner-cubes 33 can optionally include windows or steps which are included in the reflecting facets of the corner-cubes to increase the "see through" performance, daytime Cap Y and color as taught in International Publication No. WO 98/59266, published Dec. 30, 1998, and which corresponds with U.S. Pat. No. 6,258,443, the contents of which are incorporated herein by reference. Flat or curved surfaces may be included for directing light from photoluminescent and/or electronically powered light sources such as LEDs. Light sources such as LEDs may also be positioned within the micro holes.

To create areas of differing entrance and observation angle retroreflectivity performance, for example, a clear polymer can be used to fill in areas of the parallel walled open-faced structure in a printed pattern and then a clear cover film can be applied to the front of the sheet. The clear printed areas retroreflect at angles that are significantly larger than the corner-cube areas that have an air layer at their face and can be used to reflect a different message to the viewer at narrow viewing angles than to the viewer at the wide viewing angles. There are useful applications here for a security film product. In these embodiments, the retroreflected light pattern with the viewer located nearly on axis with the light source may contain different information that the retroreflected light pattern with the viewer located several degrees off axis to the light source.

Figure 11:
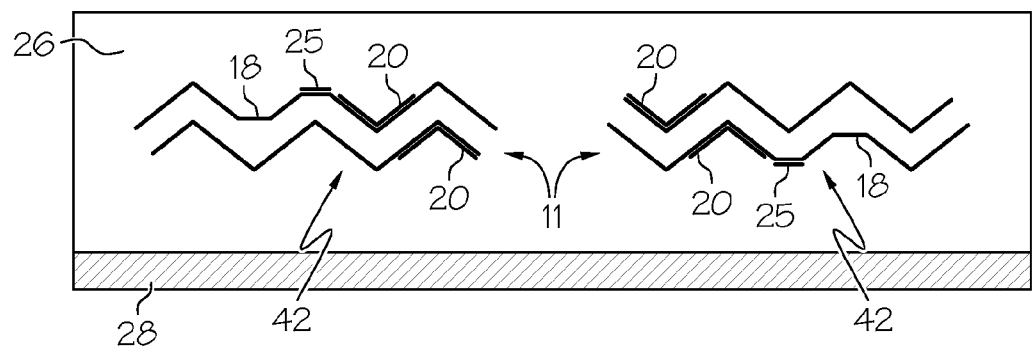
FIG. 11 is a cross-sectional side view of double-sided open-faced retroreflective chips mixed with, and encased within, a coating, and supported by a carrier sheet, in accordance with embodiments of the present invention.

With reference to the embodiment of FIG. 11, a bottom carrier sheet 28 can also adhered to the back side of the filled and coated structure for example, for the purpose of convenience, color, or protection. The bottom carrier sheet 28 may be formed from a material that is transparent to selected wavelengths of light. FIG. 11 further depicts by illustration that multiple retroreflective sheeting segments 11 can be encapsulated within the fill coat.

Figure 12:
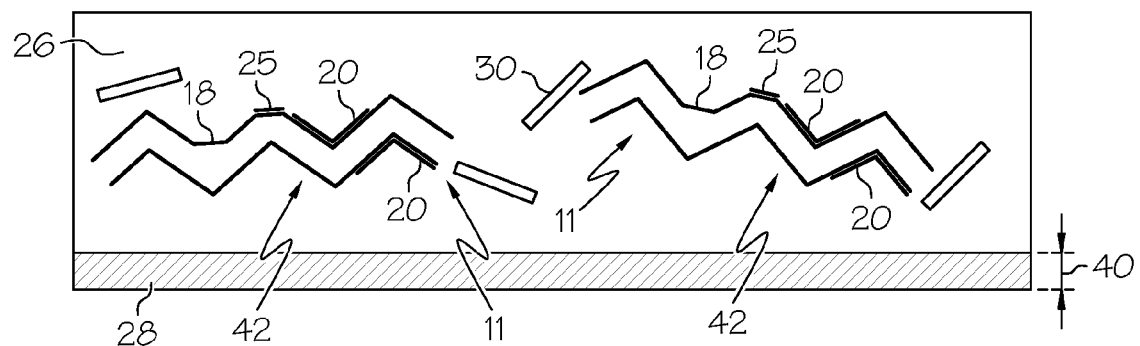
FIG. 12 illustrates colored substrate fragments dispersed in the coating of the embodiment of FIG. 11, in accordance with embodiments of the present invention.
Figure 14:
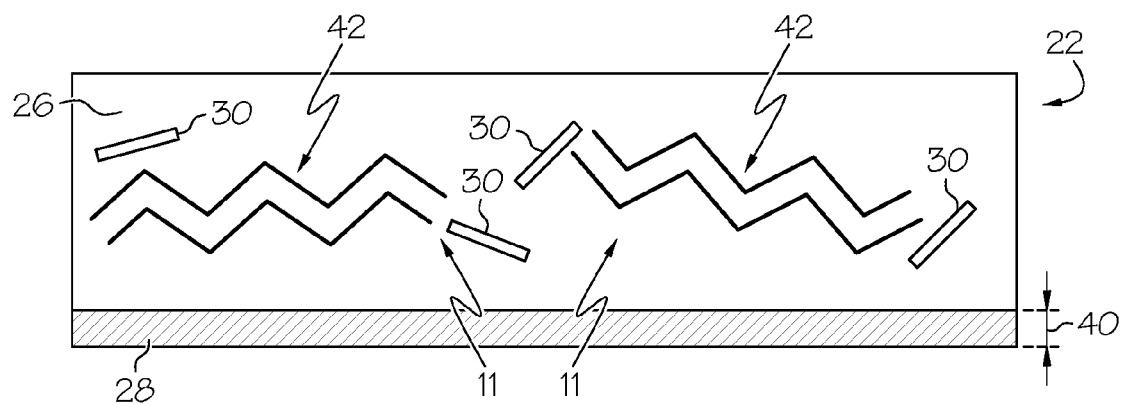
FIG. 14 is a cross-sectional side view of double-sided open-faced retroreflective chips mixed with and encased within a coating and supported by a carrier sheet, in accordance with another embodiment of the present invention.

With reference to the embodiments of FIGS. 12 and 14, a plurality of colored substrate chips or fragments 30 can be immersed within the coating 26 to change the appearance of the sheeting 22 as shown in FIGS. 12 and 14. The chips 30 may be colored chips, a multilayer diffractive material that causes color effects by diffraction, an optical micro structure that resonates light, a two sided standard retroreflecting flake or glass bead or corner-cube or an optical micro structured material which will change the path of light incident on the sheeting. The chips 30 can also contain fluorescing dyes or pigments plus light stabilizers such as hindered amine light stabilizers to lengthen the fluorescing life of the material. The chips 30 may also be formed of a reflective polymer or a reflective metal. The thickness 40 of the carrier sheet 28 is designed to be appropriate for the carrier sheet 28 material used. The carrier sheet 28 may be rigid or flexible or elastic depending on the application of the finished product. FIG. 12 further depicts that the encapsulated retroreflective sheeting segments can be positioned at different angles relative to the normal angle of the resulting structure. The segments 42 of retroreflective sheeting in the example of FIG. 12 include flattened proud apexes 25 and flats 18, with various corner-cube structures coated with reflective coatings 20. In the example of FIG. 14, the segments 42 include no flats 18 and no flattened proud apexes. Various corner-cubes are coated with reflective coatings.

Figure 13A:
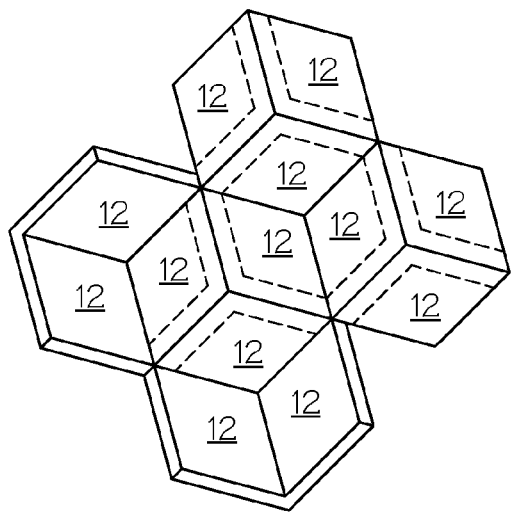
FIG. 13 is a plan view of two sections of retroreflective sheeting rotated 90 degrees relative to one another that are designed to grab or interlock with garment or fabric fibers, in which serrations can be added to the outer edges of the corner-cube faces when the sections, or chips, are cut out of a sheet to improve grabbing and interlocking, in accordance with embodiments of the present invention.
Figure 13B:
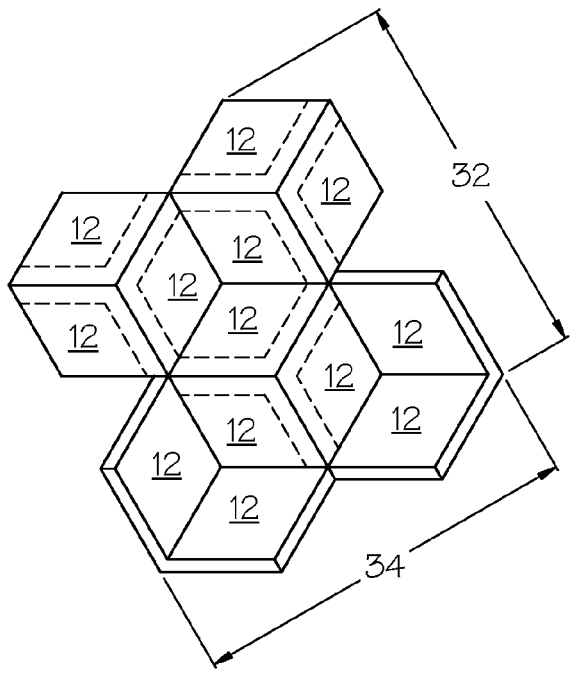

FIG. 13 is a plan view of an exemplary retroreflective chip design designed to grab or interlock with garment or fabric fibers, in which serrations can be added to the outer edges of the corner-cube faces when the chips are cut out of a sheet to improve grabbing and interlocking, in accordance with embodiments of the present invention. FIG. 13 is also a plan view of two section of retroreflective sheeting which are rotated 90 degrees with respect to each other. FIG. 13 shows that the retroreflective chips may be oriented in any direction which will cause the overlapping retroreflected light patterns to be a summation of the individual retroreflected light patterns from each individual chip. In the case of retroreflective chips having a pitch of less than approximately 0.020" that are being used to retroreflect in the visible spectrum, the distinct diffraction patterns of the individual corner cubes will overlap to create a composite retroreflected light pattern that has more uniform intensity than a retroreflected light pattern from corner cube sheeting where all of the corner cubes are oriented in a similar direction. FIG. 13 also demonstrates that the sharp corners of the chip will serve to grab or interlock with fabrics such as knit fabrics where the weave is coarse with respect to the size of the chip. Serrated edges or hook shapes formed on the chips by direct forming of the individual chips or during dicing of sheeting will add to the ability of the chip to interlock or grip on the surface or within woven or non woven fabrics.

Figure 15:
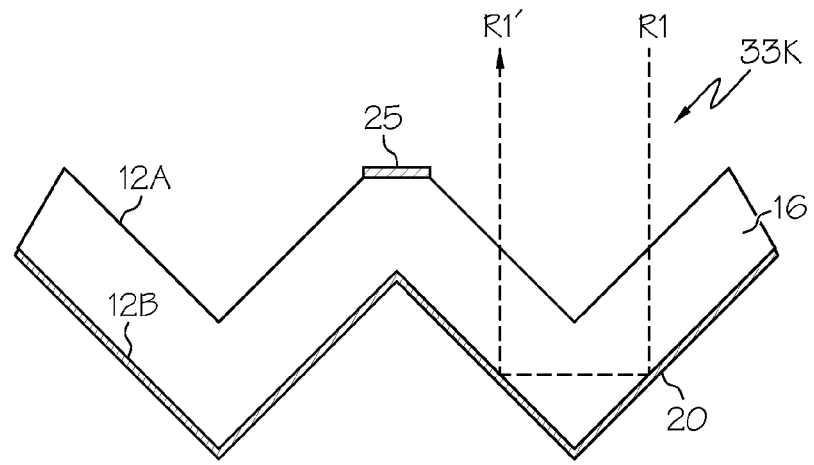
FIG. 15 is a cross-sectional side view of a double-sided open-faced retroreflective sheeting segment, wherein at least a portion of a lower surface is coated with a reflective coating, in accordance with another embodiment of the present invention.
Figure 16:
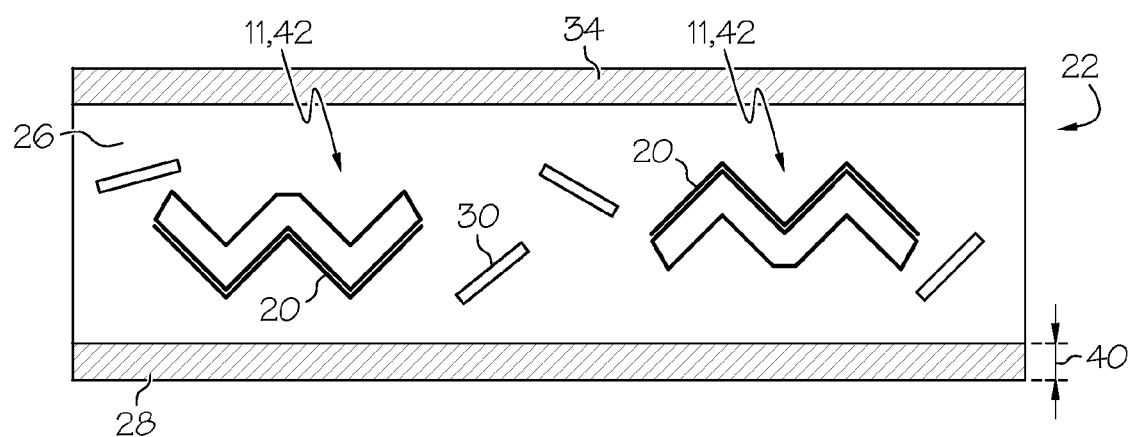
FIG. 16 is a cross-sectional side view of double-sided open-faced retroreflective sheeting segments of the type illustrated in FIG. 15, mixed with and encased within a coating, supported by a carrier sheet and having a top film, in accordance with another embodiment of the present invention.

FIG. 15 is a cross-sectional side view of a double-sided open-faced retroreflective sheeting segment, wherein at least a portion of a lower surface is coated with a reflective coating, in accordance with another embodiment of the present invention. In this embodiment, a second surface 12B of the body 16 is provided with a reflective coating. In this example, assuming the sheeting segment is enclosed in a fill material which has an index of refraction similar to body 16, light incident at the top, right corner-cube 33K of the first surface 12A will enter the body as ray R1, refract through the body 16 to the second surface 12B, reflect from reflective surface 20 at the second surface, and emit from the first surface 12A, as a retroreflected light ray R1'. This embodiment illustrates a means for providing further management of the light retroreflected by the chip. The light retroreflected as shown by ray R1-R1' as a result of the refractive index of material 16 will follow a different light path than the light retroreflected from the opposite side of the part. When the chip is dispersed within a medium as shown in FIG. 16 approximately 50% of the chips will face in opposite directions. The resulting retroreflected light pattern will be a composite of the retroreflection from each side of the chip. Also the retroreflective coating may be a selective wavelength coating allowing for some parallel walled retroreflection for certain wavelengths of light as well as some full square sided corner cube retroreflection for other wavelengths of light.

FIG. 16 is a cross-sectional side view of double-sided open-faced retroreflective sheeting segments of the type illustrated in FIG. 15, mixed with and encased within a coating, supported by a carrier sheet and having a top film, in accordance with another embodiment of the present invention. With reference to the embodiment of FIG. 16, a top carrier sheet 34 can also be applied to the top side of the structure for purposes of convenience, color or protection. The top carrier sheet 34 may be formed of a material that is transparent to selected wavelengths of light. The top or bottom transparent carrier sheet 34, 28 can also contain fluorescing dyes or pigments plus light stabilizers such as hindered amine light stabilizers to lengthen the fluorescing life of the material. The bottom carrier sheet 28 or top carrier sheet 34, 28 can be printed with a pattern and can include apertures or windows which are large enough to allow retroreflection based on the size (pitch) of the corner-cube structure being used for the retroreflective sheeting. The printed pattern can also contain fluorescing dyes or pigments plus light stabilizers such as hindered amine light stabilizers to lengthen the fluorescing life of the material. The apertures used in (for example by perforation) or on (for example by printing on a transparent sheet) the carrier sheet 28, 34 should be larger than the clear aperture of the corner-cube. For example a full-square-sided corner-cube with a pitch of 0.020 inches has a 0.020 inch hexagonal shaped clear aperture at normal light incidence and should have an aperture or window in the carrier sheet located directly above the corner-cube that is at least this size and shape and preferably three times this size and shape. A circular aperture may be used for convenience. The printed pattern may be made with a wavelength-selective ink, in one example.

In the embodiments described above in connection with FIGS. 4, 5, 6, and 9, and in various other examples, a transparent or opaque film can be applied to the front and rear surfaces of the sheeting 11 by bonding the film to the outer ridges or proud apexes between neighboring corner-cubes 33 of the array or by sealing the sections as described in U.S. Pat. No. 4,555,161, incorporated by reference. In this example, the recesses formed between the film and the surfaces of the corner-cubes 33 are filled with ambient air or a selected gas. The film may be printed with a pattern and include printed or through apertures (holes) in the case of opaque top films which are large enough to allow retroreflection from the size corner-cube being used for the retroreflective sheeting. In one example, the printed pattern may be provided using a wavelength-selective transparency ink. For example wavelength-selective inks or dyes are made by Epolin Corporation in NJ. The inks are designed to absorb certain wavelengths of light while passing other wavelengths of light. The inks may be applied with standard gravure, offset gravure, screen printing processes and the like. In another example, the film may be extruded from a thermoplastic polymer which has the dye(s) incorporated into the polymer film during the extrusion process.

Figure 17:
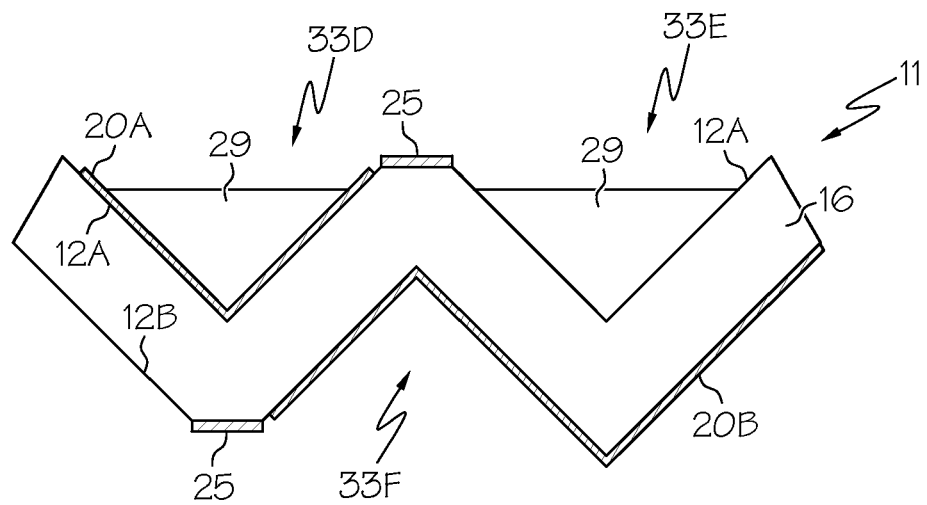
FIG. 17 is a cross-sectional side view of a double-sided open-faced retroreflective sheeting with a fill layer, including a coating located between the retroreflective sheet and the fill layer and including a coating on a side of the sheet opposite the fill layer, in accordance with embodiments of the present invention.

The embodiment of FIG. 17 illustrates the use of a fill layer 29 applied in two locations on the retroreflective sheeting 11 to provide a retroreflective sheeting 11 which has varying retroreflective properties. The corner-cube 33D at the top, left position of the structure includes a reflective coating 20 applied to the retroreflective structure surfaces 12A and includes a fill layer 29. The corner-cube 33E at the top, right position includes a reflective coating 20B applied to the back side surface 12B opposite the fill layer 29. The index of refraction of the fill layer 29 may be the same or different from that of the material of the body 16 of the retroreflective sheeting 11. In alternative embodiments, different locations on the corner-cube array may have a different level or height of fill layer 29. The fill layer 29 may optionally have a sloped or curved top or micro structured surface to provide a different optical effect. Micro structured surfaces may be used to randomly scatter light, diffract light, act as an anti reflecting surface, act as a filter for various wavelengths of light, act as an apodization surface to smooth diffraction effects, etc. The fill layer 29 may further optionally contain fillers which are used to scatter, reflect or refract the light incident upon the sheeting 11. In general, the fill layer 29 can be used to create a truncated or solid full-square-sided corner-cube response from the otherwise open-faced corner-cube. The fragment of corner cube sheeting shown in FIG. 17 may be a section of a larger sheeting which also includes for example the retroreflecting features described in FIG. 5 and/or FIG. 6 and/or FIG. 9. The fill layer 29 can also contain fluorescing dyes or pigments plus light stabilizers such as hindered amine light stabilizers to lengthen the fluorescing life of the material.

Referring to the top, left corner-cube position 33D of the sheeting fragment shown in FIG. 17, this corner-cube configuration, assuming a partial fill by the fill layer 29, is an example of a truncated, metallized corner-cube. In this example, light entering from the top of the page will be retroreflected from the top surface of the body 16 by the reflective coating 20A through the fill layer 29, and does not refract through the body 16.

Referring to the top, right corner-cube position 33E of the sheeting fragment shown in FIG. 17, this corner-cube configuration, assuming a partial fill with the fill layer 29, is, like the corner-cube position 33D, an example of a truncated, metallized corner-cube. However, the top, right corner-cube position 33E will effectively be of a larger-sized geometry and pitch than its counterpart 33D, since, in position 33E, the light entering from the top of the page will be retroreflected from the bottom surface of the body 16 by the reflective coating 20B, at the back side of the sheeting, since the light will refract into the body 16 of the sheeting fragment. The index of refraction of the fill layer may be different than or the same the index of refraction of the body 16 depending on the light path deviation that is desired.

Referring to both top corner-cube positions 33D, 33E, if either of these positions have a fill layer 29 that completely fills the corner-cube, these positions will operate as solid, full-square-sided corner-cubes. In various embodiments, layers 33D and 33E may be composed of different materials to provide desired optical effects.

Referring to the bottom corner-cube position 33F, this corner-cube configuration is an example of a open-faced, full-square-sided corner-cube that will retroreflect light that is incident at the back surface of the sheeting.

In this manner, the above example of FIG. 17 illustrates that the same retroreflective sheeting fragment can be used to provide corner-cubes that are open or solid, truncated or full square sided, or combinations of open and solid and truncated and full square sided; metallized or not; and that retroreflect from an outer surface of the body, or that retroreflect at least partially by refracting through the body, in accordance with various embodiments.

In various embodiments, the fill layer 29 can be designed to fill some recesses more than other recesses, therefore creating large and small truncated corner-cubes with varying top window surface flatness. The transparent fill layer can have an index of refraction different from the corner-cube wall structures to produce desired optical effects. The transparent fill layer can optionally contain color to vary the wavelength transmission properties of the retroreflected light or fillers to vary the distribution of the retroreflected light. In one embodiment, the fill layer may contain glass bead retroreflectors such as internally-pigmented acrylic beads, that can induce certain effects such as coloring, fluorescent, and phosphorescent effects. In another embodiment, the fill layer may comprise a wavelength-selective transparent material.

In various embodiments, the fill layer 29 can be integral with the body of material and formed by the tooling used to form the body at the time of its formation. Alternatively, the fill layer 29 can be applied following formation of the body 16, for example, by applying a second layer, or by inserting an appropriately-sized prism into the open-faced corner cube structure 33E.

As described above in connection with FIGS. 5 and 6, FIG. 18 is a top view of an open-faced retroreflective sheeting illustrating that some incident light is retroreflected and emerges form the part at one location and some light is retroreflected and emerges from the part at a different location, in accordance with embodiments of the present invention. For example, light ray R1 in FIG. 18 follows the same light path as described above for R1 in FIG. 5, while light ray R2 of FIG. 18 shows another light path for light entering the sheeting 11 through refraction at the same point as R1 but at a different entrance angle. R2 emerges also as a retroreflected light ray but follows a different path through the part and exits the part at a different location. The incident light will travel by total internal reflection and refraction through the structure in a unique way, depending on the angle of incidence. Some of the incident light will be retroreflected and emerge from the structure in several locations. Some of the incident light will travel through the structure and emerge going in different non retroreflecting directions. The net effect is a significant level of retroreflection, and a large area of the structure is illuminated by light piping and light scattering within the sheeting in the region near where the incident light enters the array. Also some of the light passes through the structure and can be seen from the opposite side of the structure opposite to the location where the entering ray was incident. Experimental examples of this phenomenon are illustrated in connection with FIGS. 21, 22 and 23 below.

Figure 19:
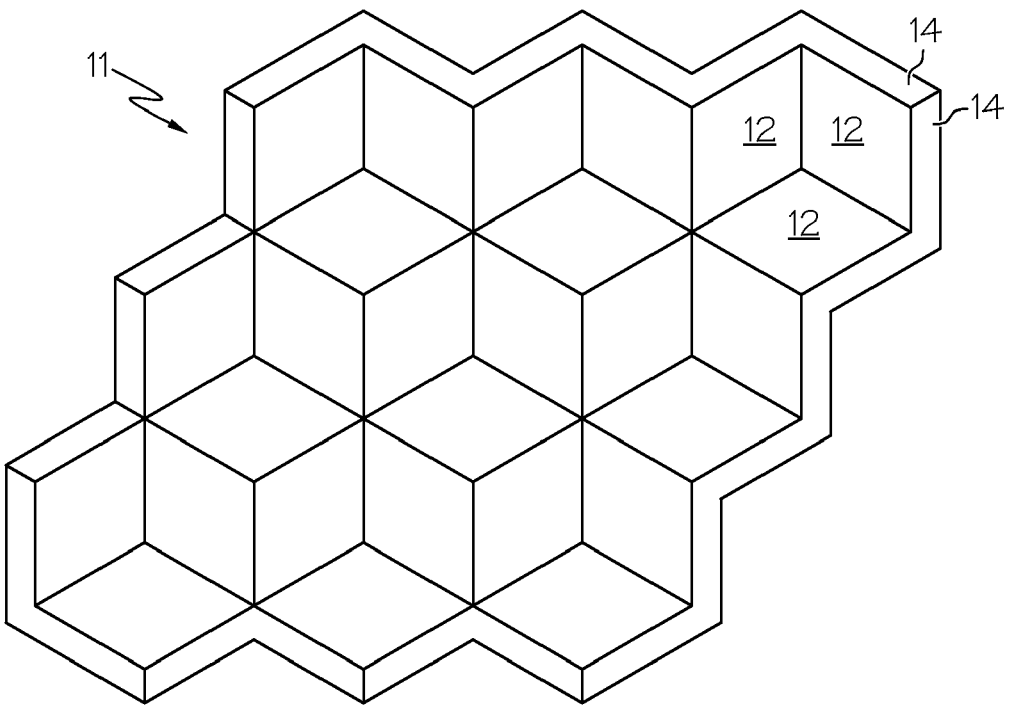
FIG. 19 is a top view of an open-faced retroreflective sheeting in accordance with another embodiment of the present invention.
Figure 20:
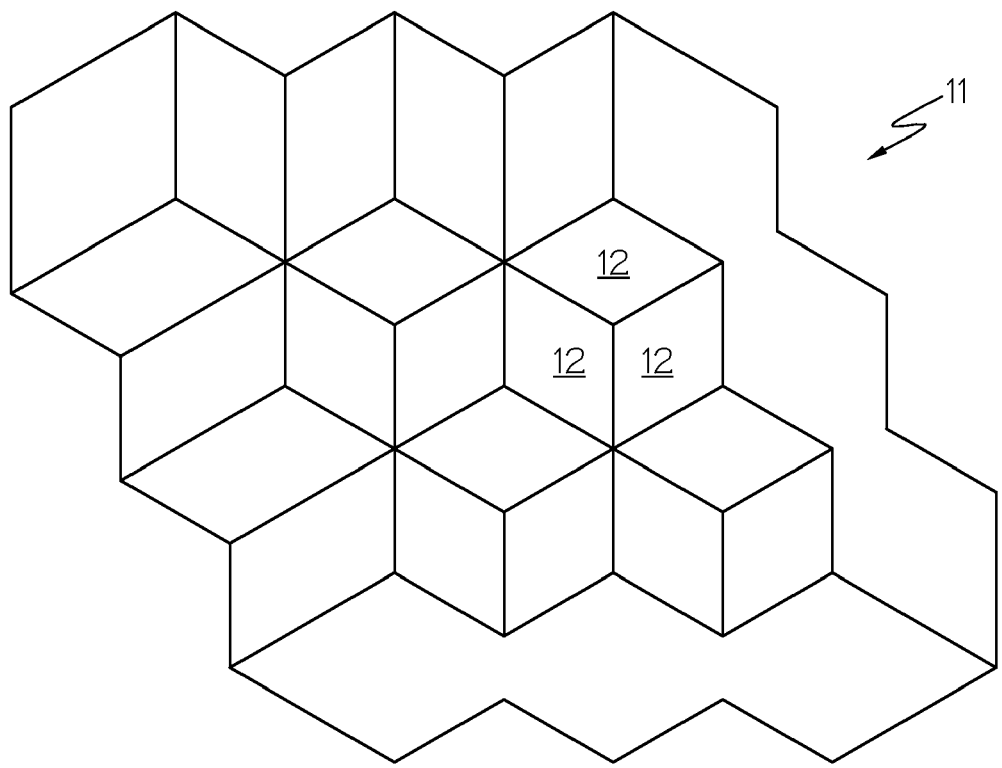
FIG. 20 is a back side top view of the open-faced retroreflective sheeting of FIG. 19 flipped right to left, in accordance with an embodiment of the present invention.

FIG. 19 is a top view of an open-faced retroreflective sheeting in accordance with another embodiment of the present invention. The embodiment of FIG. 19 is similar to that of FIG. 4 except that additional parallel walled sections have been added to the array and the entire array is depicted as being tilted into the plane of the paper. When light is incident on the array 11, the light will follow several paths through, or within, the array. Some light will pass directly through the parallel walls of the array; some light will be piped within the walls and some light will be retroreflected by the array. The incident light is refracted, reflected and totally internally reflected by the walls of the array as described above. FIG. 20 shows the back side of the array in FIG. 19 with the array being flipped right to left.

FIGS. 21, 22 and 23 are experimental images of an open-faced retroreflective sheeting embodiment as illuminated by a 632.8 nm light source. The image of FIG. 21 illustrates the behavior of light that is being retroreflected by an actual array of substantially parallel walled structures. The light incident on the array is a ½ inch diameter collimated beam at normal incidence. The pitch of the array is approximately 4.0 mm (0.160'). The pitch of the array as well as the thickness of the substantially parallel walls of the structure can vary in size form very small (0.001' or less) to very large (0.250' or greater) depending on the application. The thickness of the walls 14 are typically less than the pitch dimension but may be greater than the pitch dimension. The retroreflected light is emerging from several locations within the array as shown by the local bright areas 50 in the FIG. 21 image. The positions of the emerging retroreflected light points depend on the regions illuminated by the incident light beam. The emerging retroreflected rays may emerge from within, or from outside of, the area illuminated by the incident light beam The image of FIG. 22 illustrates that some light energy may be retroreflected from an area on the array that is displaced, or spaced apart from, the position at which the incident light is applied to the array. For example, retroreflected light from point 51*b* is emerging from the array at a location that is distant, for example a distance greater than the pitch of the array, from another location 51*a* at which retroreflected light is emerging. It is evident in this example that light is exiting and reentering the substantially parallel walled structure on the back side from the incident light, for example in accordance with the manner described above in connection with FIG. 5. This is demonstrated by placing a stop at the back side of the substantially parallel walled structure at a position that interrupts the light rays where the light is exiting and reentering the structure, which causes a portion of the retroreflected light pattern to disappear. This characteristic of the substantially parallel walled array is useful for light-splitting applications, and can be combined with the characteristic that the amount of light that can be transmitted substantially straight through the array can be controlled by the thickness of the parallel-walled array for enhancing the light-splitting applications.

The image of FIG. 23 is similar to those of FIGS. 21 and 22, except that the incident light beam is at higher intensity level in order to demonstrate the manner in which the light is being piped throughout the array. The light incident on the array is a ½ inch diameter collimated beam at normal incidence and located at the center of the picture. The dark disc in the center of the image is the result of a neutral-density filter which is being used to keep the viewed light beam intensity within the dynamic range of the digital camera used to capture the image. The light-piping phenomenon through the body of the sheeting causes the sheeting to glow as viewed from the front or back sides and in the area shown which is outside of the neutral-density filter.

Figure 30:
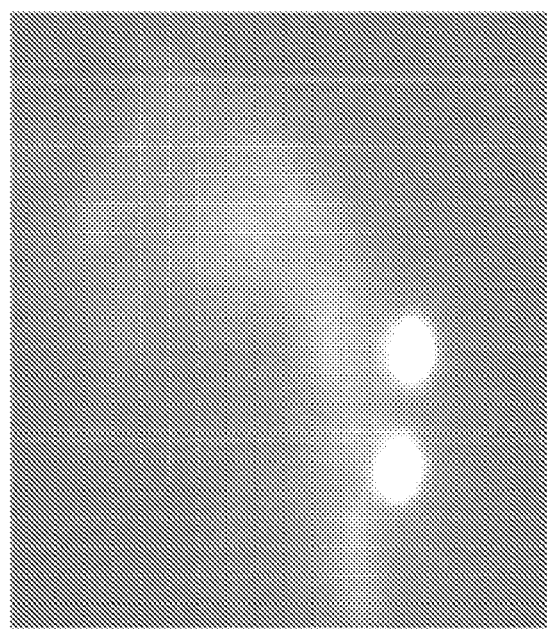
FIG. 30 is an image of the light distribution created by the substantially parallel-walled embodiment including two equal-sized solid truncated corner-cube structures, in accordance with an embodiment of the present invention.

FIG. 24 is an experimental image of the retroreflected light from the same array as in FIG. 23 as projected on an imaging screen which is located 4 meters from the retroreflective sheeting. In this case, the array is illuminated by a 632.8 nm laser having a 5.0 mm beam diameter. The three images in FIG. 24 show the variation in retroreflected light patterns that result from the incident beam entering and retroreflecting from slightly different areas of the array. When the array is illuminated by a uniform white light source that has a beam size larger than the array, the result is a uniform retroreflected light appearance. The same, or very similar retroreflected light image is present when illuminating and viewing the array from either the front side or the back side of the array. In this manner, the single piece array demonstrates front-side-to-back-side symmetry. Different orientations of an array may be combined together to make a larger array. The retroreflected light pattern from the larger array, when the entire larger array is illuminated, will be the summation of the light patterns of each of the smaller arrays. For example the image of FIG. 31 demonstrates that two of the arrays imaged in FIG. 30 can be combined together to form a light pattern that is the sum of the light patterns of each separate array. One array of the type in FIG. 30 is rotated 90 degrees with respect to another array of the type producing the image FIG. 30. The resulting light pattern when both arrays are illuminated by a single-source beam will be a light pattern which is composed of the sum of the two light patterns shown in the images of FIG. 31.

The embodiments illustrated in FIGS. 25 through 39 demonstrate the use of selective positioning of truncated-corner-cube prism features at different locations of the retroreflective sheeting structure, and the optical effects associated with these embodiments. Truncated corner-cube prism features can be provided according to a number of different embodiments. One embodiment is illustrated above in connection with FIG. 6, in which flats 18 are formed according to features formed in the tooling that is used to mold, or otherwise form the retroreflective sheeting. In another embodiment, discrete corner-cube prism units can be physically placed at specified locations in the array. Alternatively, a truncated corner-cube response can be generated by filling the corner-cubes with a fill layer 29 as shown an described above in connection with FIG. 17, or by providing the fill layer features during formation of the retroreflector structure, for example, during molding of the structure, as described above.

Figure 25:
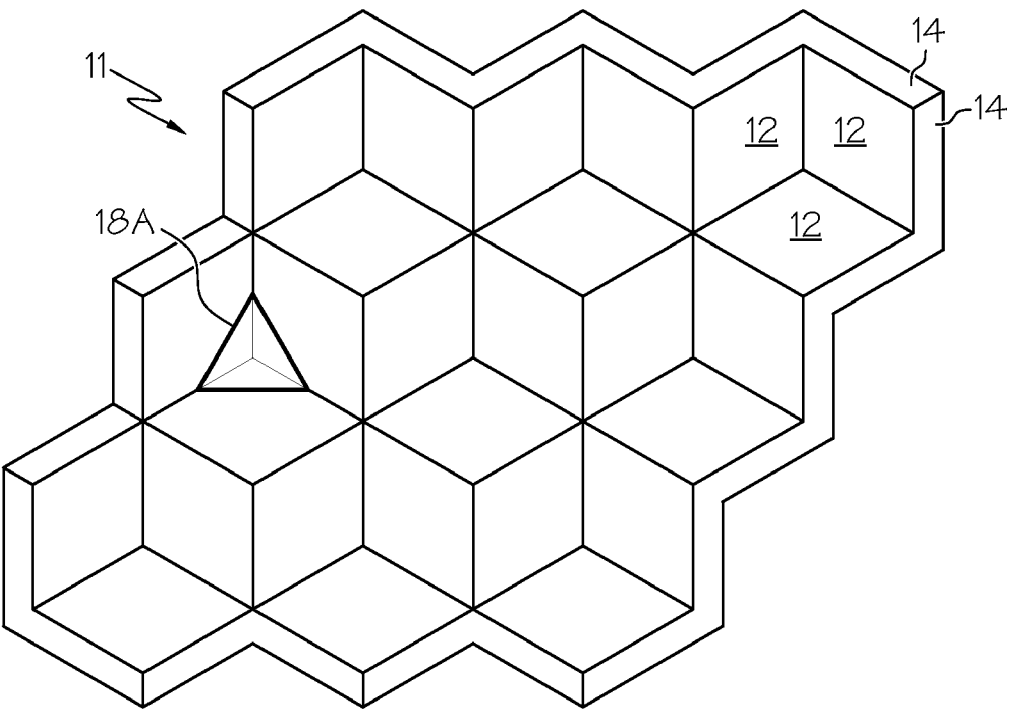
FIG. 25 is a top view of an open-faced retroreflective sheeting embodiment including a single, solid truncated corner-cube structure on a first surface thereof, in accordance with an embodiment of the present invention.
Figure 26:
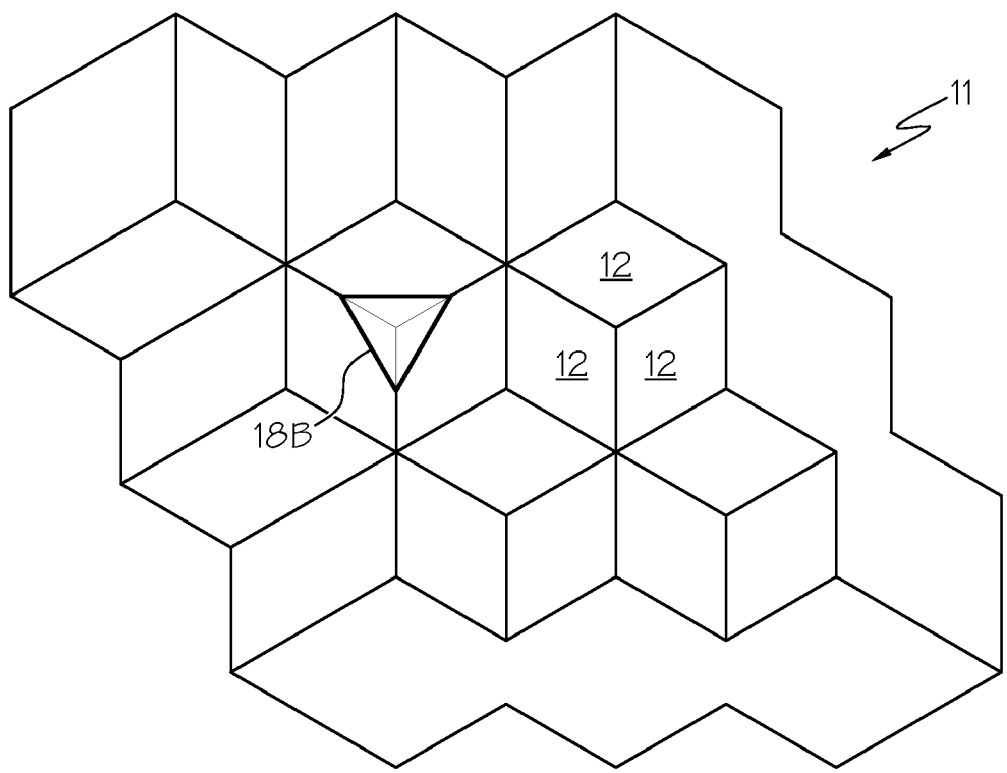
FIG. 26 is a back side top view of the open-faced retroreflective sheeting of FIG. 25 flipped right to left, wherein a second surface also includes a single, solid, truncated corner-cube structure, in accordance with an embodiment of the present invention.
Figure 27:
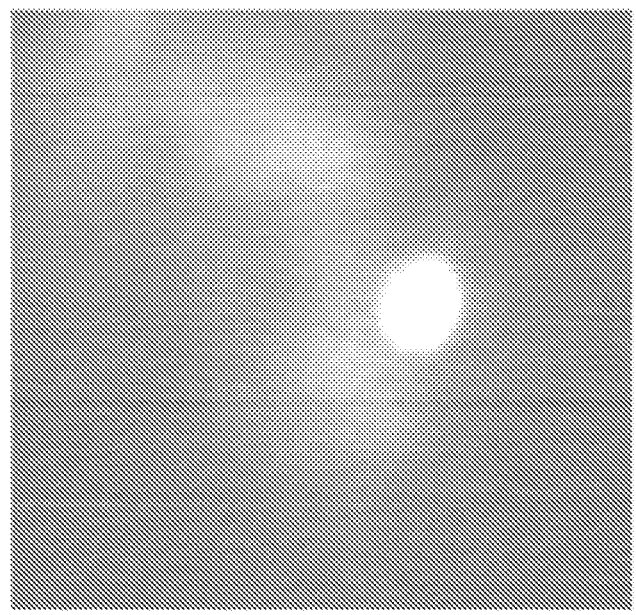
FIG. 27 is an image of the light distribution created by the substantially parallel-walled retroreflective sheeting embodiment, including a single, solid truncated corner-cube, in accordance with an embodiment of the present invention.

FIG. 25 is a top view of an open-faced retroreflective sheeting embodiment including one solid truncated corner-cube structure on a first surface thereof, in accordance with an embodiment of the present invention. FIG. 26 is a back side top view of the open-faced retroreflective sheeting of FIG. 25 flipped right to left, wherein the back side also includes a single, solid truncated corner-cube, in accordance with an embodiment of the present invention. FIG. 27 is an image of the light distribution created by the substantially parallel walled embodiment including a single, solid truncated corner-cube, in accordance with an embodiment of the present invention.

FIG. 25 illustrates the manner in which a truncated corner-cube may be present within an array. The tooling shown in FIG. 8, described below, may have a portion of one or more of the prism apexes removed to form a flat 18A like that shown in two dimensions in FIG. 6. The resulting molded array will have a solid truncated corner-cube with a front window surface created by the flat 18A. The light retroreflected from the truncated corner-cube will be brighter than the retroreflected light from the parallel walled portion of the array. As shown in FIG. 6 the resulting array may have front-side-to-back-side symmetry. FIG. 26 shows the back side of the array in FIG. 25 with a truncated corner-cube 18B added. Light from truncated and parallel walled structures is retroreflected from both sides of the structure, as shown by the light rays R4 and R5 in FIG. 6. In addition, the truncated corner-cube shown in FIG. 25 and FIG. 26 may be created by first coating surfaces 12 with a reflective coating 20 using a pattern metallizing process for example and then filling the parallel walled cavity with a fill material 26 to create a solid truncated corner-cube unit, as described above in connection with FIG. 17. Separate, solid truncated corner-cubes with reflective coatings on the corner-cube facets may be made and inserted into the parallel walled array cavity(s) to provide a similar effect.

FIG. 27 is an experimental image of the retroreflected light pattern at a distance of 61 cm (24") for an array containing a single, solid truncated corner-cube. In this experiment, the light incident on the array is a ½ inch diameter collimated beam at normal incidence. The bright spot is a result of the retroreflected light from the solid truncated corner-cube. The remaining light pattern in FIG. 27 is a result of the retroreflected light from the parallel-walled features of the array. At longer distances these patterns may merge together to become one overall pattern. The retroreflected light pattern spreading is caused by a number of factors, including errors in the ninety-degree angles of the substantially parallel walled structures, diffraction, variation in homogeneity of the material and surface roughness.

Figure 28:
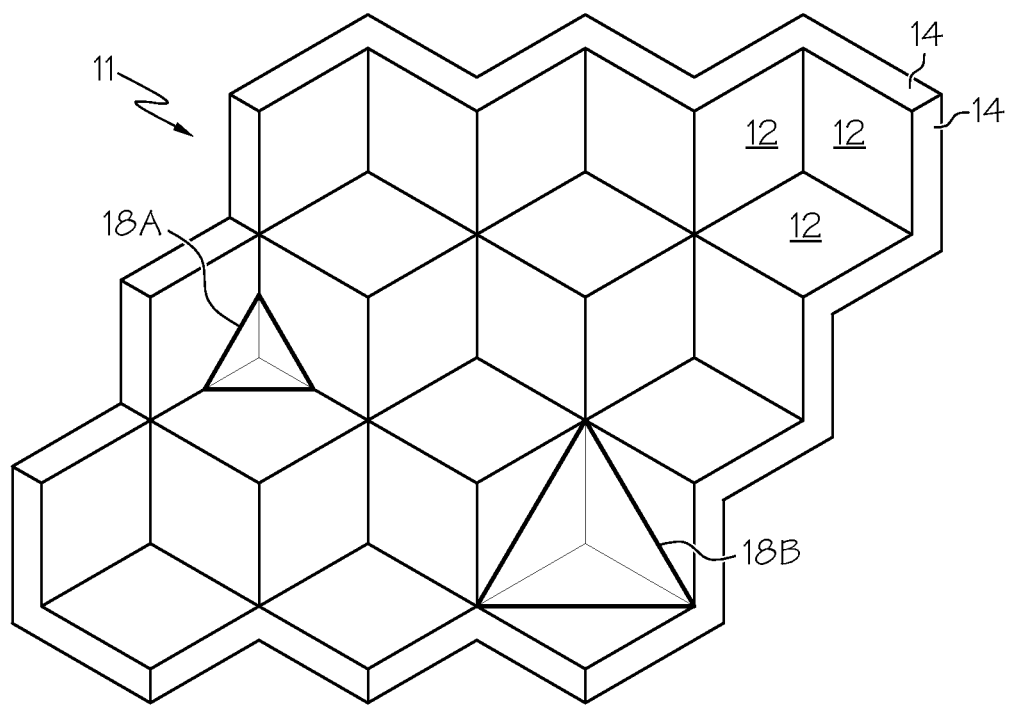
FIG. 28 is a top view of an open-faced retroreflective sheeting embodiment including two solid truncated corner-cube structures on a first surface thereof, in accordance with an embodiment of the present invention.
Figure 29:
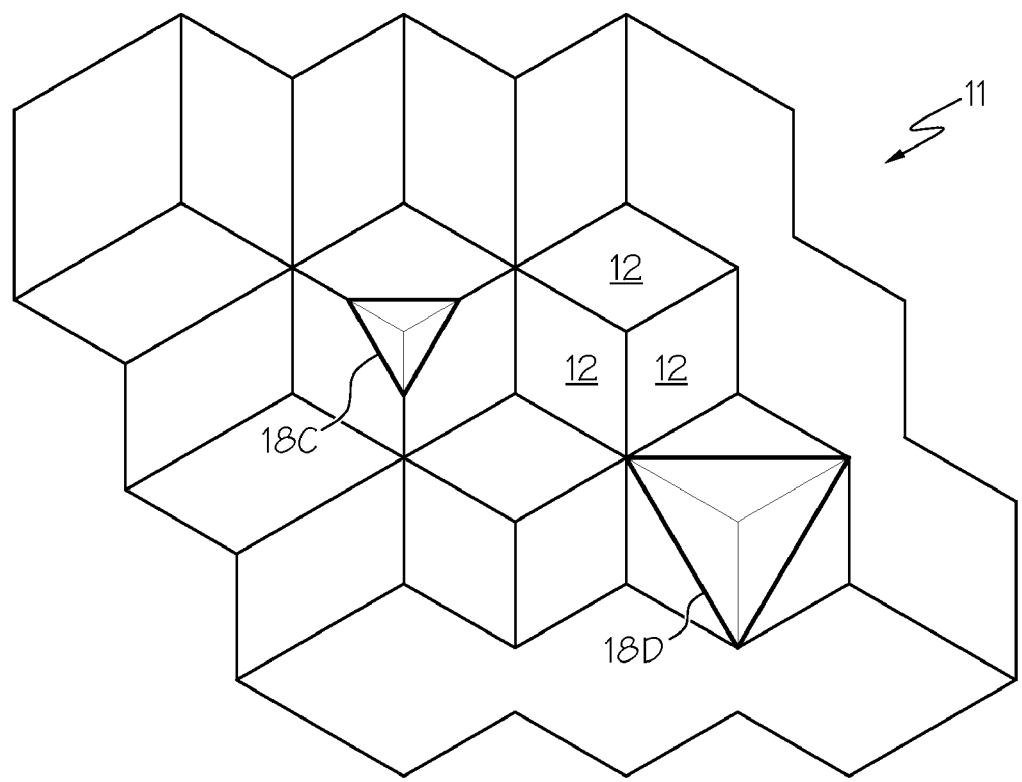
FIG. 29 is a back side top view of the open-faced retroreflective sheeting of FIG. 28 flipped right to left, wherein a second surface also includes two, solid, truncated corner-cube structures, in accordance with an embodiment of the present invention.

FIGS. 28 and 29 illustrate the array of FIGS. 25 and 26 respectively with the addition of a second, solid truncated corner-cube structure 18B to the first surface of the array, and first and second solid, truncated corner-cube structures present in the second surface of the array. In this case, the second solid corner-cube structures 18B, 18D are larger than the first solid truncated corner-cube 18A, 18C. FIG. 30 is an experimental image of the retroreflected light pattern at a distance of 61 cm (24") for an array having two equal-sized truncated corner-cubes present on one side of the array. In this example, the light incident on the array is a ½ inch diameter collimated beam at normal incidence. Two bright spots are demonstrated in the image.

The image of FIG. 31 demonstrates that two of the arrays imaged in FIG. 30 can be combined together to form a light pattern that is the sum of the light patterns of each separate array. One array of the type in FIG. 30 is rotated 90 degrees with respect to another array of the type producing the image FIG. 30. The resulting light pattern when both arrays are illuminated simultaneously by a single-source beam will be a light pattern which is composed of the sum of the two light patterns shown in the images of FIG. 31.

The image of FIG. 32 demonstrates a the light pattern that results from having two different sized solid truncated corner-cubes within a single parallel walled array, for example as shown in FIGS. 28 and 29 above. One solid truncated corner-cube structure 18B is larger than the other 18A, resulting in the one solid truncated corner-cube structure 18A producing a brighter return beam than the other. The light pattern is a combination of the light retroreflected by the truncated corner-cube structures 18A, 18B and the remaining corner-cube structures of the parallel-walled array.

Figure 33:
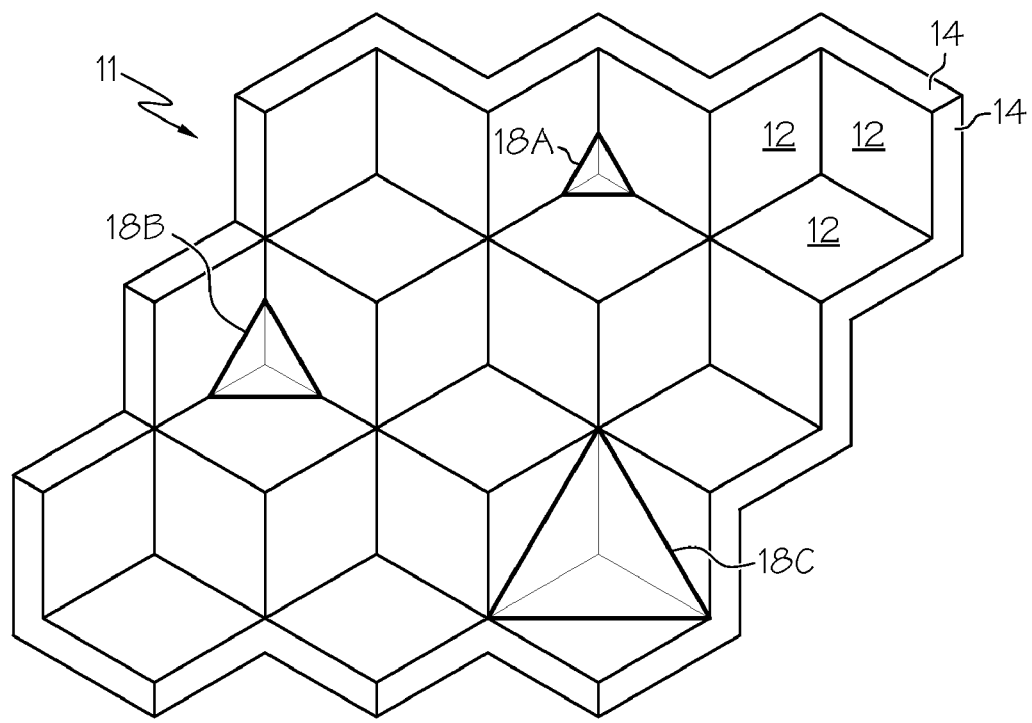
FIG. 33 is a top view of an open-faced retroreflective sheeting embodiment including three solid truncated corner-cube structures of different sizes on a first surface thereof, in accordance with an embodiment of the present invention.

The embodiment of FIGS. 33 and 34 illustrate that several different-sized solid truncated corner-cube structures 18A, 18B, 18C, 18D, 18E, 18F can be combined in a common array at either or both of the front side and back side of the array. The triangular areas in the illustration are representative of the front window surfaces of the solid truncated corner-cubes 18A, 18B, 18C, 18D, 18E, 18F.

The embodiment of FIG. 35 illustrates that the window surfaces can be cut at a non-normal angle to create a solid corner-cube 18B, 18E that is canted, or that has three reflecting facet sides that are different in size. In this example, two of the reflecting sides of solid corner-cube 18B are the same size and one side is a different size. In the example embodiment of FIG. 36, all three of the solid truncated corner-cube sides of solid corner-cube 18E are of a different size, thereby creating a solid truncated corner-cube that is canted or tilted in a skewed manner.

Using the concepts described herein, any size or shape solid truncated corner-cube or solid full-square structure can be created within the overall corner-cube array. In addition multiple arrays of similar structures which are rotated or oriented at different angles to each other can be combined together within one retroreflective sheeting structure and used to create retroreflected light distributions which meet the needs of specific applications.

The embodiments of FIGS. 37 and 38 demonstrate that the solid corner-cube window 18 can be constructed to cover the entire area of one of the parallel walled array cavities. When the entire volume of one cavity is covered, a solid full-square-sided corner-cube is provided.

The embodiment of FIG. 39 demonstrates that the solid corner-cube window region 18 can be constructed to fill in an area that is irregular in shape to create complete full-square-sided corner-cubes and portions of full-square-sided or truncated corner-cube sections. Some portions of the parallel walled array retroreflect fully as a full-square-sided retroreflector while other sections are partial full-square-sided retroreflectors or partial truncated retroreflectors. The reflecting walls 12 of the array may be coated with a reflective coating using a pattern coating process prior to filling the cavities to create the resulting corner-cubes or retroreflection may be achieved by total internal reflection from the corner-cube facets on the opposite side of the sheeting.

In another embodiment, the retroreflective sheet can take the form of a two-dimensional linear retroreflecting sheet. For example FIGS. 5 and 6 may be used to represent the cross section of a portion of linear sheeting that has a geometry that goes into and/or out of the page. In this example the incident light will only retroreflect in one specific plane. This configuration is shown in perspective at FIG. 42. In this aspect, linear retroreflective sheeting comprises: a first plurality of two-sided recesses 212A, 212B which form first open-faced linear prism structures 214A at a first surface 12C; and a second plurality of two-sided recesses 212A, 212B which form second open-faced linear prism structures 214B at a second surface 12D. As in the above-described embodiments, the first and second linear corner-cubes are nested and opposing, such that the proud apexes 216A of the first linear prism structures 214A of the first surface 12C are aligned in a vertical direction with the recessed apexes 216B of the second linear prism structures 214B of the second surface 12D. Retroreflection occurs in this example embodiment in a manner similar to the examples described above. For example, retroreflection of light ray R1 incident at the first surface 12C occurs as a result of refraction into the body 16 of the sheeting, internal reflection and refraction at the second surface 12D, and emission at the first surface 12C from a location at a different prism structure than the point of entry. Opposite-side retroreflection of light ray R3 can also occur, as described above. Transmission of light ray R2 through the body can also occur, in the manner described above. Such a linear retroreflective sheeting embodiment of this design may be used, for example as a light recycling film, a light redirecting film and an anti glare film. The surfaces 12C and 12D including the apexes formed by the surfaces may have built in dimensional variations for which are used for managing the light passing through the part. For example the height of the apex(s) on either side of the part may vary such that the apex will only contact adjacent optical films at points which are selected to reduce moire' fringes or interference fringes that may occur between adjacent parts that do not have a built in variation. In addition the surfaces 12C and 12D may include micro structure which is designed to redirect the light. Any of the features described herein in connection with the corner-cube based retroreflective sheeting structure embodiments can be applied to the linear-prism-based retroreflective sheeting structure embodiments.

Figure 42:
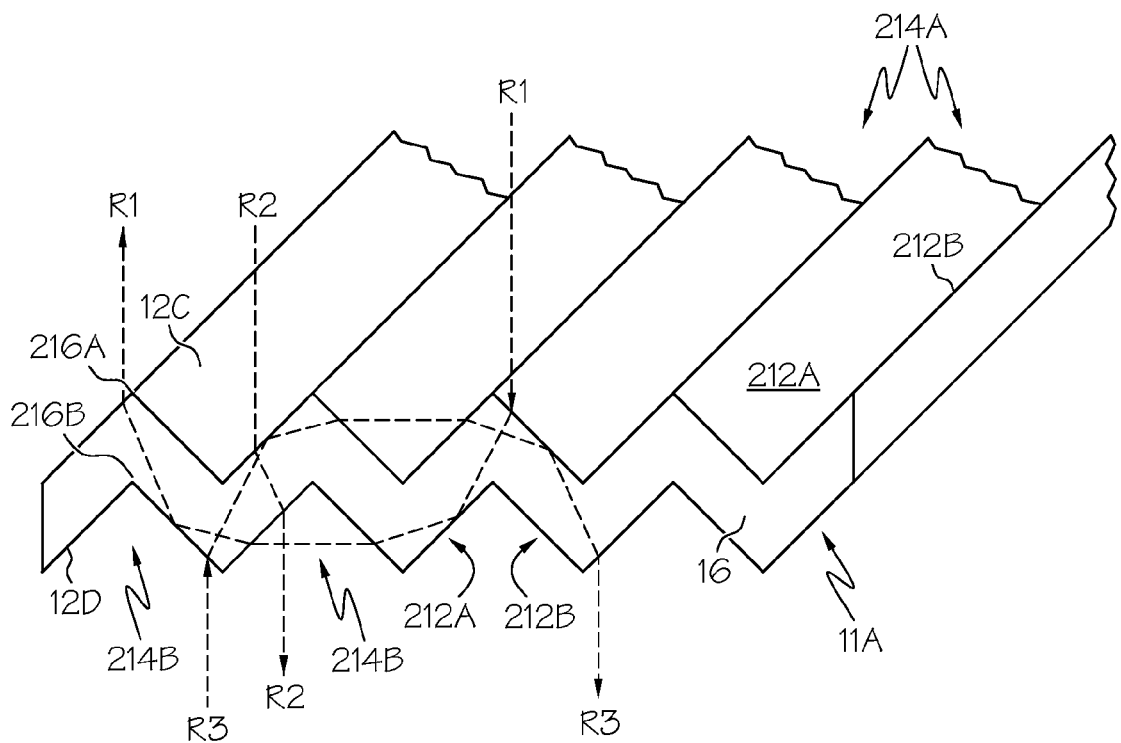
FIG. 42 is a perspective view of a linear retroreflective sheeting embodiment, in accordance with another embodiment of the present invention.
Figure 43:
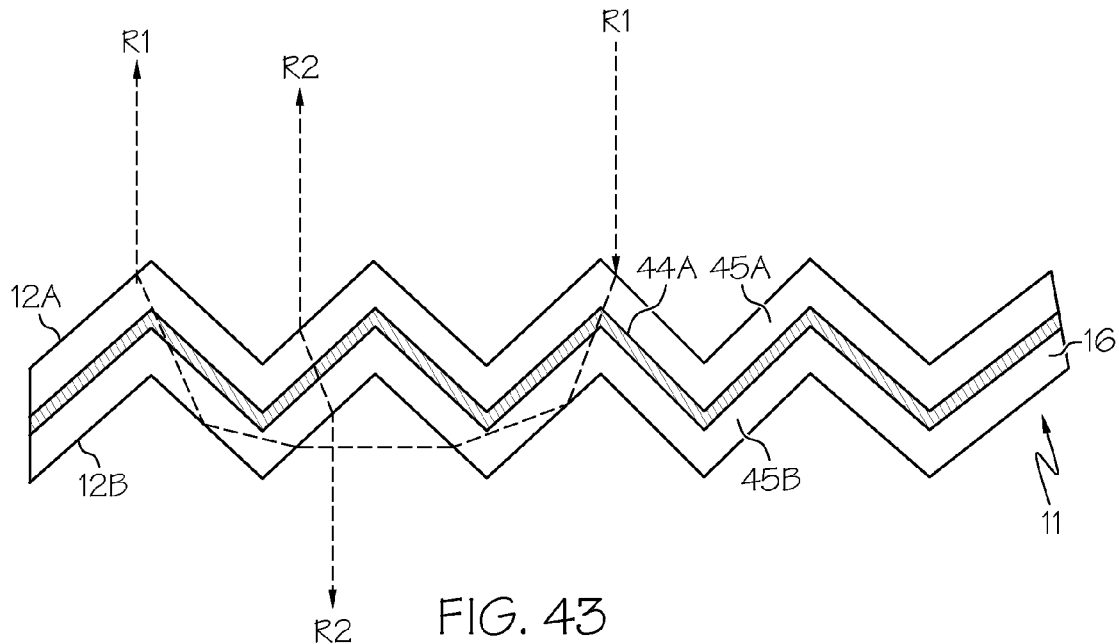
FIG. 43 is a cross-sectional side view of an open-faced retroreflective sheeting in accordance with another embodiment of the present invention that is formed to have a substrate in a central portion thereof.

In other embodiments, the linear prism based retroreflective sheeting, such as that shown in FIG. 42, or the full square sided corner cube sheeting such as that shown throughout the remainder of the specification, can be constructed from multiple sections that are formed separately and assembled relative to a substrate, or otherwise formed about a substrate. Referring to FIG. 43, which is a cross-sectional side view of an open-faced retroreflective sheeting in accordance with another embodiment of the present invention that is formed to have a substrate in a central portion thereof, in this example, a substrate 44A positioned intermediate the sheeting structure can be used as a base to form the retroreflective sheeting. In this example, the substrate 44 does not necessarily need to be of a consistent thickness or continuously and consistently parallel-walled. Rather, the parallel walls for the corner-cube structures of the first and second surfaces 12A, 12B will be formed during the manufacturing process. The materials of the layered sheets of the substrate 44 and the body sheets 45A, 45B may have similar indexes of refraction or different indexes of refraction depending on the amount of Fresnel reflection desired at the boundaries between the materials. In addition, the intermediate substrate can comprise multiple layers, and, in one embodiment, at least two of the layers can have respective indices of refraction that are different. The material of the layers 44A, 45A, 45B may optionally contain a dye to provide the selective transmission of different wavelengths of light, and may optionally have surface optical coatings to provide the selective transmission of different wavelengths of light. Fillers or surface structures, such as those described above can be used for controlling the path of the light passing through or reflecting from the material layer. The materials used to construct the above parts may have high or low modulus of elasticity depending on the properties of the finished part that are desired. Alternatively, the layers 44A, 45A, 45B may have a wavelength-selective optical coating applied to them, or the respective indices of refraction at their boundaries selected, to produce various desired optical effects.

There are many processes that may be used to form the parallel walled corner cube structures. In the case of the embodiment of FIG. 43, in one example, the two mold halve temperatures are adjusted to allow forming of the materials that are in contact with the respective mold halve. In this case each material is a thermoplastic material though it is possible to have inner layers that are made of thermoset materials. The thermoset materials will mud crack and slide during the forming processes and can create some unusual beneficial optical effects. In this example, the molds will self center as the proud apex on one halve of the mold pushes the molten non-Newtonian fluid thermoplastic into the recessed apex on the other halve of the mold. Any alignment that is not already present in the mold halve assembly may be achieved by allowing a small amount of free motion in the mold halves as the mold halves close. The mold halves will float on the molten plastic until the plastic cools below the glass transition temperature. The plastic can still move some when below the glass transition temperature if the pressure is high enough. This movement can create shear if the force is too high. When the plastic is cooled to below the heat distortion temperature the part may be removed from the mold.

Figure 44:
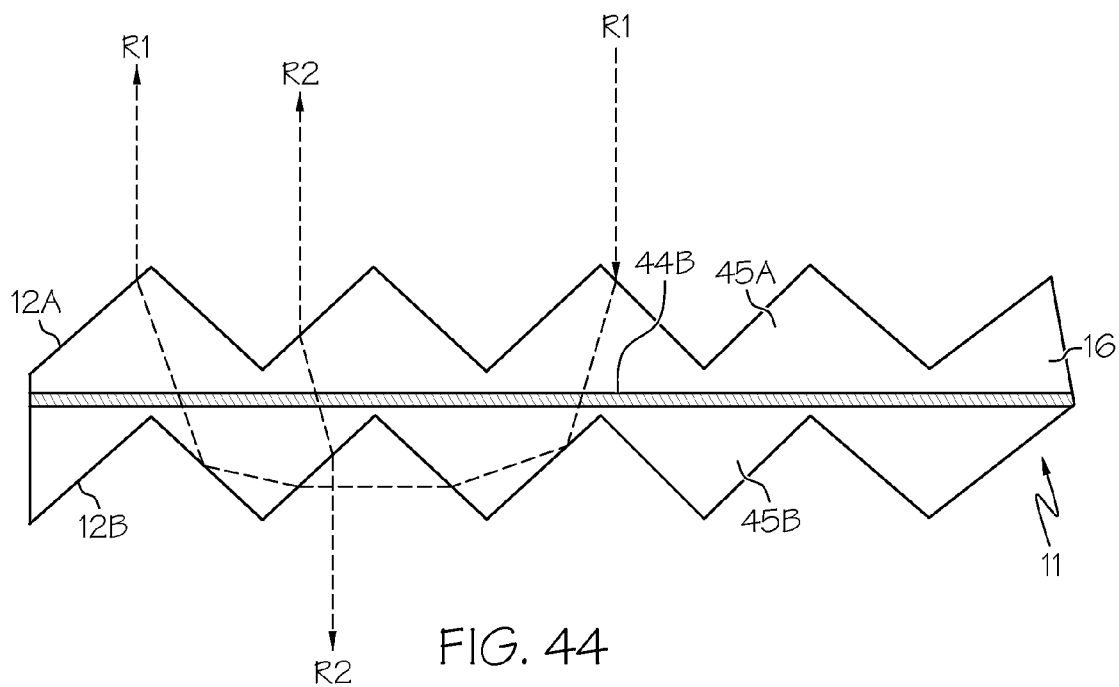
FIG. 44 is a cross-sectional side view of an open-faced retroreflective sheeting in accordance with another embodiment of the present invention that is formed to have a substrate in a central portion thereof.

FIG. 44 is a cross-sectional side view of an open-faced retroreflective sheeting in accordance with another embodiment of the present invention that is formed to have a substrate in a central portion thereof. In this example, a thermoplastic or a thermoset material can be used, for example, for forming the outer layers 45A, 45B. In this case the mold halves proud and recessed features will not be self-centering so the alignment required to achieve the parallel walled structure must be included in the mold and mold platen closing mechanism. This alignment is readily achieved to high precision by first carefully closing the molds upon each other without material in place and then fastening the molds in the aligned position. Mold guide pins then serve to align the two mold halves and keep the mold halves within alignment as the mold opens and closes. The corner-cube features of the part may be formed on one side of the substrate 44B at a time or both sides of the part simultaneously. A transparent polymer mold may be used for manufacturing processes where radiation curing is required to pass through the mold. Small pitch structures of less than approximately 0.010' pitch may be made more cost effectively by casting and curing the structures onto to each side of substrate 44B. The structures on each side do not need to be in exact linear or side to side alignment for retroreflection to take place. The structure surfaces 12A and 12B and also proud apexes and recessed apexes may have regular or random wavy or undulating surface contours.

Figure 45:
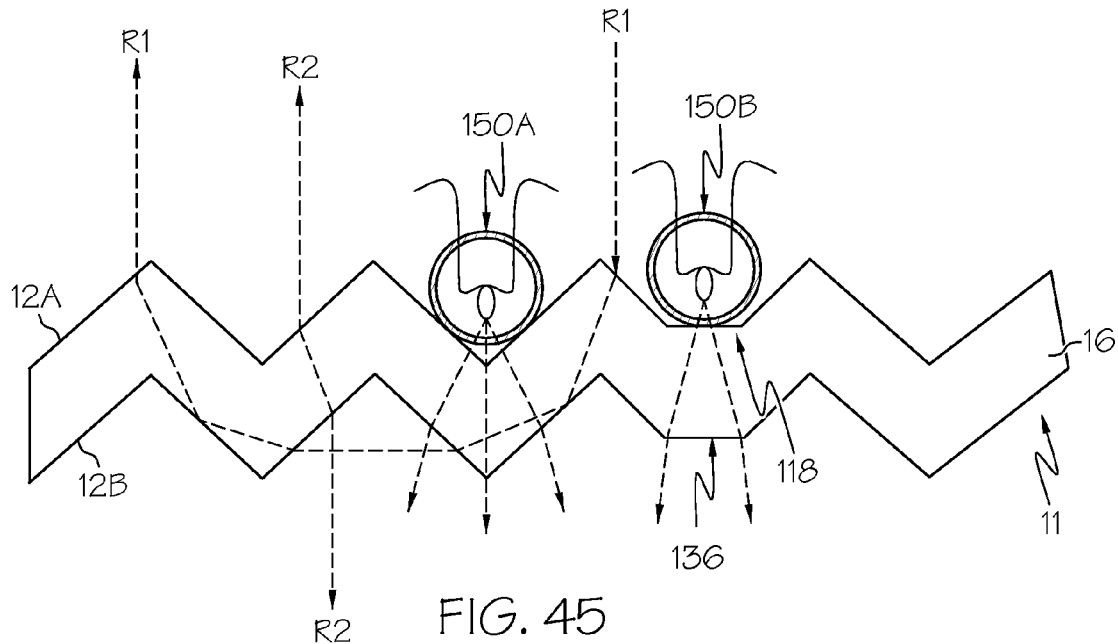
FIG. 45 is a cross-sectional side view of an open-faced retroreflective sheeting including light sources applied to one or both surfaces in accordance with another embodiment of the present invention.

FIG. 45 is a cross-sectional side view of an open-faced retroreflective sheeting including light sources applied to one or both surfaces in accordance with another embodiment of the present invention. In this embodiment, light sources such as LED light sources 150A, 150B are used in combination with the open-faced two-sided corner cube retroreflective sheeting. The retroreflective sheeting 11 operates in combination with the light sources 150A, 150B and provides, for example, a back-up safety light retroreflector function should the light sources 150A, 150B fail to operate.

FIG. 45 illustrates an example of how a light source 150A, 150B can be used in combination with the retroreflective sheeting 11. In a first example, a first light source 150A is positioned in the recess region of a corner cube of the first corner cube surface 12A. A second light source 150B is positioned on a flat 118 of the first corner cube surface 12A. As shown in FIG. 45, assuming the light sources 150A, 150B are oriented in a downward direction, into the body of the retroreflective sheeting 11, a majority of the light is emitted from the second corner cube surface 12B. In the case of the second light source 150B, the light entering the body of the retroreflective sheeting 11 at flat 118 is emitted from a flattened proud apex 136 of the second corner cube surface 12B.

Figure 46:
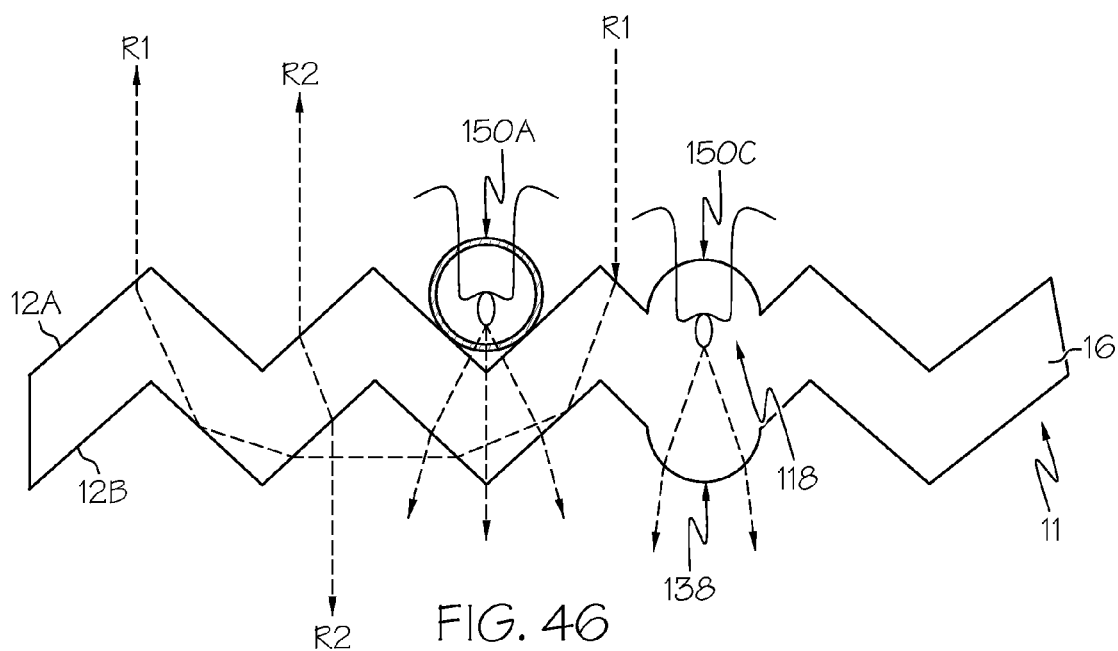
FIG. 46 is a cross-sectional side view of an open-faced retroreflective sheeting including applied light sources and integrated light sources in accordance with another embodiment of the present invention.

FIG. 46 is a cross-sectional side view of an open-faced retroreflective sheeting including applied light sources and integrated light sources in accordance with another embodiment of the present invention. In this example, the first light source 150A is similar to that shown in FIG. 45A above. The second light source 150C is embedded, or integrated, into the body of the retroreflector sheeting 11. A lens 138, or other optical feature, can be incorporated or otherwise added to the second corner cube surface 12B at the position where the light is emitted from the second light source 150C to provide desired optical effects.

Although the above embodiments illustrate light sources 150A, 150B, 150C positioned at only the first surface 12A of the retroreflective sheeting 11, the light sources may optionally be positioned at the second surface 12B, or at both surfaces 12A, 12B, of the retroreflective sheeting 11. The light sources 150A, 150B, 150C can be positioned on the sheeting to create a message such as "STOP", and can be modulated to create attention. The light sources may also be modulated to send a signal. The light sources may be wavelength specific. In various embodiments, the light sources can be selected to that they are visible only at specific wavelengths in the UV or visible (single color) or IR (NIR, SWIR, MWIR, LWIR) portions of the spectrum. All modes of retroreflection described herein are compatible with the use of the light sources. Positions for a battery and suitable electronics may be molded into the retroreflector body, if desired.

As described herein, the retroreflective sheeting and light source combination can be encased in a transparent envelope to isolate the system from the environment. The envelope material may be a transparent color such as a wavelength-selective color, and the envelope may be a rigid or flexible material of a low or high modulus of elasticity. In another embodiment, the light sources 150A, 150B, 150C can be located within microholes formed in the body of the retroreflective sheeting or located within the material that forms the body of the sheeting.

Figure 47A:
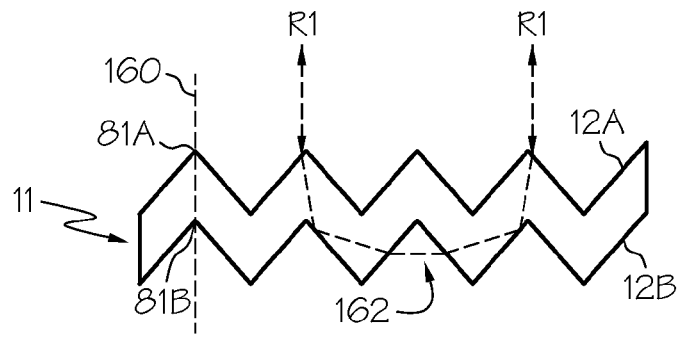
FIGS. 47A-47C illustrate retroreflection that occurs in two-sided retroreflective sheeting of differing thicknesses, in a case where the proud apexes of corner-cubes of a first corner-cube surface of the sheeting are vertically aligned with the recessed apexes of corner-cubes of a second corner cube surface of the sheeting, in accordance with embodiments of the present invention.
Figure 47B:
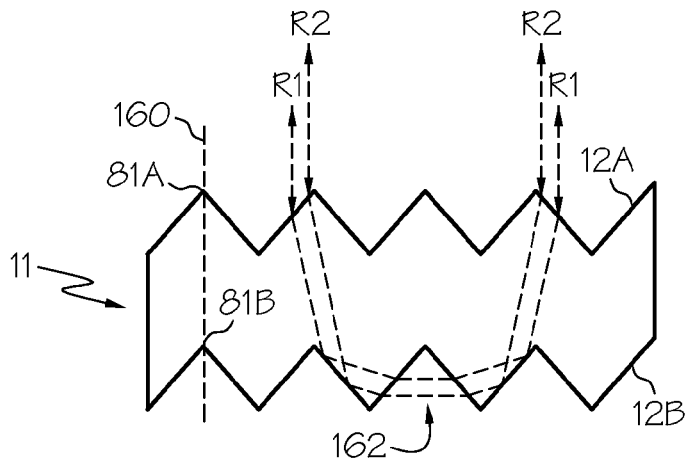
Figure 47C:
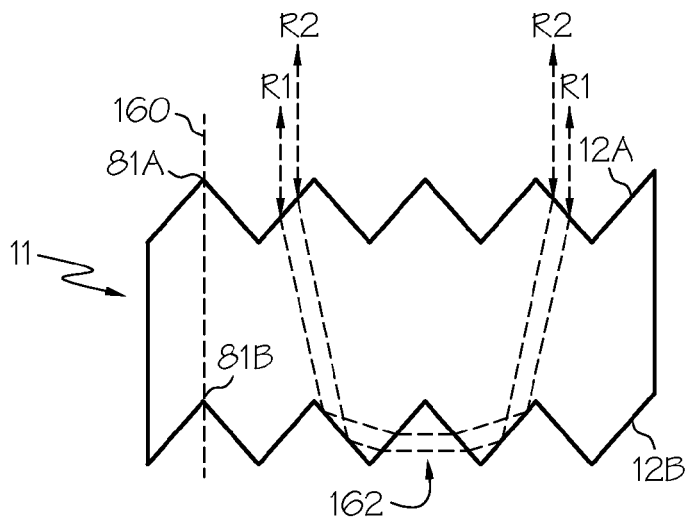

FIGS. 47A-47C illustrate retroreflection that occurs in two-sided full-square-sided retroreflective sheeting of differing thicknesses, in a case where the proud apexes of corner-cubes of a first corner-cube surface of the sheeting are substantially aligned in a horizontal direction of the sheeting with the recessed apexes of corner-cubes of a second corner cube surface of the sheeting, in accordance with embodiments of the present invention. For example, the proud apexes 81A of corner-cubes of the first corner-cube surface 12A of the sheeting 11 are substantially aligned along vertical axis line 160 with the recessed apexes 81B of corner-cubes of the second corner cube surface 12B of the sheeting 11. In these examples, the propagation paths of light rays R1 and R2 are similar to those described above in reference to ray R1 of FIGS. 5 and 6. In each case, the light rays R1, R2 enter the body of the sheeting 11 at the first corner-cube surface 12A, propagate through the body of the sheeting 11, exit the body of the sheeting 11 at the second corner-cube surface 12B at region 162, re-enter the body of the sheeting at the second corner-cube surface 12B, and exit the body of the sheeting as a retroreflected ray R1, R2 at the first corner-cube surface 12A. This retroreflective behavior is illustrated at all three body thicknesses shown in FIGS. 47A-47C. The thickness of the body can be optimized to achieve maximum retroreflection as a function of the body material and the pitches of the corner-cubes on the first and second surfaces.

FIGS. 48A-48D illustrate retroreflection that occurs in two-sided retroreflective sheeting of differing thicknesses, in a case where the proud apexes of corner-cubes of a first corner-cube surface of the sheeting are not horizontally aligned with the recessed apexes of corner-cubes of a second corner cube surface of the sheeting, but rather are laterally offset by a horizontal distance, in accordance with embodiments of the present invention. In the present examples, the proud apexes 81A of corner-cubes of the first corner-cube surface 12A of the sheeting 11 are not horizontally aligned with the recessed apexes 81B of corner-cubes of the second corner cube surface 12B of the sheeting 11 along vertical axis line 160. Instead, there is a lateral offset in the horizontal direction between the proud apexes 81A of the corner-cubes of the first corner-cube surface 12A and the recessed apexes 81B of the corner-cubes of the second corner cube surface 12B. The offset is referenced by offset arrow 164 in the drawings.

In the examples of FIGS. 48A-48D, the propagation paths of light rays R1 and R2 are similar to those described above in reference to ray R1 of FIGS. 5 and 6 and rays R1 and R2 of FIGS. 47A-47C. In each case, the light rays R1, R2 enter the body of the sheeting 11 at the first corner-cube surface 12A, propagate through the body of the sheeting 11, exit the body of the sheeting 11 at the second corner-cube surface 12B at region 162, re-enter the body of the sheeting at the second corner-cube surface 12B, and exit the body of the sheeting as a retroreflected ray R1, R2 at the first corner-cube surface 12A. This retroreflective behavior is illustrated at various body thicknesses and at various horizontal offsets 162, as shown in FIGS. 48A-48D. As in the above embodiments, the thickness of the body can be optimized to achieve maximum retroreflection as a function of the body material and the pitches of the corner-cubes on the first and second surfaces, and further as a function of the amount of horizontal offset 162.

Figure 48A:
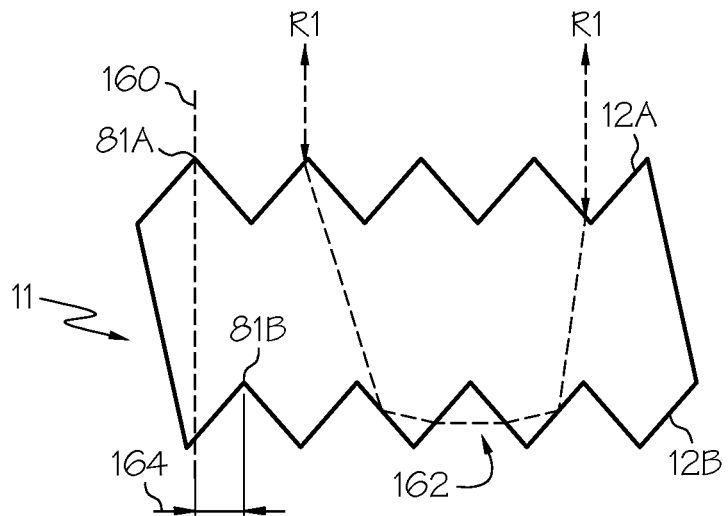
FIGS. 48A-48D illustrate retroreflection that occurs in two-sided retroreflective sheeting of differing thicknesses, in a case where the proud apexes of corner-cubes of a first corner-cube surface of the sheeting are not vertically aligned with the recessed apexes of corner-cubes of a second corner cube surface of the sheeting, but rather are offset by a horizontal distance, in accordance with embodiments of the present invention.

Referring to FIG. 48A, the horizontal offset 164 is less than the pitch of the corner-cube structures.

Figure 48B:
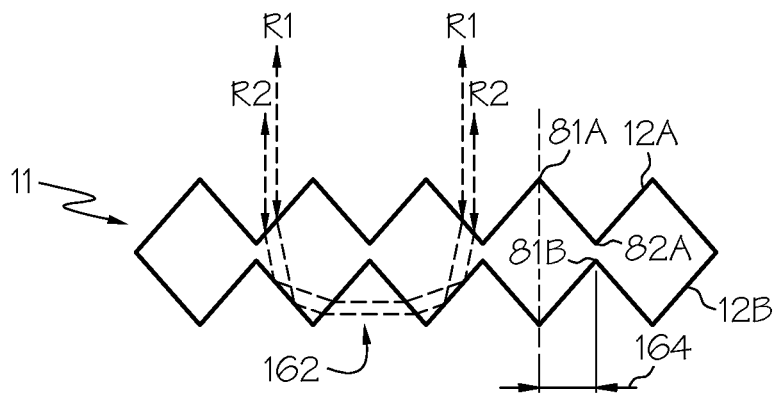

In the embodiment of FIG. 48B, the recessed apexes 82A of the first surface 12A are substantially aligned with the recessed apexes 81B of the second surface 12B. In this case, the horizontal offset amount 164 between the proud apexes 81A of the first surface 12A and the recessed apexes 81B of the second surface 12B is about one-half of the pitch of the corner-cubes of the first and second surfaces 12A, 12B. Comparing the embodiment of FIG. 48B to that of FIG. 48A, it is notable that the retroreflected ray R1 is emitted from the first surface 12A at a corner-cube that is one less corner-cube in distance from the corner-cube at which the point of entry occurred. In this case, where the recessed apexes of the first and second surfaces are substantially aligned, a maximum amount of retroreflection will occur in a case where the thickness of the body of the sheeting, namely the thickness of the body between the recessed apexes, is at a minimum.

Figure 48C:
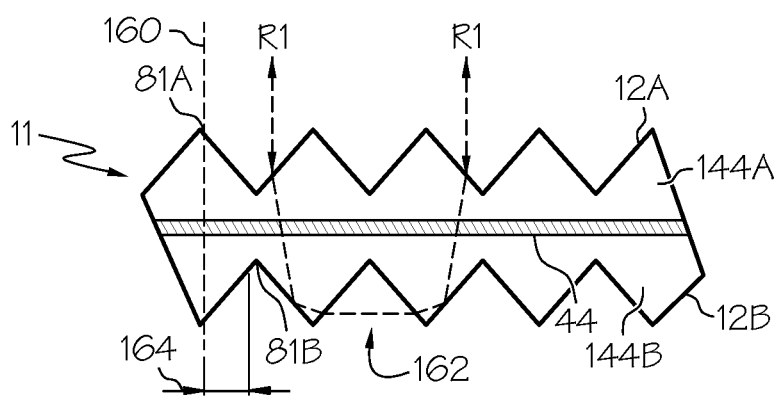

In the embodiment of FIG. 48C, the body of the sheeting is thicker relative to the embodiment of FIG. 48B, and retroreflection of ray R1 is exhibited. While the embodiments of FIG. 48A and 48B are illustrated as one-piece, unitary, embodiments, the embodiment of FIG. 48C illustrates that the sheeting 11 can be formed from multiple components, for example, in the manner described above in connection with FIG. 44. The first and second sheeting sections 144A, 144B can be bonded together using a bonding material, or alternatively, bonded to a substrate 44, as described above.

Figure 48D:
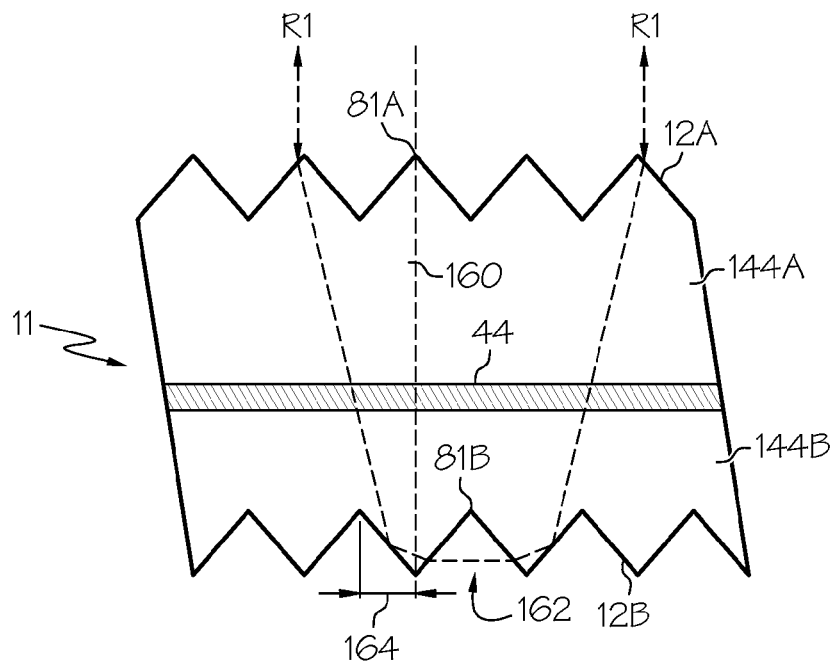

In the embodiment of FIG. 48D, the body of the sheeting is thicker relative to the embodiment of FIG. 48C, and retroreflection of ray R1 is exhibited. In this example, the sheeting is formed from multiple sections, as described above in connection with FIG. 48C. In this example, is notable that the retroreflected ray R1 is emitted from the first surface 12A at a corner-cube that is one additional corner-cube in distance from the corner-cube at which the point of entry occurred, relative to FIG. 48C.

In the above examples, the sheeting can be optimized to any desired parameter, including thickness, pitch, offset, and the like, in order to achieve peak performance for a given application. Such peak performance can depend additionally on the respective presence of truncated and full-square-sided corner cubes on the first and second surfaces of the sheeting. As described above the pitches of the corner cubes of the first and second surfaces need not be the same. Assuming different pitches, the thickness of the body and the lateral offset of the proud and recessed apexes of the corner cubes of the first and second surfaces can be optimized to accommodate the different pitches in consideration of the desired performance.

Figure 49:
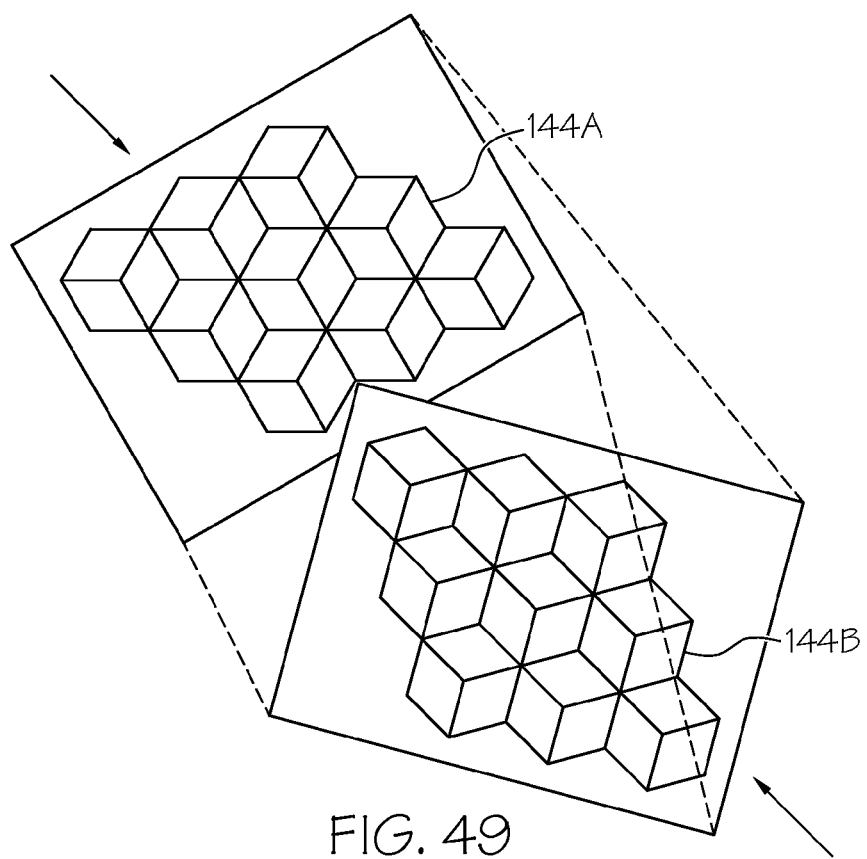
FIG. 49 is an exploded perspective view of a retroreflective sheeting illustrating angular displacement of the corner-cube structures of a first surface of a first portion of the sheeting relative to the corner-cube structures of a second surface of a second portion of the sheeting, in accordance with embodiments of the present invention.

FIG. 49 is an exploded perspective view of a retroreflective sheeting illustrating angular displacement of the corner-cube structures of a first surface of a first portion of the sheeting relative to the corner-cube structures of a second surface of a second portion of the sheeting, in accordance with embodiments of the present invention. In this example, first and second sheeting sections 144A, 144B are prepared, and placed back to back with their respective corner-cube surfaces facing outward. The primary axes of the first and second corner cube surfaces, for example, the axes as defined along the peaks of adjacent corner-cubes, are offset in an angular direction, relative to each other. It has been exhibited experimentally that retroreflection can and will occur in this example, for example, the type of retroreflection that occurs for rays R1 and R2 in the example of FIGS. 48A-48D, with a portion of the ray being emitted from and re-entering a back-side of the sheeting, such as at region 162. In other embodiments, a portion of the corner-cube structures on the first (or second) side of the sheeting are arranged along a first primary axis, and a portion of the corner-cube structures on the first (or second) side of the sheeting are arranged along a second primary axis, and the first and second primary axes lie at an angle, for example an acute angle, relative to each other.

Different sections of the retroreflective sheeting having different properties, for example, having different angular orientations, different sheeting thicknesses, different wall thicknesses, different types of corner-cube structures, different types of wavelength-selective coatings, etc., can be combined in a combined retroreflective sheeting structure. For example, the different sections can be combined in a tiled or parquet configuration.

In one experiment, a 10.13 mm (0.399") thick, the thickness measured between the proud apex of the first side to the proud apex of the second side, two-sided open-faced corner cube with a 4.0 mm pitch (proud or recessed apex to apex distance) component was fabricated from acrylic. The component was fabricated in two halves that meet at the center line between the recessed apexes of the resulting component. The two halves were assembled together with index matching fluid. This assembly was configured so that the two sections of open faced corner cubes could be moved laterally and rotationally with respect to each other while maintaining a consistent thickness of acrylic between the two parts. A white light source was directed through a beam splitter at the open faced corner cube structures. A digital camera was used to record the areas of the open faced corner cubes within the overall structure that exhibit retroreflection of light.

Retroreflection of light was exhibited in a case where the two sections were moved 2.0 mm relative to each other in a first horizontal direction and in a case where the two sections were moved 2.0 mm relative to each other in a second horizontal direction, illustrating that retroreflection can occur in a case where the recessed and proud apexes of the respective first and second sections are offset and not aligned, according to the embodiment illustrated above in connection with FIGS. 48A-48D.

Retroreflection of light was also exhibited in a case where the two sections were displaced in an angular direction relative to each other, according to the embodiment illustrated above in connection with FIG. 49. In various experiments, one of the two sections was rotated 15 degrees, 30 degrees, 40 degrees, 45 degrees, 55 degrees, 70 degrees, 80 degrees, and 90 degrees. Retroreflection of light was exhibited in all cases, with varying amounts that were dependent on the orientation.

The above example is described as made up of two sections. The same part may be manufactured out of one piece of material by orienting the top and bottom sections of the tooling used to form the part to the desired angular positions prior to forming the finished part.

FIGS. 51A-51D are cross-sectional side views of an open-faced retroreflective sheeting structure illustrating different types of retroreflection that can occur for partially filled and solid corner-cube structures on the first surface, in accordance with embodiments of the present invention.

Figure 51A:
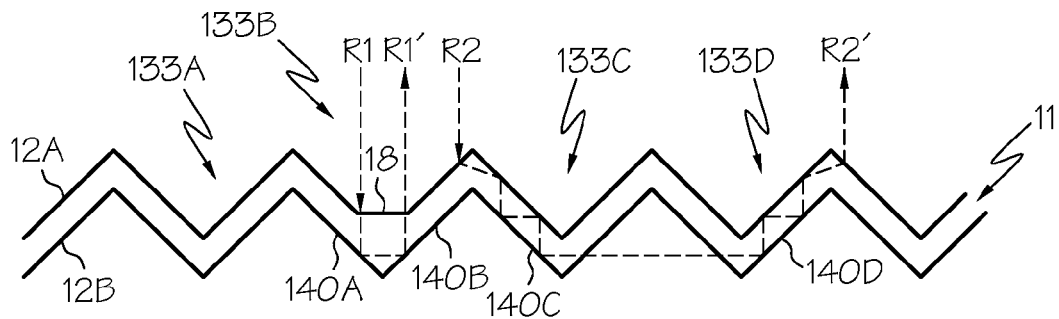
FIGS. 51A-51D are cross-sectional side views of an open-faced retroreflective sheeting structure illustrating different types of retroreflection that can occur for partially filled and solid corner-cubes on the first surface, in accordance with embodiments of the present invention.

Referring to FIG. 51A, corner-cube structures 133A and 133C are full-square sided open-faced corner cube structures, while corner-cube structure 133B, is a truncated corner-cube structure, including flat 18 on the first surface 12A and facets 140A, 140B of open-faced corner-cube structures on the second surface 12B. Retroreflection is exhibited by electromagnetic energy ray R1, incident at the flat 18 on the first surface 12A and internally reflected at the second surface 12B by facets 140A, 140B. In this manner, both the first surface 12A and the second surface 12B contribute to retroreflection of incident ray R1. Retroreflection is also exhibited by ray R2, incident at the rightmost facet of corner-cube structure 133B on the first surface and internally reflected at the second surface 12B by facets 140C, 140D, in the manner described herein. In this manner, both the first surface 12A and the second surface 12B contribute to retroreflection of incident ray R2. In this example, light tunneling is exhibited by ray R2 between the leftmost facet of corner-cube structure 133C on the first surface 12A and facet 140C of the second surface 12B, and between the rightmost facet of corner-cube structure 133D on the first surface 12A and facet 140D of the second surface.

Figure 51B:
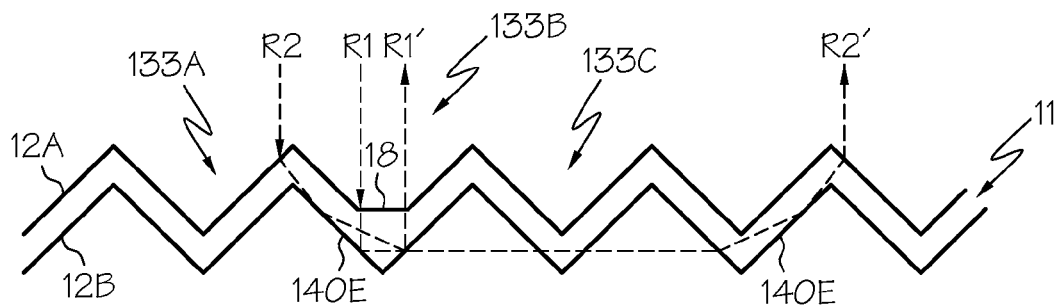

Referring to FIG. 51B, which is the same configuration as that of FIG. 51A, retroreflection is exhibited by electromagnetic energy ray R1, incident at the flat 18 on the first surface 12A and internally reflected at the second surface 12B by facet 140E. In this manner, both the first surface 12A and the second surface 12B contribute to retroreflection of incident ray R1. Retroreflection is also exhibited by ray R2, this time incident at the rightmost facet of corner-cube structure 133A on the first surface 12A and internally reflected at the second surface 12B by facets 140E, 140E', in the manner described herein. In this manner, both the first surface 12A and the second surface 12B contribute to retroreflection of incident ray R2. In this example, it can be seen that the same facet 140E contributes to both truncated-corner-cube-type retroreflection of ray R1 and parallel-walled-type retroreflection of ray R2.

Figure 51C:
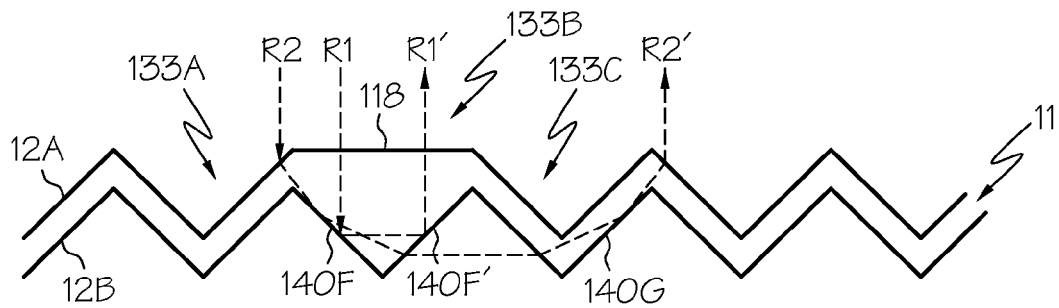

The configuration of FIG. 51C, is similar to that of FIG. 51B, except that the flat 118 of FIG. 51B of the corner-cube structure 133B fills the corner cube structure 133B. As a result, the corner cube structure 133B, including facets 140F and 140F', and the portion of the body of material of the structure therebetween operates as a solid, full-square-sided corner cube to energy incident at the flat 118. Retroreflection is exhibited by electromagnetic energy ray R1, incident at the flat 118 on the first surface 12A and internally reflected at the second surface 12B by facet 140F, 140F'. In this manner, both the first surface 12A and the second surface 12B contribute to retroreflection of incident ray R1. Retroreflection is also exhibited by ray R2, incident at the rightmost facet of corner-cube structure 133A on the first surface 12A and internally reflected at the second surface 12B by facets 140F, 140G, in the manner described herein. In this manner, both the first surface 12A and the second surface 12B contribute to retroreflection of incident ray R2.

Figure 51D:
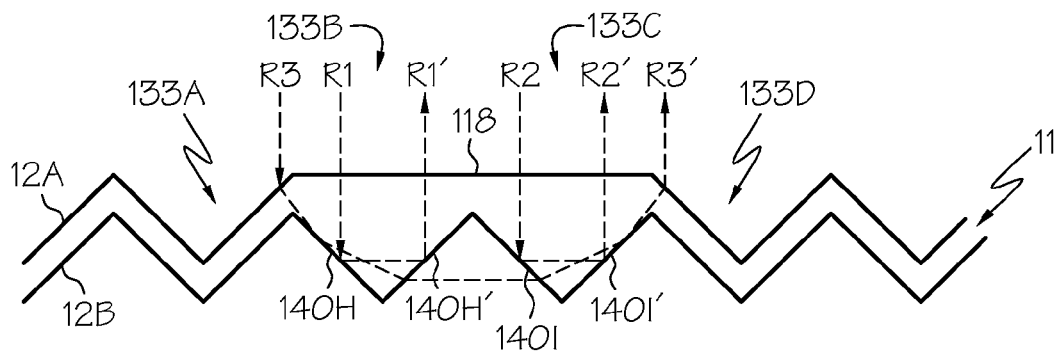

The configuration of FIG. 51D, is similar to that of FIG. 51C, except that two solid, full-square-sided corner cube structures 133B, 133C are provided side-by-side. Retroreflection is exhibited by electromagnetic energy rays R1, R2, incident at the flat 118 on the first surface 12A and internally reflected at the second surface 12B by facets 140H, 140H' and 140I, 140I' respectively. In this manner, both the first surface 12A and the second surface 12B contribute to retroreflection of incident rays R1, R2. Retroreflection is also exhibited by ray R3, incident at the rightmost facet of corner-cube structure 133A on the first surface 12A and internally reflected at the second surface 12B by facets 140H, 140I' and refracted by facets 140H' and 140I, in the manner described herein. In this manner, both the first surface 12A and the second surface 12B contribute to retroreflection of incident ray R2.

The embodiments described herein demonstrate that many types of substantially parallel walled corner-cube structures and means of retroreflection may be present within a single array. It is also demonstrated that different arrays can be combined together and oriented at different angles with respect to each other to create any desired light pattern. In addition, any of the well known methods of varying the error in the dihedral angles of the corner-cubes away from a perfect 90 degrees, such as: adding secondary facets within one or more reflecting facet of a corner-cube, adding textures to any of the reflecting facets, walls or windows, adding diffractive structures to any of the reflecting facets, walls or windows, adding curvature to any of the reflecting facets, walls or windows and adding apodizing structures to any of the reflecting facets, walls or windows of the retroreflecting means, can be used to change the distribution of the retroreflected light from the array or combined arrays.

Some or all of the following retroreflecting characteristics can be contained within one array or within combinations of arrays on the same retroreflective sheeting according to the embodiments described herein:

- Parallel walled retroreflection relying solely on total internal reflection and refraction, where no reflective coatings are used
- Parallel walled retroreflection relying partially on total internal reflection and refraction, where reflective coatings are used in select regions
- Solid truncated corner-cube(s) retroreflection with corner cubes which may be canted or tilted relying on total internal reflection, where no reflective coatings are used
- Solid truncated corner-cube(s) retroreflection with corner cubes which may be canted or tilted relying partially or entirely on reflective coatings
- Full-square-sided corner-cube(s) retroreflection with corner cubes which may be canted or tilted relying on total internal reflection
- Solid truncated corner-cube(s) retroreflection with corner cubes which may be canted or tilted relying partially or entirely on reflective coatings The retroreflecting characteristics above may in addition include;

- Variation in the dihedral angles of the corner-cube reflecting facets or the parallel walled reflecting surfaces
- Multiple facet planes or steps within the corner-cube reflecting facets or the parallel walled reflecting surfaces or windows
- Texture added to the reflecting facets or parallel walled reflecting surfaces or windows
- Diffracting structures added to the reflecting facets or parallel walled reflecting surfaces or windows
- Resonating structures added to the reflecting facets or parallel walled reflecting surfaces or windows
- Apodizing structures added to the reflecting facets or parallel walled reflecting surfaces or windows
- Contours added to the reflecting facets or windows to give desired optical effects, such as focusing and the like.

As described above, the individual corner-cube structures or arrays of corner-cube structures may be tilted to achieve wide entrance angle retroreflected light performance. Individual corner-cubes or arrays of corner-cubes may be oriented or tilted at any direction with respect to adjacent corner-cubes or arrays of corner-cubes to achieve unique retroreflected light distributions. The surfaces may be equal in length and area or of different lengths and area. The areas may be of any shape such as continuously curved side areas like circles or linear side areas like polygon areas. The sheeting may consist of multiple layers of retroreflective sheeting of the embodiment. The sheeting may have "see-through" transparent sections which allow an object behind the sheeting structure to be viewed from various directions. The sheeting may consist of large and small corner-cube array areas. Each area may consist of large pitch and small pitch full-square-sided and truncated corner-cubes. Sections of the sheeting array may be oriented at various angles to each other to create retroreflected light distributions with combined oriented light patterns. Any desired retroreflected light distribution can be created.

These and other characteristics of the various embodiments described herein can be employed independently, or combined, to provide for various useful applications. For example, the parallel walled retroreflective structure in either a full-square-sided format or a truncated corner-cube format can be used to recycle and distribute light in lamps used for ambient indoor or outdoor lighting or in back-lighted or front-lighted displays. The full-square-sided format can operate as a two-directional retroreflector. The truncated format can operate as a two-sided or one-sided retroreflector. The retroreflection and light tunneling features of the structure recycle and distribute light from a source so that the light is uniformly spread over a wide area. This phenomenon has been demonstrated experimentally as is described above as the glow effect. The embodiments described herein can be used in combination with cold cathode fluorescent light sources, LED light sources and incandescent light sources to provide uniform lighting for ambient indoor or outdoor lighting or in back lighted or front lighted displays. Other optical films, optical waveguides and optical reflectors can be used in conjunction with the parallel walled retroreflective structure to manipulate light into a uniform pattern for ambient indoor or outdoor lighting or in back lighted or front lighted displays.

In another embodiment the retroreflective structure can be used as an anti-glare sheet in a back lighted or front lighted display. In another embodiment, the retroreflective structure can be used as a privacy sheet in a back lighted or front lighted display.

In another embodiment, the retroreflecting sheet can be applied as a window to identify a gas or a fluid or a biological medium or evaluate gas flow, fluid flow or for a biological sensor. In another embodiment, the retroreflecting sheet can be applied as a window in a non-contact sensor. In another embodiment, the two sided parallel walled retroreflecting sheet can be applied as a tag used for tagging, tracking and locating objects. In another embodiment, the two sided parallel walled retroreflecting sheet can be applied as an optical switch that varies signal in proportion to the specific corner-cube design used and/or the amount of fill material. In another embodiment, the two sided parallel walled retroreflecting sheet can be used as a safety device that increases signal in proportion to the amount of fill material. Large-format parallel walled arrays can be used in architectural applications for ambient and artificial light control which may include privacy applications. In these embodiments, the pitch size for the arrays can be as large as one foot, and larger.

Molded or formed two-sided retroreflectors can be used for retroreflective objects such as dangle tags, security tags, currency security, document security, credit card security, passport security, delineator posts, bollards (also internally illuminated bollards), barricades, cones, channelizers, vehicle parts-bumpers, fenders, body outer shell parts, wheel rims, bicycle rider helmets, helmets of all types-pilots, boating, in-line skating wheels, photoelectric devices, road markers, guard rails, marine buoys, boat outer shell hull parts, boat masts, and snow poles. In addition a living hinge may be formed between sections of the two sided retroreflective material either during the molding process or sequentially as two sided retroreflective material sections are formed to produce a continuous length of two sided retroreflective material that is either all retroreflective or has selected areas of retroreflective features that may be wound onto a roll. This material is useful for making safety tape or entire garments to be used as wrist, waist or ankle safety bands or entire garments. Also, chips 42 can be mixed into transparent UV cured resins and coated onto a plastic substrate to create seamless uniform sheeting useful for many applications.

Many uses for the substantially parallel walled reflective structure and retroreflective chip embodiments include: highway tape, retroreflective paint for highway marking, vehicle retroreflectors including headlamps, backup lights and stop lights, helmets, bumpers, hubcaps, car body trim, door handles, bicycle retroreflectors, back pack straps, umbrella handles, road buttons, one or multiple piece traffic cones, barricades, channelizers, survey markers, laser alignment systems, decorative safety fabric and matting, molded license plates, molded signs, house numbers, mailboxes, sign sheeting, flexible roll-up sign sheeting, airport signs, truck bodies, fiberglass molded parts, boat trim, boat hulls, buoys, flow research, cosmetics, finger nail polish, fencing, foot wear, watch bands, dog collars, emergency exits, door markers, shipboard passage ways, parking garages, railroad gates, life jackets, trail marking, garments and rain garments, light splitters, privacy screens, road signs, projection screens, front and back lighted displays, light control films, document security, credit card security, passport security, electro-optical security and environmental sensors, light recycling sheeting, anti-glare sheeting, privacy sheeting, buttons, jewelry, fluid sensors, biological sensors, and the like.

In still another embodiment the substantially parallel walled corner-cube structure can be made of a material that will add strength to a product. The mechanical interlocking nature of the substantially parallel walled structure features when formed as a sheet, chip, fiber or thread and combined with multiple sections of sheet, chip, fiber or thread of the same or similar structure will create an integrated structure that has added strength. Flexible armor for slowing or stopping projectiles may be made by enclosing stacked overlapping interlocking structures within a flexible enclosure. The integrated structure may be coated or filled with a material such as a thermoset or thermoplastic polymer or a solvent or water based coating. The resulting structure will have a mechanical strength greater than an individual structure or a coating or a filler without the added structure. If the substantially parallel walled sheet, chip, fiber or thread are combined with multiple sections of sheet, chip, fiber or thread of the same or similar structure without a filler, the spacing created by the sections that cross without interlocking will create air pockets and result in a layer that has insulating value. The insulating value will vary with the size and form of the structure and the total thickness created by the number of structures in the layer.

The two-sided open faced corner cube retroreflective sheeting structure can also serve as a high-friction surface. The structure can be made of a tough polymer or rubber, for example, and laid on a low friction surface to significantly increase the friction of the surface. For example door mats or walk ways could be covered with the structure in sheeting form. The structure can be made of transparent material to allow transparency through the sheeting to view the color or message placed on the material underneath the sheeting.

The retroreflective sheeting can also serve as a fluid turbulence enhancing sheeting to reduce the drag that smooth surfaces create as they pass through a fluid or as a fluid passes by a smooth surface.

The open-faced retroreflective sheeting can be made into flakes or chips or thread or fibers which can be mixed with various coatings or resins. The sheeting can also include patterns or gaps having no open-faced full-square-sided or solid truncated cube-corner surfaces. The three sided recesses may be tilted with respect to adjacent three sided recesses to create a glitter effect as light specularly reflects from the sheeting. Each side of the three sided recesses may be composed of multiple facet sections that are tilted with respect to each other and/or include steps in the facet(s).

In another embodiment, the sheeting further comprises a wavelength selective top coat covering at least one of the coating, the paint, the polymer, or the adhesive. In another embodiment, the sheeting further comprises patterns on the retroreflective sheeting having no open-faced cube-corner surfaces. In another embodiment the patterns form walls in the retroreflective sheeting that extend from a structure ridge, the thickness of the walls being in the range of between about 25.4 and 1,270 micrometers (0.001 and 0.05 inches). In another embodiment, retroreflective chips comprise first open-faced cube-corner surfaces having an optical coating on a portion thereon, the coating retroreflecting light incident thereon such that selected wavelengths of light do not pass through the chips and further comprising second open-faced cube-corner surfaces having an optical coating on a portion thereon nested within the back side of the first open-faced cube-corner surfaces such that the respective open-faced surfaces face away from each other, each chip having a length of approximately. Sheeting fragments or chips may be very small (0.025 mm in length and width) to very large (greater than 1000 mm in width and length) in size.

Figure 8:
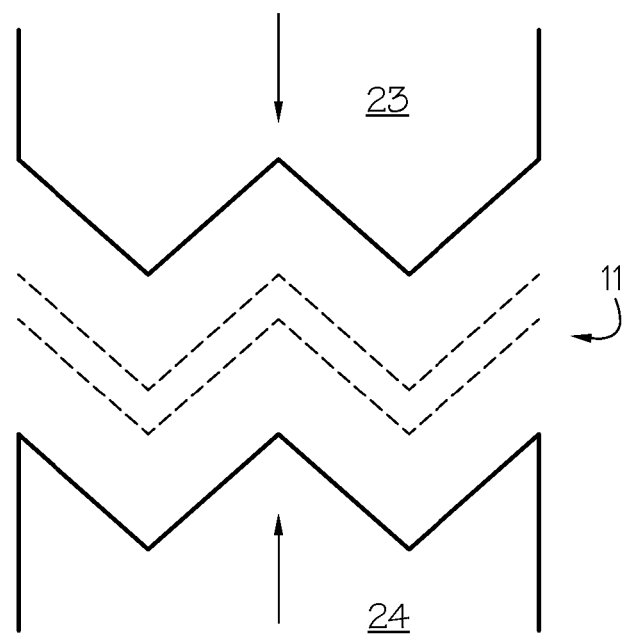
FIG. 8 illustrates a method of forming open-faced retroreflective sheeting which includes forming open-faced corner-cube surfaces on both sides of a material substrate simultaneously, in accordance with embodiments of the present invention.

FIG. 8 illustrates a method of forming open-faced retroreflective sheeting which includes forming open-faced corner-cube surfaces on both sides of a material simultaneously, in accordance with embodiments of the present invention. In the typical manufacture of a conventional retroreflective material sheeting, an odd generation (open faced or concave apex) tooling is utilized to form solid corner-cube prisms out of a material to create retroreflective sheeting. In connection with embodiments of the present invention, a retroreflective sheeting can be manufactured such that the first and second surfaces 12A, 12B are formed simultaneously from the same material using opposed odd 23 and even 24 generation full-square-sided corner-cube molds. In various example embodiments, master tooling can be cut, for example, in accordance with techniques described in U.S. Pat. Nos. 1,591,572, 1,848,675, or etched or ablated as described in U.S. Pat. Nos. 6,819,507 and 7,098,976, the contents of which are incorporated herein by reference. The even and odd generation molds can be replicated from the master tooling using standard well known electroforming techniques. In various examples, the sheeting 11 that can be replicated from the molds can comprise thermoplastic, thermoset, biodegradable polymer, glass, ceramic, or other suitable materials. The resulting formed sheeting 11, when formed from commonly available transparent polymers, without reflective coatings, has been demonstrated to retroreflect equally well in both, opposing directions. The body 16 of the resulting retroreflective formed sheeting 11 structure may or may not include air or gas bubbles as a result of not air or gas being trapped in the mold cavity during formation or knit lines created by merging molten plastic. Such bubbles or knit lines can have the beneficial effect of scattering light to thus widen the retroreflected light distribution and to also increase the glow effect of the structure which is a result of the light tunneling throughout the part and emerging from the structure at various points. Fillers may also be used in the body 16 to increase the amount of scattered light. In some cases it is beneficial to form the body 16 absent of the air or gas bubbles, knit lines or fillers to reduce the glow effect and narrow the retroreflected light distribution.

The following process can be used to manufacture unique ambient light appearance reflective and retroreflective products such as front or rear projection screens for use with LCD systems, digital micro-mirror (DMD) devices, digital light projection (DLP) devices, and other suitable front or rear projection systems: 1) Provide a full-square-sided corner-cube mold consisting of odd and even generation opposing sides, for example, as shown in FIG. 8. 2) Mold or cast or form two sided full-square-sided parallel walled open-faced corner-cube sheets from a thermoplastic, thermoset, glass, ceramic, biodegradable, or other suitable, material. The corner-cubes may be of several different configurations and vary in size and texture for each run to achieve the variation in light distribution desired for the final product. 3) For front projection screens, metallize or partially metallize at least some of the reflecting facets of the corner-cubes on one side with a specular coating, such as aluminum or silver. High index of refraction structures may not require metallization. Facets may or may not require texture for retroreflective front projection and imaging screens. 4) For front projection screens, print a colored coating onto at least a portion of the rear side of the part having the metallized surface. A single color or a multiple color pattern can be used depending on the ambient color effect desired in the final product. 5) Fill the open-faced corner-cubes on one or both sides of the sheet with a material that may or may not create air gaps in the open-faced prisms. 6) Optional step—Dice the retroreflective sheeting into approximately 0.0508 centimeter (0.020 inch) square pieces. In this example the corner-cube pitch is less than 0.006 inches. 7) Optional step—Mix the diced pieces into a clear plastisol or similar curable and/or moldable polymer. 8) Optional step—Spread the plastisol onto a backing film, such as a white polyvinyl chloride. Mixing and spreading can be done with one color diced batch, a multiple color-mixed diced batch or with individual color diced batches spread in specific patterns to create an art object which also serves as a front projection screen. The diced pieces orient approximately 50% up and 50% down with some overlapping and tipped pieces. 9) Optional step—Cure the plastisol to form a one-piece vinyl sheet. 10) Mount the finished sheet to form a front projection screen.

The resulting projection screen is characterized by excellent ambient light appearance and excellent light reflection characteristics. This improvement makes it much easier to produce an affordable LCD or DMD light engine projection system for consumer use. The front projection screen can be made to any size desirable, without creating objectionable seams. One form of projection or imaging screen is made without textured facets or other light spreading means specifically for retroreflecting screens, such as those used in three dimensional imaging systems.

In another embodiment, transparent wavelength-selective transparent materials can be digitally printed into the open-faced prisms to form a visual image that has one message when viewed by the naked eye, and a different message when scanned by a hyperspectral scanner. These concepts are useful for many security applications, authentication applications and identification applications such as friend/foe and search and rescue. One example in document security is identification of not only the forgery, but the copier the forgery was made on because of the wavelengths that are retroreflected or not retroreflected by the various types of corner-cubes in the array.

In another embodiment, the full-square-sided corner-cube material 16 comprises a relatively thin (25.4 um (0.001 inch)) plastic such as a cast acrylic or molded glass or molded ceramic or biodegradable material which can easily fracture at points between the two sided nested full-square-sided open-faced prism sections.

The configuration of retroreflective sheeting construction described herein with two equally performing opposing sides offers significant advantages. When the sheeting is diced into chips 42, both sides of the chips retroreflect incoming light rays. With reference to FIG. 13, the length 32 of the chip 42 can be between about 25.4 um and 101.6 mm (0.001 and 4.0 inches), or greater, and the width 34 can, for example, be between about 25.4 um and 101.6 mm (0.001 and 4.0 inches), or greater. For the small retroreflective corner-cube structures, the distance 36 between apices can be between about 25.4 and 152.4 um (0.001 and 0.006 inches). The height 38 of the prisms can be between about 7.62 and 71.12 um (0.0003 and 0.0028 inches). The thickness 44 of the carrier sheet 28 can be between about 25.4 and 50.8 um (0.001 and 0.002 inches). The chips 42 can be of any shape including hexagonal, square, circular, rectangular, etc. In alternative embodiments, the chips are preferably less than about 6.45 square centimeters (1 square inch), and more preferably less than about 1.61 square centimeters (0.5 square inch), and most preferably less than about 0.4 square centimeters (0.25 square inch).

The method can optionally further include the step of forming the retroreflective sheeting simultaneously on both the even and odd generation molds to form a mirror image of the molds wherein the resulting sheeting includes a plurality of three-sided indentations on two opposing sides which form open faced full-square-sided cube-corner surfaces on both sides of a single material or in a second configuration form solid truncated corner-cubes on both sides of a single material or a combination of both open faced full-square-sided corner-cubes and solid truncated corner-cubes may be formed on both sides of the material. Casting, embossing, injection molding, compression molding and thermoforming processes may be used to from materials in pellet or sheet form into the shapes of the embodiments disclosed herein.

The thickness of the sheeting, the sheeting wall sections and also the dihedral angles of the corner-cube wall sections may be varied to optimize the retroreflected light distribution for various applications. The pitch of the structure or sheeting may be varied to optimize of the retroreflection for various applications. The thickness of the structure or sheeting wall sections may be varied relative to the pitch of the structure or sheeting to optimize the amount of retroreflection for various applications. A microstructure can be formed on the film from polymeric epoxies, acrylates or the like, depending on the product performance needs. Preferably, the material is selected from a group of materials that is resistant to UV light, visible light, and/or thermal degradation.

The open structures can be filled with clear or colored resins to improve the entrance angle, reduce curling, increase adhesion to the cover film, etc. transparent printing compositions, transparent thermoplastics and transparent thermoset resins, transparent adhesives, transparent binders, all types of transparent or partially transparent liquids, etc. Filling the recesses can be done by spray coating (electrostatic or otherwise), gravure coating, a hot-nip process at normal room pressure or in a vacuum chamber if air entrapment is a problem, roller coating, compression or similar methods known to those skilled in the art. Tooling for open-faced prism structures can be formed with spaces or gaps to create open-faced prism islands. Low refractive index coatings may be used in place of the metallized coating to provide high whiteness open-faced structures or chips that can be mixed into high refractive index binders. In another embodiment, a wavelength selective optical coating is disposed on at least some of the first and second substantially parallel walled corner-cube structure surfaces. The fill material can also contain fluorescing dyes or pigments plus light stabilizers such as hindered amine light stabilizers to lengthen the fluorescing life of the material.

As illustrated in FIG. 11 through 14, when these chips 42 are mixed into coatings 26, paints, or polymers, the finished product includes chips that are oriented toward the surface and all of the chips retroreflect light in a direction which is dependent on the orientation the chip arrives at during the manufacturing process. Most of the chips 42 will orient themselves flat relative to a substrate 28 in the case of coatings 26 and paints. Some of the chips 42 overlap others and are tilted which results in improved entrance angle and observation angle performance. Also, some chips are rotated in the plane of the flake creating improved orientation angle performance. The chips 42 can be made of a rigid polymer that does not change shape as mixed into the coating 26. The coatings 26, paints, or polymers can be rigid, flexible, or elastic, after processing.

The chips may be comprised of at least partially aluminum metallized on only one side, then the difference in index of refraction of the chip material 16 and the coating material 26 will result in a shift in the retroreflected light performance for the chips that land uncoated side up vs. chips that land coated sided up. On the side where the metallized surface is exposed to the incident light, the retroreflection will take place from light that is only traveling in the fill coat material 26. On the side where the body 16 of the sheeting 11 is exposed to the incident light, the light must travel through the fill coat material 26 and the body material 16. If the body material 16 has a different property from coating material 26, for example if the index of refraction of the two materials is different, then the resulting optical path will be different from the retroreflected beam that travels in only one material.

When the chips are aluminum-metallized, they appear gray in color when viewed through a transparent material. To increase the color of the resulting material, some of the chips can be printed with a color 25 on one side or additional color chips 30 of colored material can be mixed in with the retroreflective chips at a predetermined percentage to create the desired appearance. Also, a colored substrate 28 may be used as illustrated in FIG. 14. This substrate 28 or colored chip material 30 may be colored (for example, fluorescent, standard, opaque, transparent, etc.), diffractive, holographic, pearlescent, or reflective.

In another embodiment, the chips 42 are mixed into a transparent coating formulation which is applied to a colored substrate. Examples of transparent coating formulations include transparent inks and polymers used for retroreflective signs or back lighted signs. The coating is applied in a thickness and with a dispersion which creates the desired distribution of chips 42 across the surface of the substrate. The thickness of the coating also creates the desired surface finish which is dependent on the coating thickness and the size and thickness of the chips 42. Very wide web seamless material can be made that can be slit or cut to size to form many different types of products. The products can range from garment tape to sign blanks to imaging screens to front projection screens to wallpaper or wall paint. The wall paper may serve as a projection screen while at the same time having a pleasing ambient light appearance. In another variation, the chips 42 are mixed into a transparent polymer which is extruded or cast into a film or structure that retroreflects and has color when viewed from both sides of the film.

In a typical application, the full-square-sided corner-cube retroreflective sheet is formed as described. The sheet can be diced or chopped into small chips and mixed with a coating formulation or a resin formulation and then applied to a substrate or formed through a molding process. In the case of a coating, the formulation can be flooded onto a substrate and UV or heat cured followed by lamination of a film on top of the coating. The top film forms a protective sandwich for the products and can be colored and also loaded with appropriate UV blocking chemicals to protect the products from aging. The top film can also be designed with a surface which is treated to prevent the products from damage during washing or sewing. The particle or chip size is dependent upon the application. Very small and thin particles may be desired for thin coatings. Larger surface area particles or chips may be desired for applications where the chip orientation is more important.

The coatings and resin and/or top film may be designed with coatings or dyes or pigment which selectively transmits different wavelengths of light. This product construction is especially important for applications where specialized light sources are used. Some examples of applications are air-sea rescue, object recognition and vehicle guidance. In addition the material 16 used to form the two sided corner-cube arrays may contain dyes or pigments which selectively transmits different wavelengths of light.

The chips can be mixed into many different types of coatings or resins. Preferably, the temperature should be kept below the heat distortion temperature of the prisms. However, some prism resins can withstand very high temperatures and do not distort at temperatures as high as 205 degrees Celsius (400 degrees Fahrenheit). The shape of the initial tooling used to form the open-faced corner-cubes is preferably biased so that when the corner-cube does change shape, it changes in a direction which is beneficial to the resulting device.

Diced chips made from several different types of sheeting which each have different size corner-cube prisms can be mixed together to form an end product which has an optimized light distribution. The chips are placed on a substrate such that an enhanced amount of light can be retroreflected. The need to have the chips all oriented and tightly packed is overcome by the manner in which the chips orient themselves in the coating or resin. Many chips form stratified layers and also tilt in a way which makes up for dense packing.

In one embodiment, the open-faced corner-cube surfaces 12 are constructed of different sizes on the chips 42. The chips 42 can be mixed into resins or coatings in different combinations for different optical effects.

In the embodiments described herein, the quantity of chips used is greater than the quantity of material used when forming a densely packed array of corner-cube sheeting; however, the cost for manufacturing the chips and processing the chips into substrates is lower than most of the methods used to make retroreflective materials today. One large cost benefit is the ability to make retroreflective corner-cube materials in very large area seamless configurations. Another cost benefit is the ability to make corner-cube chips of various configurations that can be held in inventory and mixed together appropriately to form products on demand.

In another embodiment, the retroreflective sheeting can be slit, diced, cut or formed through a molding process as an example, into thread or fibers. The thread or fibers can be clad with a coating that wets to the surfaces of the structure or bridges the surfaces of the open faced corner-cubes in the structure.

In one experimental example, full-square-sided corner-cube retroreflective sheeting was molded with 1.016 millimeter (0.040 inch) pitch odd and even full-square-sided corner-cube tooling out of a polyester material. The resulting two sided full-square-sided corner-cube parts retroreflected equally well from both opposing sides without application of a specular coating. The mechanism of retroreflection is depicted in FIG. 5. Similar parts were made from polypropylene and polycarbonate with equally good results.

In another experimental example, full-square-sided corner-cube retroreflective sheeting was molded out of polyester with 1.016 millimeters (0.040 inch) pitch corner-cube tooling. A 500 Angstrom gold (Au) layer was vacuum coated onto the reflecting surfaces of the polyester full-square-sided corner-cubes. Some sheets were coated on one side and some sheets were coated on both sides. The resulting surface is glittered in appearance and gold colored during daytime viewing. During night time viewing a high degree of retroreflection is present uniformly across the entire front and rear surfaces of the sheets. In this configuration nearly 100% of the light is retroreflected back toward the source of light providing an anti-glare performance feature. When the sheeting is viewed at an angle away from the source the sheeting appears almost black.

The above experimental examples were made from fairly large pitch (1.016 millimeters (0.040 inch)) full-square-sided corner-cube tooling. The pitch of the corner-cube tooling can be as small as desired. 152.4 um (0.006 inch), and as small as 24 um (0.001 inch) pitch, full-square-sided corner-cube tooling is feasible but challenging to make. One processing advantage of forming this shape part is that the odd and even opposing molds (FIG. 8) will self-center as they close on the material 16 with material 16 operating as a hydraulic non-Newtonian fluid while still in a fluid state. The self centering feature makes molding the parts relatively straight forward and also shows that very small pitch corner-cube sheets are possible. Very large area two sided corner-cube sheet molding of small pitch corner-cubes is a problem because of the tendency of the electroforming process used to make the odd and even generation tools to cause dimensional changes which could cause the loss of the alignment of opposing odd and even mold corner-cubes across a wide area. This problem may be overcome by allowing sections of the odd and even generation molds to move freely as they close upon one another.

Various textures, various prism sizes, various prism carrier films such as different indices of refraction, various oligomer, and various color on prism surfaces can be used to create many types of front projection screens that reflect the light of given angles and have various ambient light appearances. The same manufacturing concept can be used to manufacture many styles of retroreflective tapes, films or fabrics.

The transparent plastic/polymer used to form the two sided retroreflective sheeting may be a transparent color. Molded or formed two sided retroreflectors can be used for retroreflective objects such as dangle tags, security tags, currency security, document security, credit card security, passport security, delineator posts, bollards (also internally illuminated bollards), barricades, cones, channelizers, vehicle parts-bumpers, fenders, body outer shell parts, wheel rims, bicycle rider helmets, helmets of all types-pilots, boating, in-line skating wheels, photoelectric devices, road markers, guard rails, marine buoys, boat outer shell hull parts, boat masts, garments, and snow poles. In addition a living hinge may be formed between sections of the two sided retroreflective material either during the molding process or sequentially as two sided retroreflective material sections are formed to produce a continuous length of two sided retroreflective material that is either all retroreflective or has selected areas of retroreflective features that may be wound onto a roll. This material is useful for making safety sheeting to be used as wrist, waist or ankle safety bands or entire garments or roll-up signs. Also, chips 42 can be mixed into transparent UV cured resins and coated onto a plastic substrate to create seamless uniform sheeting useful for many applications.

Also, coatings or polymers used to manufacture the two sided corner-cube array or in accordance with an embodiment of the invention may be used to modulate the retroreflected electromagnetic signal. The capability to modulate the incident signal allows a message to be sent back to the location of the source. Various methods for modulating the signal are listed below:

1. Coat at least a portion of the open faced corner-cube array with a specular reflective coating that has a weak bond on at least one corner-cube reflecting facet. Electro-statically modulate the shape and or angle of the very thin coating.
2. Make a very thin open faced corner-cube array by forming a film coating such as aluminum or other reflective metal or dielectric layers or combination of metal and dielectric layers on at least a portion of a corner-cube array, release the thin film corner-cube array structure from the array, suspend the array in a fluid and modulate the pressure on the fluid to change the shape of the corner-cube array
3. Enclose the thin retroreflector made in 2 above in an elastic transparent polymer and use pressure to modulate the shape of the retroreflector
4. Mold a two sided corner-cube array of one of the forms described in the figures from an elastic polymer modulate the part using pressure or deflection.
5. Mold an open faced corner-cube array from an elastic polymer, apply a reflective coating on at least a portion of the corner-cube facets within the array and modulate the part using pressure or deflection.
6. Mold an open faced retroreflector from a polymer that can expand or contract when an electronic charge is applied to the polymer. Apply a reflective coating on at least a portion of at least one side of the corner-cube array. Modulate by changing the magnitude of the current and/or voltage
7. Electroform a thin nickel replica of an open faced corner-cube array. Apply a specular reflective coating to the smooth nickel corner-cube facets, modulate the electromagnetic retroreflected signal be applying mechanical pressure to change the shape of the corner-cubes within the array or change the shape of the array.
8. Fill an open faced corner-cube array which has at least a portion of the surfaces coated with a reflective coating with a fluid and modulate the level of the fluid to change the retroreflected electromagnetic signal
9. Mold a two sided corner-cube array of one of the forms described in the figures from an elastic low index of refraction polymer, insert the part in a high index of refraction elastic material and modulate the part using pressure or deflection.

In the above examples, the electromagnetic wavelength used may be a single wavelength or multiple wavelengths. That is the source may be single wavelength or a multi-spectral source and filters such as wavelength selective materials or coatings or microstructures may be used to control the wavelength of the source that is retroreflected.

In addition a living hinge may be formed between sections of the two sided retroreflective material either during the molding process or sequentially. Two sided retroreflective material sections are joined by a living hinge to produce a continuous length of two sided retroreflective material that may be wound onto a roll. This is an advantage for application of thin film coatings in continuous or batch coating processes. In one embodiment, the living hinge is made from the same material that is used to form the retroreflective sheeting connected by the living hinge.

While embodiments of the invention have been particularly shown and described with references to preferred embodiments thereof, it will be understood by those skilled in the art that various changes in form and details may be made herein without departing from the spirit and scope of the invention as defined by the appended claims.

What is claimed is:

1. A retroreflector that retroreflects electromagnetic energy, comprising:
    a body of material, the body having a first surface and a second surface;
    a plurality of first full-square-sided corner-cube structures on the first surface of the body, the first full-square-sided corner-cube structures each having three facets that lie along planes that are orthogonal to each other; and
    a plurality of second full-square-sided corner-cube structures on the second surface of the body, the second full-square-sided corner-cube structures each having three facets that lie along planes that are orthogonal to each other;
    the body being constructed and arranged to be transparent to incident electromagnetic energy at a range of wavelengths and to have a thickness so that an incident electromagnetic energy ray that is incident at one of the first and second surfaces enters the body, and is redirected by both the first surface and the second surface so that both the first surface and the second surface contribute to retroreflection of the incident electromagnetic energy ray, and exits from the one of the first and second surfaces at which the incident electromagnetic energy ray was incident to emit a retroreflected electromagnetic energy ray of the incident electromagnetic energy ray.

2. The retroreflector of claim 1 wherein the body is further constructed and arranged so that an incident electromagnetic energy ray that is incident at one of the first and second surfaces enters the body by refraction, exits the other of the first and second surfaces by refraction, reenters the other of the first and second surfaces by refraction, and exits from the one of the first and second surfaces at which the incident electromagnetic energy ray was incident to emit a retroreflected electromagnetic energy ray of the incident electromagnetic energy ray.

3. The retroreflector of claim 1 wherein the incident electromagnetic energy ray that is incident at one of the first and second surfaces enters the body by refraction, is internally reflected by the other of the first and second surfaces, and exits from the one of the first and second surfaces at which the incident electromagnetic energy ray was incident to emit a retroreflected electromagnetic energy ray of the incident electromagnetic energy ray.

4. The retroreflector of claim 1 wherein at least a portion of the facets of the corner-cube structures of the first surface and the facets of the corner-cube structures of the second surface are substantially parallel, wherein proud apexes of the first corner-cube structures substantially align with recessed apexes of the second corner-cube structures and wherein proud apexes of the second corner-cube structures substantially align with recessed apexes of the first corner-cube structures in a vertical direction of the body.

5. The retroreflector of claim 1 wherein at least a portion of the facets of the corner-cube structures of the first surface and the facets of the corner-cube structures of the second surface are substantially parallel and wherein proud apexes of the first corner-cube structures and recessed apexes of the second corner-cube structures and proud apexes of the second corner-cube structures and recessed apexes of the first corner-cube structures are offset relative to each other in a horizontal direction of extension of the body.

6. The retroreflector of claim 1 wherein the corner-cube structures comprise at least one of open-faced corner-cube structures and solid corner-cube structures.

7. The retroreflector of claim 1 wherein the plurality of first corner-cube structures and the plurality of second corner-cube structures are each arranged in an array having a pitch that relates to a distance between neighboring corner-cube structures and wherein exit locations of at least some of the retroreflected electromagnetic energy ray are spaced apart from an entry location of the incident electromagnetic energy ray by a distance greater than the pitch of the array.

8. The retroreflector of claim 7 wherein the body thickness is selected so that the exit location of the retroreflected electromagnetic energy ray is located at a corner-cube structure that is different and spaced apart from a corner-cube structure at which an entrance location of the incident electromagnetic energy ray is positioned.

9. The retroreflector of claim 7 wherein the body thickness is selected so that the entry location of the incident electromagnetic energy ray and the exit location of the retroreflected electromagnetic energy ray are positioned in a same corner-cube structure.

10. The retroreflector of claim 1 wherein the body thickness is selected so that at certain entry locations, the incident electromagnetic energy ray enters the body by refraction at the one of the first and second surfaces, and exits from the other of the first and second surfaces by refraction so that the incident electromagnetic energy ray is transmitted through the body and not retroreflected.

11. The retroreflector of claim 1 further comprising a wavelength-selective optical coating or a wavelength-selective color coating on a subset of at least one of the first and second corner-cube structures.

12. The retroreflector of claim 11 wherein the optical coating includes a specular coating.

13. The retroreflector of claim 12 wherein the specular coating comprises a material comprising at least one of a metal layer and one or more dielectric layers.

14. The retroreflector of claim 1 wherein the material of the body is selected from the group consisting of thermoplastic and thermoset polymers, glass and ceramic, that are at least one of: transparent to incident electromagnetic energy, wavelength-selective transparent to incident electromagnetic energy, or opaque to incident electromagnetic energy.

15. The retroreflector of claim 14 wherein the polymers further include a filler that is selected from the group consisting of: glass, carbon, ceramic, graphite, polymers, and metals.

16. The retroreflector of claim 1 wherein the body comprises an intermediate substrate and first and second top layers on opposed sides of the substrate, wherein the substrate comprises a material that is wavelength-selective transparent to the incident electromagnetic energy.

17. The retroreflector of claim 16 wherein the intermediate substrate has a wavelength-selective transparent coating applied to at least one surface thereof.

18. The retroreflector of claim 16 wherein the intermediate substrate, the first and second top layers, and boundaries therebetween are configured to be wavelength-selective transparent to incident electromagnetic energy at the range of wavelengths.

19. The retroreflector of claim 1 further comprising an encapsulating material that surrounds the body of material of the retroreflector.

20. The retroreflector of claim 1 wherein a subset of at least one of the plurality of first corner-cube structures and plurality of second corner-cube structures includes flats in the regions of recessed apexes of the subset of corner-cube structures, the flats comprising a material that at least partially fills the subset of corner-cube structures.

21. The retroreflector of claim 20 wherein the material of the flats comprises one of: a material that is integral with the material of the body and a material that is applied to the material of the body.

22. The retroreflector of claim 20 wherein the flats are at an acute angle relative to a horizontal plane of the sheeting.

23. The retroreflector of claim 20 wherein the subset of the plurality of first corner-cube structures and plurality of second corner-cube structures are configured so that the body of the material in the region of the subset forms a retroreflective structure that operates as a truncated corner-cube structure to incident electromagnetic energy.

24. The retroreflector of claim 23 wherein the retroreflective structure that operates as a truncated corner-cube structure is configured to include:
a flat on the first surface;
a proud apex on the second surface comprising neighboring facets of adjacent open-faced second corner-cube structures; and
a portion of the body of material between the flat on the first surface and the proud apex on the second surface.

25. The retroreflector of claim 24 wherein the truncated corner-cube structure operates as a full-square-sided truncated corner-cube structure to incident electromagnetic energy.

26. The retroreflector of claim 1 wherein a subset of the first or second corner-cube structures have recessed apexes that include modified surfaces, including at least one of flattened recessed apexes, flattened recessed apexes having marking features, recessed apexes having curved surfaces, recessed apexes having segmented surfaces, and recessed apexes having microstructured surfaces.

27. The retroreflector of claim 1 wherein a subset of the first or second corner-cube structures have proud apexes that include modified surfaces, including at least one of flattened proud apexes, flattened proud apexes having marking features, proud apexes having curved surfaces, proud apexes having segmented surfaces, and proud apexes having microstructured surfaces.

28. The retroreflector of claim 1 wherein a subset of the first or second corner-cube structures have facets that include modified surfaces, including marking features, curved surfaces, segmented surfaces, and microstructured surfaces.

29. The retroreflector of claim 1 wherein the first corner-cube structures are arranged along a first axis and wherein the second corner-cube structures are arranged along a second axis, and wherein the first and second axes are parallel to each other.

30. The retroreflector of claim 1 wherein the first corner-cube structures are arranged along a first axis and wherein the second corner-cube structures are arranged along a second axis, and wherein the first and second axes lie at an acute angle relative to each other.

31. The retroreflector of claim 1 wherein a first region of at least one of the plurality of first corner-cube structures and the plurality of second corner-cube structures is arranged along a first axis and wherein a second region of the at least one of the plurality of first corner-cube structures and the plurality of second corner-cube structures is arranged along a second axis and wherein the first and second axes of the first and second regions lie at an acute angle with respect to each other.

32. The retroreflector of claim 1 wherein the plurality of first corner-cube structures and the plurality of second corner-cube structures are each arranged in an array having a pitch that relates to a distance between neighboring corner-cube structures, and wherein a first pitch of the first corner-cube structures is different than a second pitch of the second corner-cube structures.

33. The retroreflector of claim 1 wherein the plurality of first corner-cube structures and the plurality of second corner-cube structures are each arranged in an array having a pitch that relates to a distance between neighboring corner-cube structures, and wherein a first pitch of a first region of the first corner-cube structures is different than a second pitch of the second region of the first corner-cube structures or wherein a first pitch of a first region of the second corner-cube structures is different than a second pitch of a second region of the second corner-cube structures.

34. The retroreflector of claim 1 wherein the body of material in a first region of the retroreflector has a first thickness that is different than a second thickness in the second region of the body of material.

35. A retroreflector that retroreflects electromagnetic energy, comprising:
a body of material, the body having a first surface and a second surface;
a plurality of first full-square-sided corner-cube structures on the first surface of the body, the first full-square-sided corner-cube structures each having three facets that lie along planes that are substantially orthogonal to each other; and
a plurality of second full-square-sided corner-cube structures on the second surface of the body, the second full-square-sided corner-cube structures each having three facets that lie along planes that are substantially orthogonal to each other;
wherein at least a portion of the facets of the corner-cube structures of the first surface and the facets of the corner-cube structures of the second surface are substantially parallel and wherein the body is constructed and arranged to be transparent to incident electromagnetic energy at a range of wavelengths and to have a thickness so that an incident electromagnetic energy ray that is incident at a facet of a first corner-cube structure of one of the first and second surfaces enters the body by refraction at the facet of the first corner-cube structure of the one of the first and second surfaces, is internally reflected at least once at a facet of a first corner-cube structure of the other of the first and second surfaces, exits the other of the first and second surfaces by refraction, reenters the other of the first and second surfaces by refraction, is internally reflected at least once at a facet of a second corner-cube structure of the other of the first and second surfaces that is different than the first corner-cube structure of the other of the first and second surfaces, and exits the body by refraction at a facet of a second corner-cube structure of the one of the first and second surfaces that is different than the first corner-cube structure of the one of the first and second surfaces to emit a retroreflected electromagnetic energy ray of the incident electromagnetic energy ray.

36. The retroreflector of claim 35 wherein proud apexes of the first corner-cube structures substantially align with recessed apexes of the second corner-cube structures and wherein proud apexes of the second corner-cube structures substantially align with recessed apexes of the first corner-cube structures in a vertical direction of the body.

37. The retroreflector of claim 35 wherein proud apexes of the first corner-cube structures and recessed apexes of the second corner-cube structures and proud apexes of the second corner-cube structures and recessed apexes of the first corner-cube structures are offset relative to each other in a horizontal direction of extension of the body.

38. The retroreflector of claim 35:
  wherein parallel-walled retroreflection occurs when the incident electromagnetic energy ray enters the body by refraction at the facet of the first corner-cube structure of the one of the first and second surfaces and exits the body by refraction at the facet of the second corner-cube structure of the one of the first and second surfaces that is different than the first corner-cube structure of the one of the first and second surfaces, and
  wherein truncated corner-cube retroreflection occurs when the incident electromagnetic energy ray enters the body by refraction at the first corner-cube structure of the one of the first and second surfaces, is internally reflected by facets of corner-cube structures of the other of the first and second surfaces and exits the body by refraction at the first corner-cube structure of the one of the first and second surface, and
  wherein parallel-walled retroreflection and truncated corner-cube retroreflection can occur for incident electromagnetic energy rays that are incident at a same first corner-cube structure.

39. The retroreflector of claim 35 wherein a subset of at least one of the plurality of first corner-cube structures and plurality of second corner-cube structures includes flats in the regions of recessed apexes of the subset of corner-cube structures, the flats comprising a material that at least partially fills the subset of corner-cube structures.

40. The retroreflector of claim 39 wherein the material of the flats is one of: a material that is integral with the material of the body and a material that is applied to the material of the body.

41. The retroreflector of claim 40 wherein the flats are at an acute angle relative to a horizontal plane of the sheeting.

42. The retroreflector of claim 39 wherein the subset of the plurality of first corner-cube structures and plurality of second corner-cube structures are configured so that the body of the material in the region of the subset forms a retroreflective structure that operates as a truncated corner-cube structure to incident electromagnetic energy.

43. The retroreflector of claim 42 wherein the retroreflective structure that operates as a truncated corner-cube structure is configured to include:
  a flat on the first surface;
  a proud apex on the second surface comprising neighboring facets of adjacent open-faced second corner-cube structures; and
  a portion of the body of material between the flat on the first surface and the proud apex on the second surface.

44. The retroreflector of claim 43 wherein the truncated corner-cube structure operates as a full-square-sided truncated corner-cube structure to incident electromagnetic energy.

\* \* \* \* \*